United States Patent
Okumura et al.

(10) Patent No.: US 6,679,434 B2
(45) Date of Patent: Jan. 20, 2004

(54) VEHICLE AIR CONDITIONER WITH FLOW AREA ADJUSTMENT OF FLUID IN HEATING HEAT EXCHANGER

(75) Inventors: Yoshihiko Okumura, Kariya (JP); Katsumi Nishikawa, Kariya (DE); Tomonori Akatsuka, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/238,217

(22) Filed: Sep. 10, 2002

(65) Prior Publication Data

US 2003/0047300 A1 Mar. 13, 2003

(30) Foreign Application Priority Data

| Sep. 12, 2001 | (JP) | ................................. | 2001-277055 |
| Jun. 14, 2002 | (JP) | ................................. | 2002-174149 |
| Jul. 12, 2002 | (JP) | ................................. | 2002-203985 |

(51) Int. Cl.$^7$ ................................. B60H 1/02
(52) U.S. Cl. ................................. 237/12.3 B; 165/174
(58) Field of Search ................. 237/12.3 B, 12.3 R; 165/41, 42, 174

(56) References Cited

U.S. PATENT DOCUMENTS

| 3,731,734 A | * | 5/1973 | Ris et al. ...................... 165/100 |
| 3,731,735 A | * | 5/1973 | Ris ............................. 165/110 |
| 3,774,678 A | * | 11/1973 | Glorisi ......................... 165/76 |
| 3,802,496 A | * | 4/1974 | Ris et al. ...................... 165/101 |
| 5,287,917 A | * | 2/1994 | Cannata ........................ 165/154 |
| 5,526,873 A | * | 6/1996 | Marsais et al. ................. 165/51 |
| 5,901,785 A | * | 5/1999 | Chiba et al. ................... 165/174 |
| 6,062,303 A | * | 5/2000 | Ahn et al. ..................... 165/110 |
| 6,125,927 A | * | 10/2000 | Hubert ......................... 165/173 |
| 6,192,976 B1 | * | 2/2001 | Yoshida et al. ................. 165/171 |

* cited by examiner

*Primary Examiner*—Derek Boles
(74) *Attorney, Agent, or Firm*—Harness, Dickey & Pierce, PLC

(57) ABSTRACT

In a vehicle air conditioner, a flow control member is disposed in an inlet tank of a heating heat exchanger for heating air to be blown into a passenger compartment using a fluid as a heating source. In the heating heat exchanger, a ratio between a first area where the fluid flows, and a second area where the fluid does not flow is changed by controlling an operation position of the flow control member. Thus, a flow ratio between hot air from the first area of the heating heat exchanger and cool air from the second area thereof can be adjusted, so that the temperature of air blown into the passenger compartment can be adjusted.

42 Claims, 31 Drawing Sheets

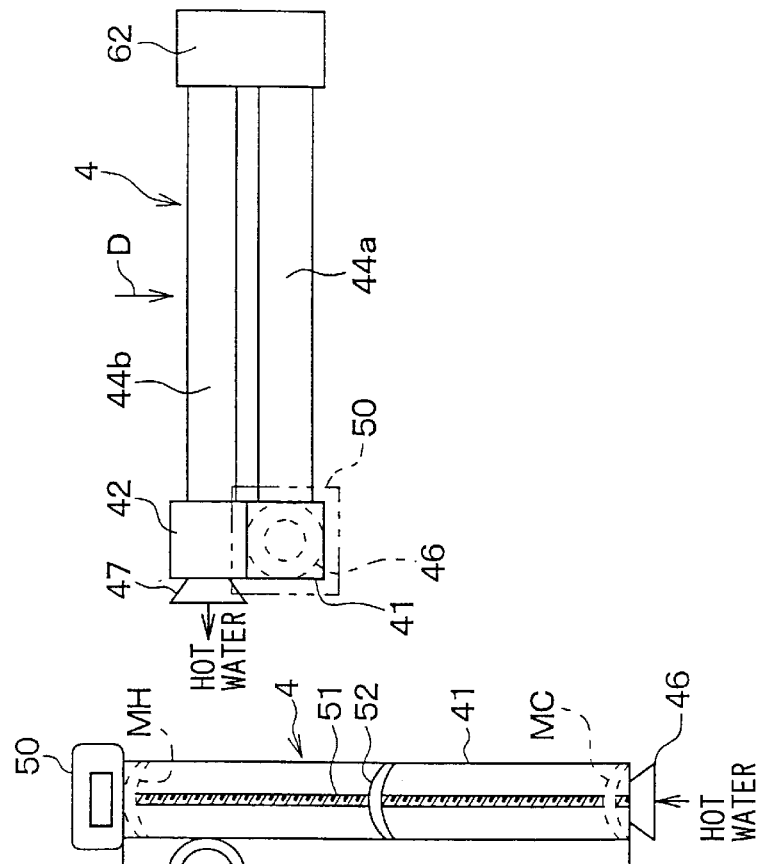
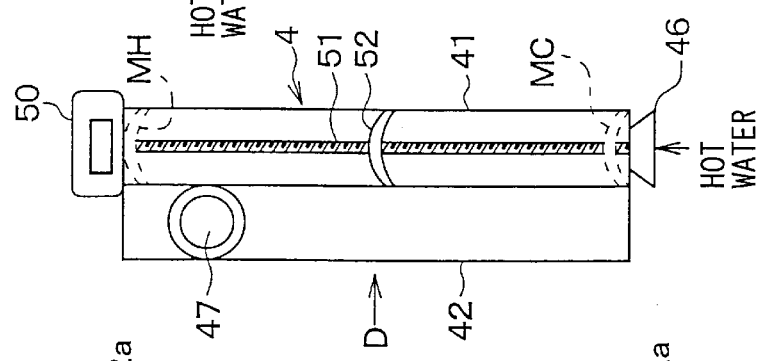
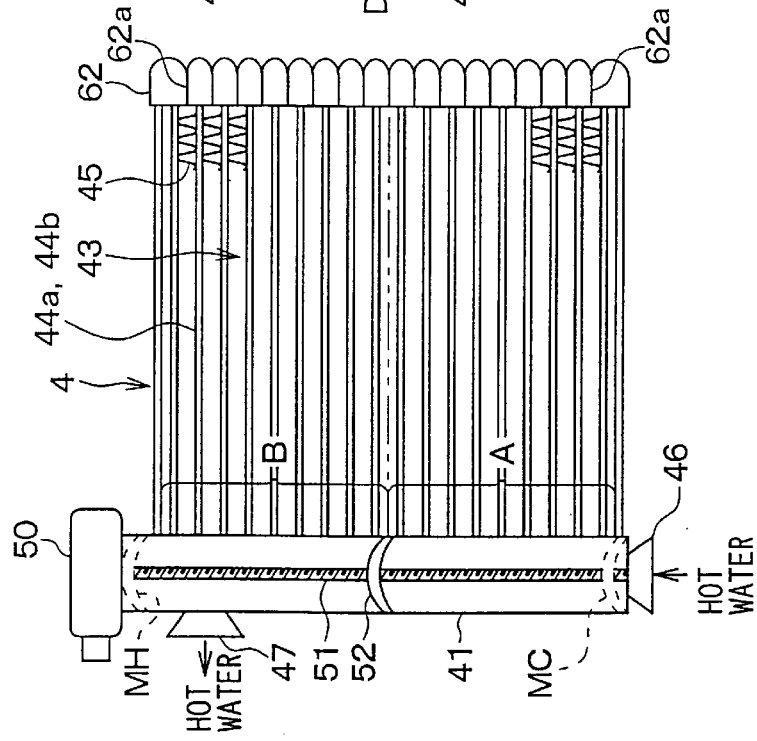

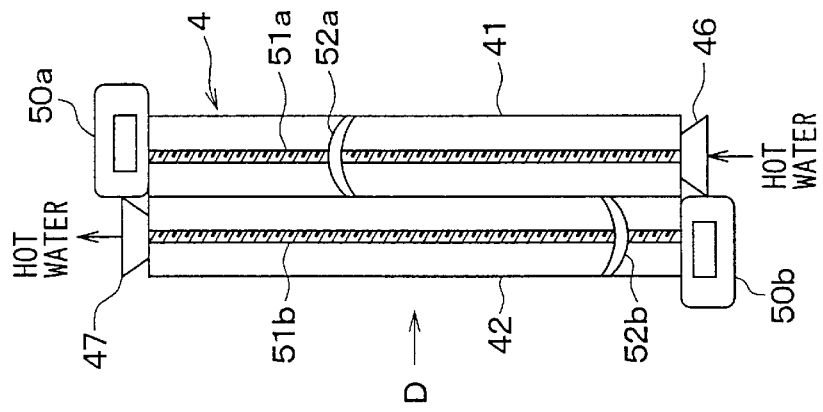
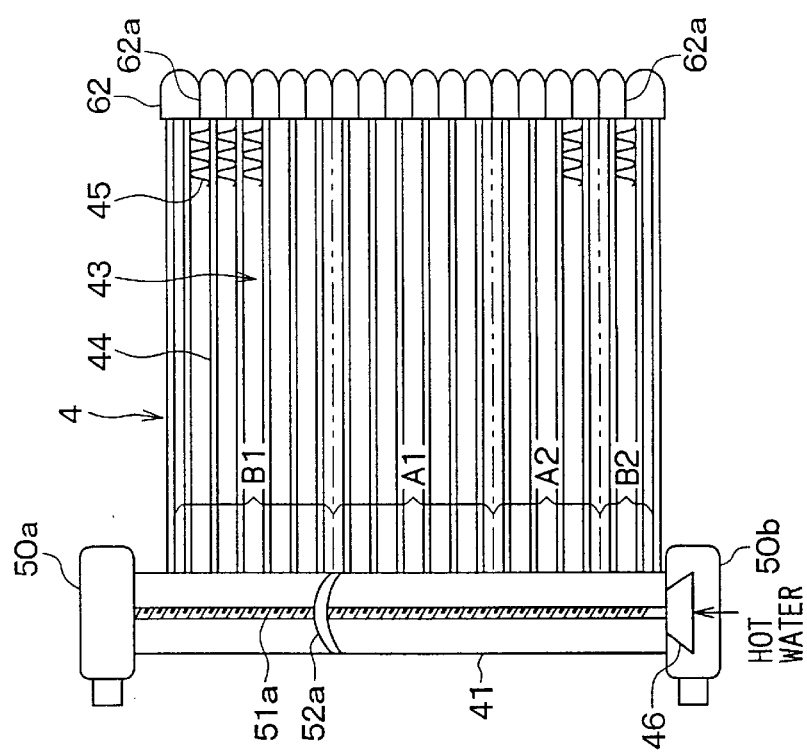

VEHICLE AIR CONDITIONER WITH FLOW AREA ADJUSTMENT OF FLUID IN HEATING HEAT EXCHANGER

CROSS-REFERENCE TO RELATED APPLICATION

This application is related to and claims priority from Japanese Patent Applications No. 2001-277055 filed on Sep. 12, 2001, No. 2002-174149 filed on Jun. 14, 2002, and No. 2002-203985 filed on Jul. 12, 2002, the contents of which are hereby incorporated by reference.

BACKGROUND OF THE INVENTION

1. Field of the Invention

The present invention relates to a vehicle air conditioner for adjusting an air temperature blown into a passenger compartment by changing a ratio of a fluid flowing area to a non-fluid flowing area in a heating heat exchanger. Here, a fluid such as hot water, used as a heating source, flows in the fluid flowing area in the heating heat exchanger, and no fluid flows in the non-fluid flowing area in the heating heat exchanger.

2. Description of Related Art

Conventionally, an air mixing system and a hot-water adjusting system are known as an air-temperature adjusting system of a vehicle air conditioner. In the air mixing system, an air temperature to be blown into a passenger compartment is adjusted using an air mixing door, by adjusting a flowing amount ratio between hot air passing through a heating heat exchanger and cool air bypassing the heating heat exchanger. In the hot-water adjusting system, the air temperature blown into the passenger compartment is adjusted by adjusting a flowing amount or a temperature of hot water to be supplied to the heating heat exchanger.

In the air mixing system, an operational space of the air mixing door or a mixing space for mixing cool air and hot air is required in addition to a mounting space of the heating heat exchanger, thereby enlarging the size of the air conditioner. On the other hand, in the hot-water adjusting system, the mixing space and the operation space of the air mixing door in the air mixing system are not required. However, since the heat capacity of the heating heat exchanger is large, the air temperature cannot fast respond to a change of the flowing amount or the temperature of hot water flowing into the heating heat exchanger. Further, in a flowing-amount adjusting system of the hot-water adjusting system, the heating heat exchanger has the following heat radiation characteristics. That is, after a hot water valve is opened, as the flowing amount of hot water flowing into the heating heat exchanger increases in a small flowing amount range, the air temperature from the heating heat exchanger is rapidly increased. Thereafter, as the flowing amount of hot water increases, the air temperature from the heating heat exchanger is slowly increased. Therefore, it is difficult to continuously adjust the temperature of air blown into the passenger compartment from a low temperature range to a high temperature range.

In order to solve the problem, a hot water valve is required to accurately adjust a flowing amount of hot water in response to an operation stroke of the hot water valve in a small flowing amount range. However, in this case, production cost of the hot water valve is increased. Further, in the flowing-amount adjusting system, since hot water is supplied to the heating heat exchanger using a hot water pump driven by a vehicle engine, the air temperature tends to be changed due to a rotational speed variation of the engine. Further, the air temperature blown into the passenger compartment tends to be changed due to a flowing amount variation of air passing through the heating heat exchanger.

SUMMARY OF THE INVENTION

The present invention has been made in view of the above problem, and its object is to provide a vehicle air conditioner which can adjust temperature of air blown into a passenger compartment by using an air mixing function while having a reduced size.

According to the present invention, in a vehicle air conditioner, a heating heat exchanger for heating air using a fluid flowing therein as a heating source is disposed in an air conditioning case, and a flow control member is disposed within the heating heat exchanger to divide the heating heat exchanger into a first area where the fluid flows and a second area where the fluid does not flow. In addition, a ratio between the first area and the second area is changed by the flow control member. Accordingly, air is heated by the fluid in the first area of the heating heat exchanger to become hot air, and air passes through the second area of the heating heat exchanger without being heated in the second area. That is, air flowing from the second area of the heating heat exchanger is cool air. Thus, by changing the ratio between the first area and the second area in the heating heat exchanger using the flow control member, a flow ratio between a hot air amount and a cool air amount can be adjusted so that the temperature of air blown into the passenger compartment can be suitably adjusted. Further, because the flow control member is disposed in the heating heat exchange to control the fluid flowing area in the heating heat exchanger, an operation space of an air mixing door in a general air mixing system is unnecessary outside the heating heat exchanger, and the size of the vehicle air conditioner can be greatly reduced.

Preferably, the heating heat exchanger has a plurality of tubes through which the fluid flows to heat air. Further, the flow control member is disposed to change a ratio between a first number of the tubes in which the fluid flows, and a second number of the tubes in which the fluid does not flow. Accordingly, the flow ratio of the hot air amount and the cool air amount can be readily changed using the flow control member.

Preferably, the heating heat exchanger includes a core portion having the tubes, and a tank member for distributing the fluid into and for collecting the fluid from the tubes, and the flow control member is disposed in the tank member to be movable in the tank member so that an inner space of the tank member is partitioned in a tube arrangement direction where the tubes are arranged. Further, the flow control member is moved linearly in the tube arrangement direction to change the ratio between the first number of the tubes in which the fluid flows, and the second number of the tubes in which the fluid does not flow. Therefore, the flow control member can be readily disposed in the tank member of the heating heat exchanger while having the air mixing function.

Specifically, in this case, a screw rotation shaft extending in the tank member in the tube arrangement direction is disposed in the tank member, and the flow control member is fitted with an inner surface of the tank member to form a fitted state which prevents the flow control member from being rotated relative to the tank member, while being slidable on the inner surface of the tank member in the tube arrangement direction. In addition, the flow control member is screw-connected to the screw rotation shaft, to be linearly moved in the tank member by a rotation of the screw rotation shaft while the fitted state is maintained. Preferably, the tank member has a non-round sectional shape, and the flow control member has a shape corresponding to the non-round sectional shape of the tank member. More preferably, the flow control member includes a valve member made of an elastic material, and a valve seat made of a rigidity material for fixing the valve member. In this case, the valve member is disposed to press-contact the inner surface of the tank member, and the valve seat is screw-connected with the screw rotation shaft to be separated from the inner surface of the tank member by a predetermined clearance.

Alternatively, the flow control member is disposed in the tank member to be rotatable around a rotation axis that is parallel to the tube arrangement direction where the tubes are arranged, and the flow control member is rotated in the tank member to change the ratio between the first number of the tubes in which the fluid flows, and the second number of the tubes in which the fluid does not flow. Even in this case, the air mixing function can be obtained by the flow control member disposed in the tank member of the heating heat exchanger. Specifically, in this case, the flow control member has a hollow-shaped portion opened at one end in the axial direction, and the hollow-shaped portion is provided with an outer periphery facing to one-side top ends of the tubes. Further, the outer periphery of the hollow-shaped portion has a seal surface for closing the one-side top ends of the tubes, and a recess portion for opening the one-side top ends of the tubes. In addition, the recess portion is provided in the hollow-shaped portion to have a spiral shape from one end toward the other end in the axial direction. Preferably, the heating heat exchanger further includes a seal member disposed between the seal surface of the hollow-shaped portion and the one-side top ends of the tubes, and the seal member is disposed to press-contact the seal surface.

Further, a drive shaft is disposed at the other end of the flow control member in the axial direction to protrude to an outside of the tank member, and an operation member is connected to the drive shaft at the outside of the tank member, for driving the drive shaft.

Preferably, the tank member includes an inlet tank for distributing the fluid into the tubes and an outlet tank for collecting the fluid from the tubes, and the flow control member is disposed in at least one of the inlet tank and the outlet tank. More preferably, the heating heat exchanger is one-way flow type in which the fluid flows through the tubes in one way from the inlet tank to the outlet tank. Alternatively, the inlet tank and the outlet tank are disposed at one end side of the core portion to be arranged adjacently in an air flowing direction, and the heating heat exchanger has a connection tank at the other end side of the core portion, opposite to arrangement positions of the inlet tank and the outlet tank. In addition, the inlet tank and the outlet tank are disposed to communicate with the connection tank through the tubes, such that the fluid from the inlet tank flows into the connection tank through the tubes, and flows from the connection tank into the outlet tank through the tubes after being U-turned in the connection tank. Further, the connection tank has therein a plurality of spaces partitioned from each other for each of the tubes arranged in the tube arrangement direction. Even in this case, the temperature of air blown into the passenger compartment can be suitably controlled using the flow control member disposed in at least one of the inlet tank and the outlet tank.

Preferably, a pressure-loss increasing portion is provided in the air conditioning case to increase an air pressure loss around a one tube among all the tubes, in which the fluid firstly flows. Therefore, it can prevent the temperature of air blown into the passenger compartment from being rapidly increased when an opening degree of the flow control member, for opening the tubes, is set at a very small degree from zero. Accordingly, temperature control performance of the vehicle air conditioner can be effectively improved. Alternatively, among all the tubes, one tube into which the fluid firstly flows is disposed at an outermost side in the core portion. Even in this case, the same advantages can be obtained.

Preferably, the heating heat exchanger is disposed in the air conditioning case to form a bypass passage in the air conditioning case at least at one side of the heating heat exchanger such that air flows through the bypass passage while bypassing the heating heat exchanger, and a bypass door is disposed in the air conditioning case for opening and closing the bypass passage.

Preferably, a partition member is disposed in the air conditioning case to partition the air passage at a downstream air side of the heating heat exchanger into a front passage and a rear passage. Further, the flow control member includes a front control part disposed to independently control the temperature of air flowing into the front passage, and a second control part disposed to independently control the temperature of air flowing into the rear passage. Therefore, the air temperature to be blown into a front seat area in the passenger compartment and the air temperature to be blown into a rear seat area in the passenger compartment can be independently controlled.

Preferably, a plurality of ribs are disposed at a downstream air side of the heating heat exchanger in the air conditioning case, for disturbing an air flow from the heating heat exchanger. Therefore, air mixing performance can be improved, and a temperature difference in air blown into the passenger compartment can be reduced. Alternatively, a guide member is disposed at a downstream air side of the heating heat exchanger in the air conditioning case, for guiding one of air from the first area and air from the second area to a side of the other one. Even in this case, the air mixing performance can be improved.

BRIEF DESCRIPTION OF THE DRAWINGS

Additional objects and advantages of the present invention will be more readily apparent from the following detailed description of preferred embodiments when taken together with the accompanying drawings, in which:

FIG. 6A is a front view showing a heater core according to a fourth embodiment of the present invention, FIG. 6B is a side view showing the heater core in FIG. 6A, and FIG. 6C is a plan view showing the heater core in FIG. 6A;

FIG. 13A is a front view showing a heater core according to a ninth embodiment of the present invention, and FIG. 13B is a side view showing the heater core in FIG. 13A;

DETAILED DESCRIPTION OF THE PRESENTLY PREFERRED EMBODIMENTS

Preferred embodiments of the present invention will be described hereinafter with reference to the accompanying drawings.

(First Embodiment)

Figure 1:
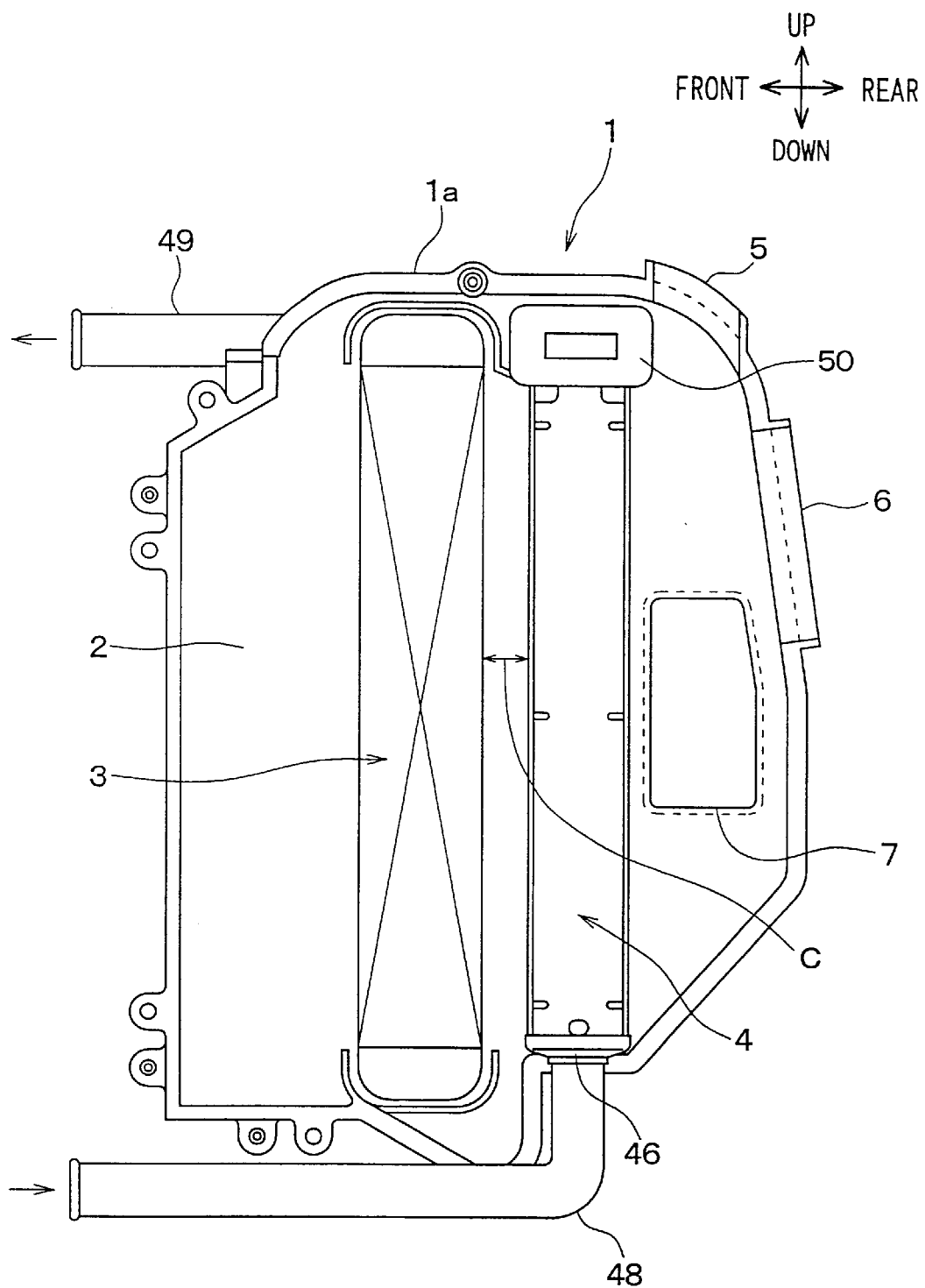
FIG. 1 is a side view showing an air conditioning unit of a vehicle air conditioner, in a condition where a side case part of an air conditioning case is removed, according to a first embodiment of the present invention.

In the first embodiment, an air conditioning unit 1 of a vehicle air conditioner is disposed inside a dashboard approximately at a center in a vehicle right-left direction. Further, the air conditioning unit 1 is disposed to be positioned as shown in FIG. 1 in a vehicle up-down direction and a vehicle front-rear direction. The air conditioning unit 1 includes a resinous air conditioning case 1a defining an air passage through which air flows into a passenger compartment. In the first embodiment, the air conditioning case 1a is partitioned to two portions in the vehicle right-left direction. FIG. 1 shows an attachment surface of a right case member of the air conditioning case 1a after a left case member is removed.

An air inflow space 2 is provided in the air conditioning case 1a at the most front side, and air is blown into the air inflow space 2 by a blower unit (not shown) disposed inside the dashboard offset from the air conditioning unit 1 to a side of a front passenger seat. Here, the blower unit blows air that is selectively introduced from an outside air introduction port for introducing outside air, and an inside air introduction port for introducing inside air. An evaporator 3 and a heater core 4 are disposed in the air conditioning case 1a from its upstream air side to a downstream air side in this order. Further, the evaporator 3 and the heater core 4 are disposed in parallel to each other in the vehicle up-down direction while being separated from each other by a small clearance C of approximate 30 mm. Since each of the evaporator 3 and the heater core 4 is disposed to cover an entire cross section of the air passage in the air conditioning case 1a, all air flowing into the air inflow space 2 passes through both the evaporator 3 and the heater core 4.

The evaporator 3 of a refrigerant cycle is used as a cooling heat exchanger for cooling air in the air conditioning case 1a. In the refrigerant cycle, refrigerant is evaporated in the evaporator 3 by absorbing heat passing through the air conditioning case 1a, so that air is cooled in the evaporator 3. On the other hand, the heater core 4 is used as a heating heat exchanger for heating air in the air conditioning case 1a. The heater core 4 heats air using hot water (engine-cooling water) as a heating source.

Plural air outlet openings 5–7 are provided in the air conditioning case 1a at a downstream air side of the heater core 4 (i.e., at the vehicle rear side). The air outlet openings 5–7 include a defroster opening 5, a face opening 6 and a foot opening 7. The defroster opening 5 is located at an upper portion in the air conditioning case 1a, and is connected to a defroster duct (not shown). Conditioned air is blown from a downstream end of the defroster duct toward an inside surface of a windshield. The face opening 6 is located at the upper portion in the air conditioning case 1a on the vehicle rear side, and is connected to a face duct (not shown). Conditioned air is blown from a downstream end of the face duct toward the upper half body of a passenger in the passenger compartment. The foot opening 7 is located on the right and left side surfaces of the air conditioning case 1a at the vehicle rear side. Conditioned air is blown toward the foot area of a passenger on the front seat through the foot opening 7.

The defroster opening 5 and the face opening 6 are opened and closed by a common air outlet mode door (not shown, DEF/FACE mode door). In the first embodiment, the DEF/FACE mode door is constructed by a resinous film door, thereby reducing the size of the air conditioning case 1a, especially, the size in the vehicle front-rear direction. The foot opening 7 is opened and closed by a foot mode door (not shown) separated from the DEF/FACE mode door. For example, the foot mode door can be constructed by a plate door. The DEF/FACE mode door and the foot mode door are operatively linked to an actuator including a servomotor through a link mechanism (not shown), and the plural air outlet openings 5–7 are opened and closed by the actuator through the air outlet mode doors.

Figure 2:
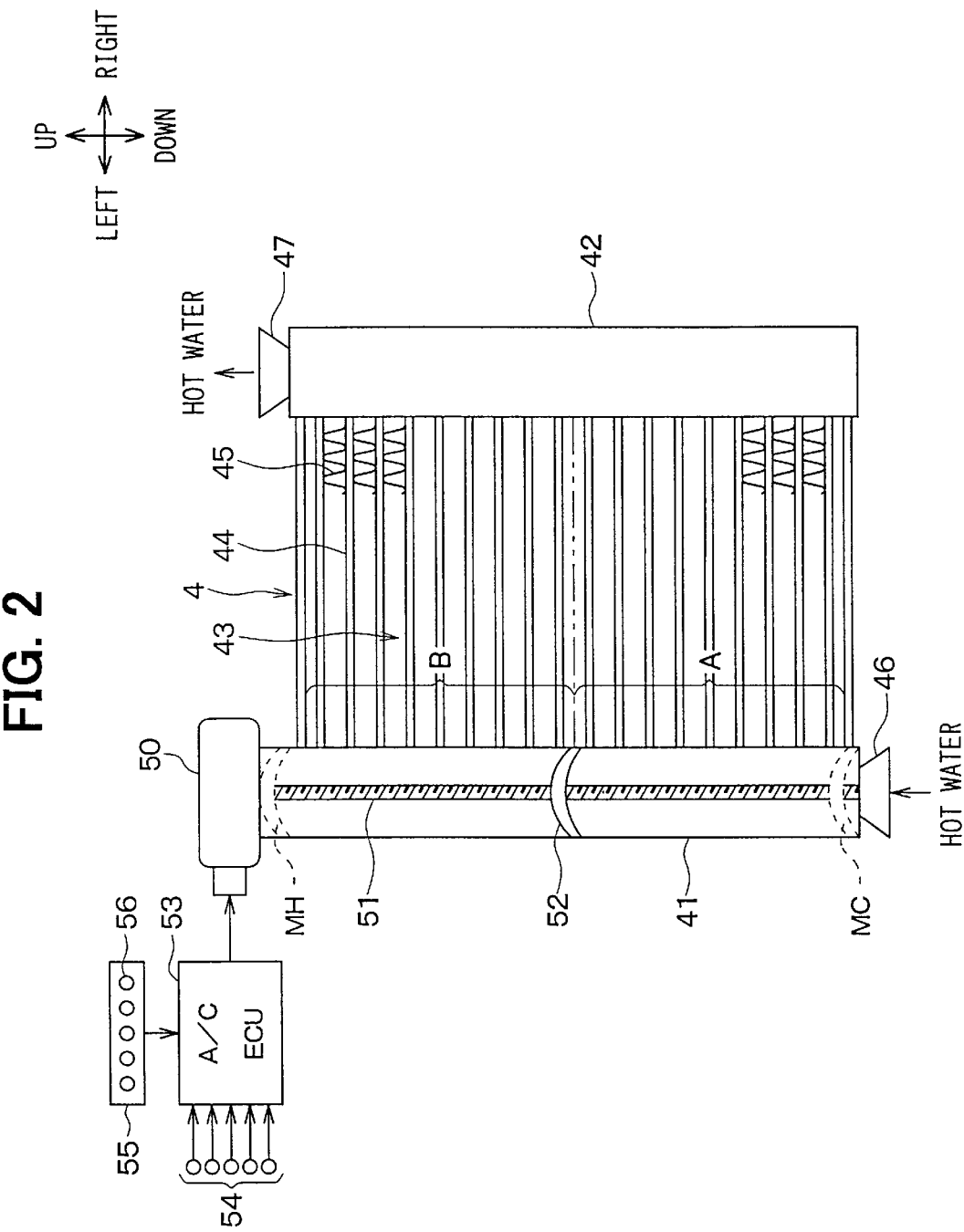
FIG. 2 is a front view showing a heater core of the vehicle air conditioner according to the first embodiment.

In the first embodiment, as shown in FIG. 2, the heater core 4 includes a hot-water inlet tank 41 at one end side in the vehicle right-left direction, and a hot-water outlet tank 42 at the other end side in the vehicle right-left direction. Both of the tanks 41, 42 are disposed to extend in the vehicle up-down direction (vertical direction), and a heat-exchange core portion 43 is disposed between both the tanks 41, 42. In the heat-exchange core portion 43, flat tubes 44 each having a flat cross-section are disposed to extend in the horizontal direction. One end of each flat tube 44 is made to communicate with the inlet tank 41, and the other end of each flat tube 44 is made to communicate with the outlet tank 42. The flat tubes 44 are disposed in parallel with each other, and the corrugate fins 45 are disposed between adjacent two flat tubes 44. Both ends of each flat tube 44 are integrated to both tanks 41, 42, and each flat tube 44 is integrated to each corrugate fin 45, by brazing.

A water inlet 46 is provided in the inlet tank 41 at a lower end, and a water outlet 47 is provided in the outlet tank 42 at an upper end. Therefore, hot water flows from the water inlet 46 into the inlet tank 41, and is distributed into the plural flat tubes 44 of the heat-exchange core portion 43 from the inlet tank 41. Then, the hot water passes through the plural flat tubes 44 in parallel, and flows into the outlet tank 42 to be collected therein. That is, in the first embodiment, the heater core 4 is constructed as a one-way flow heater core where hot water flows in a one direction from the inlet tank 41 to the outlet tank 42. The components 41, 42, 44, 45, 46, 47 of the heater core 4 are made of an aluminum material, and are integrated by the brazing. A water inlet pipe 48 shown in FIG. 1 is connected to the water inlet 46 of the heater core 4, and a water outlet pipe 49 shown in FIG. 1 is connected to the water outlet 47. The water pipes 48, 49 are connected to a hot water circuit of the vehicle engine. Here, a mechanical pump (not shown) driven by a vehicle engine is provided in the hot water circuit, and hot water (cooling water) from the vehicle engine is circulated by the mechanical pump into the heater core 4.

An actuator 50 is attached to the inlet tank 41 at an end opposite to the water inlet 46, that is, at an upper end. The actuator 50 is constructed by a servomotor operated with rotation angles (operation angles) that can be controlled based on an electric signal. A reduction gear (not shown) is engaged with a motor output shaft (not shown) inside the actuator 50, and a screw rotation shaft 51 is rotated by the reduction gear of the actuator 50. The screw rotation shaft 51 is made of a resin or a metal. The screw rotation shaft 51 has a male screw portion on its outer peripheral surface. The screw rotation shaft 51 is disposed to extend along entire length of the inlet tank 41 in its longitudinal direction, that is, in an arrangement direction of the plural flat tubes (in the vehicle up-down direction).

A plate-shaped flow control member 52 is movably disposed in the inlet tank 41, and its center is attached to the screw rotation shaft 51 by screwing. The flow control member 52 moves in the inlet tank 41 linearly in the longitudinal direction of the inlet tank 41. The flow control member 52 partitions an inner space of the inlet tank 41 into two space parts in the longitudinal direction of the inlet tank 41 (tube arrangement direction), and controls a flow of hot water by changing its partition position.

More specifically, the flow control member 52 is formed from a rubber-group elastic material into a plate like corresponding to an approximate elliptical cross-section shape of the inlet tank 41. An outer peripheral portion of the flow control member 52 is elastically pressed to an inner surface of the inlet tank 41, so that the inner space of the inlet tank 41 can be water-tightly partitioned into two space parts. Further, since the cross-section shape of the inlet tank 41 has a non-circular shape such as an approximate elliptical shape, the flow control member 52 is not rotated relative to the inner surface of the inlet tank 41. Therefore, when the screw rotation shaft 51 is rotated, the flow control member 52 moves in the longitudinal direction of the inlet tank 41 due to the screw connection with the screw rotation shaft 51. Thus, the flow control member 52 can be moved to a required position in the inlet tank 41 by controlling a rotation direction of the actuator 50 and a rotation angle thereof.

After the aluminum components 41, 42, 44, 45, 46, 47 of the heater core 4 are assembled to each other by the integral brazing, the screw rotation shaft 51 and the flow control member 52 are attached to the inlet tank 41 from an opening provided at the upper end of the inlet tank 41. Thereafter, the opening at the upper end of the inlet tank 41 is sealed by the actuator 50 through an elastic seal member (not shown).

The rotation direction of the actuator 50 and the rotation angle thereof are controlled by a signal output from an air-conditioning electronic control unit 53 (A/C ECU). The air-conditioning electronic control unit 53 is constructed by a microcomputer and its peripheral circuit, and performs predetermined operations based on a predetermined program to control operations of air-conditioning apparatuses. Detection signals are input to the air-conditioning electronic control unit 53 from a sensor group 54. The sensor group 54 includes plural sensors for detecting an inside air temperature Tr, an outside air temperature Tam, a sunlight amount Ts entering into the passenger compartment, a hot water temperature Tw flowing into the heater core 4, a temperature (post evaporator temperature) Te of air blown from the evaporator 3 and the like. Operation signals are input to the air-conditioning electronic control unit 53 from an operation switch group 56 of an air-conditioning control panel 55 disposed around the dashboard in the passenger compartment. The operation switch group 56 includes a temperature setting switch for generating a temperature setting signal (corresponding to a set temperature Tset), an air blowing amount switch for generating a blowing-amount switching signal, an air outlet mode switch for generating an air outlet mode signal, an inside-outside air introduction switch for generating an inside-outside air switching signal, an air-conditioning switch for generating a compressor ON-OFF signal, an automatic switch for setting an automatic state of air-conditioning control, and the like.

Next, operation of the vehicle air conditioner according to the first embodiment will be described. A target air temperature TAO is calculated by the air-conditioning electronic control unit 53, and is used as a basic control value for performing an automatic air-conditioning control. The target air temperature TAO is an air temperature required for maintaining the air temperature in the passenger compartment at the set temperature Tset set by the temperature setting switch of the air-conditioning control panel 55, regardless of thermal load fluctuation of air-conditioning. The target air temperature TAO is calculated based on the following formula (1).

$$TAO = Kset \times Tset - Kr \times Tr - Kam \times Tam - Ks \times Ts + C \quad (1)$$

wherein, Kset, Kr, Kam and Ks are control gains, and C is a correction constant.

A target partition position SW of the flow control member 52 is calculated based on the following formula (2) using the target air temperature TAO, the post evaporator temperature Te immediately after the evaporator 3, and the hot water temperature Tw flowing into the heater core 4.

$$SW = [(TAO - Te)/(Tw - Te)] \times 100 (\%) \quad (2)$$

In the formula (2), the target partition position SW of the flow control member 52 is indicated by percentage such that the target partition position SW is 0% at a maximum cooling position (i.e., broken line position MC at the lower end in FIG. 2) of the flow control member 52, and the target partition position is 100% at a maximum heating position (i.e., broken line position MH at the upper end in FIG. 2) of the flow control member 52.

When the calculated target partition position SW of the flow control member 52 is 0% (maximum cooling position) in the air-conditioning electronic control unit 53, the rotation direction of the actuator 50 (screw rotation shaft 51) and the rotation angle thereof are determined based on signals output from the air-conditioning electronic control unit 53. Then, the screw rotation shaft 51 is rotated by the actuator 50, and the flow control member 52 moves to the lower end position MC shown in FIG. 2. Thus, the flow control member 52 closes a passage at the lower end (water inlet 46) of the inlet tank 41 of the heater core 4. As a result, no hot water flows in all the flat tubes 44 of the heater core 4, and air is not heat-exchanged with hot water in an entire air passage area (clearance portions between the flat tubes 44 and the corrugate fins 45) of the heat-exchange core portion 43. That is, the entire air passage area of the heat-exchange core portion 43 functions as a cool air passage through which air cooled by the evaporator 3 (cool air) passes while being not heated.

When the calculated target partition position SW of the flow control member 52 is a value between 0% (maximum cooling position MC) and 100% (maximum heating position MH), the rotation direction of the actuator 50 (screw rotation shaft 51) and the rotation angle thereof are determined based on signals output from the air-conditioning electronic control unit 53. Then, the screw rotation shaft 51 is rotated by the actuator 50, and the flow control member 52 moves to a position between the maximum cooling position MC and the maximum heating position MH. For example, the flow control member moves to the intermediate position indicated by the solid line in FIG. 2. In this case, since the water inlet 46 of the inlet tank 41 of the heater core 4 is opened, hot water flows into the inlet tank 41 by the hot water pump (not shown) through the inlet pipe 48 and the water inlet 46. Since the inner space of the inlet tank 41 is partitioned by the flow control member 52 into the upper and lower space parts, hot water flows into the flat tubes 44 not in an area B higher than the flow control member 52 (at a side of the water outlet 47) but only in an area A lower than the flow control member 52 (at a side of the water inlet 46).

Accordingly, the air passage of the heat-exchange core portion 43 in the area A lower than the flow control member 52 functions as a hot air passage where air is heated by hot water. Further, the air passage in the area B higher than the flow control member 52 functions as the cool air passage through which cool air only passes while being not heated. The partition position of the flow control member 52 is controlled based on the signals output from the air-conditioning electronic control unit 53. Therefore, a flow amount ratio between hot air passing through the area A and cool air passing through the area B can be controlled in the heater core 4, thereby controlling the temperature of air blown into the passenger compartment at the target air temperature TAO. Accordingly, the temperature adjusting function in an air mixing system can be obtained without using an air mixing door. Further, since the temperature adjusting function can be obtained by adjusting the partition position of the flow control member 52 contained in the inlet tank 41, it is unnecessary to provide an air mixing door in the air conditioning case 1 outside the heater core.

Thus, as shown in FIG. 1, the heater core 4 can be disposed at a downstream air side of the evaporator 3, in parallel with the evaporator, and adjacent to the evaporator 3. Therefore, the size of the air conditioning unit 1 can be largely reduced in the vehicle front-rear direction, in the first embodiment. Further, since cool air can be made to pass through the heater core 4 while being not heated, it is unnecessary to provide a cool air bypass passage in the air conditioning case 1a outside the heater core 4. Therefore, the size of the heater core 4 can be enlarged to the size of the evaporator 3 while the air mixing function can be obtained. As a result, a pressure loss during a heating operation can be largely reduced than a general air mixing system where a cool-air bypass passage is provided outside the heater core 4, thereby largely increasing an air flowing amount during the heating operation.

Since both of cool air and hot air pass through the air passage in the heater core 4, the cool air and the hot air flow adjacent to each other at the downstream air side of the heater core 4, thereby increasing a contact area between the cool air and the hot air. Therefore, mixing performance between the cool air and the hot air is further improved, a mixing chamber for mixing the cool air and the hot air can be reduced. Accordingly, the size of the air conditioning unit 1 can be further reduced.

Figure 3:
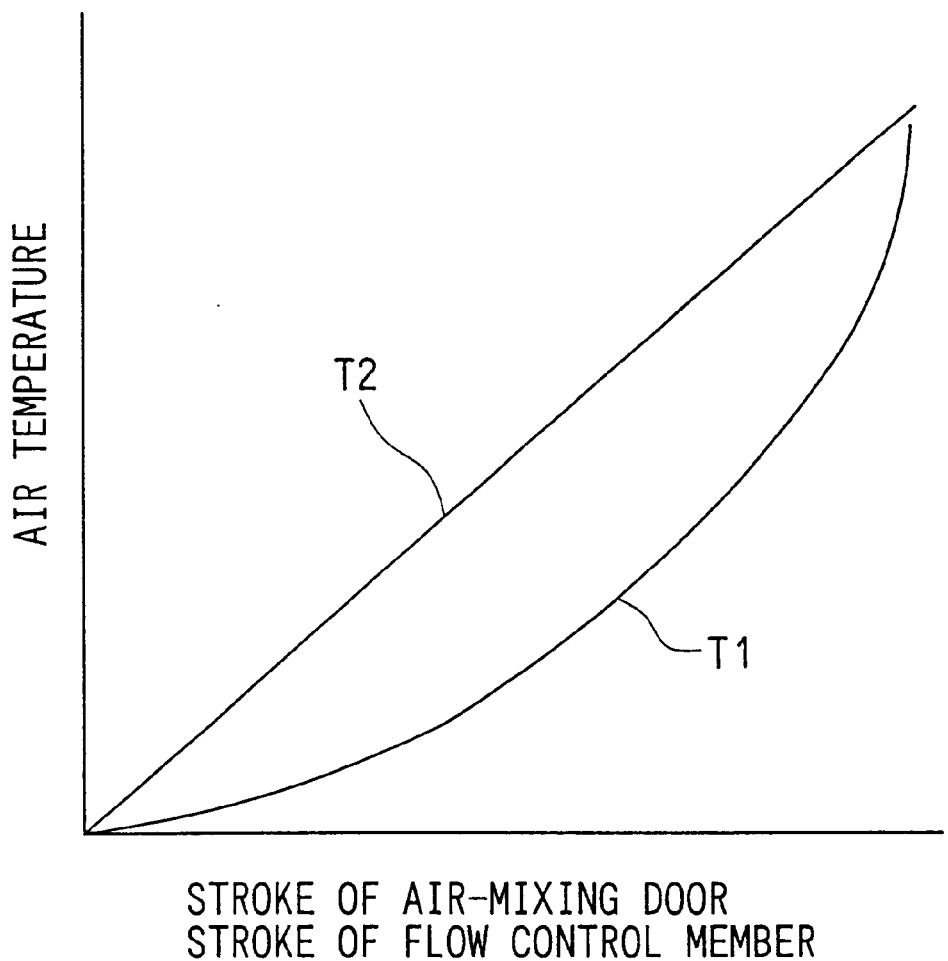
FIG. 3 is a control characteristic graph showing a relationship between an air temperature to be blown into a passenger compartment and an open degree of an air mixing door in a comparison example, and a relationship between the air temperature and a displacement stroke of a flow control member according to the first embodiment.

Further, the temperature adjusting function is also improved In a general air mixing system using the air mixing door, a flow amount ratio between the hot air passing through the heater core and the cool air passing through a cool-air bypass passage provided outside the heater core is controlled by the air mixing door. Therefore, in the general air mixing system, the flow amount of hot air is reduced as compared with the flow amount of cool air. In FIG. 3, I1 shows the air temperature blown into the passenger compartment in the general air mixing system using the air mixing door. In this case, the air temperature is not changed proportional to an operation stroke (open degree) of the air mixing door, and the T1 is curved in an arc shape to a lower side. Thus, linearly temperature-controlling characteristics is reduced.

On the other hand, T2 shows the air temperature blown into the passenger compartment in the first embodiment, and is changed in proportion to the operation stroke of the flow control member 52. That is, according to the first embodiment, the air passage of the heat-exchange core portion 43 is divided into a hot air passage portion (i.e., area A at the lower side of the flow control member 52) where air is heated, and a cool air passage portion (i.e., area B at the upper side of the flow control member 52) where cool air passes as it is while being not heated. Therefore, the pressure loss in the hot air passage potion is identical to that in the cool air passage portion. Accordingly, the air temperature to be blown into the passenger compartment can be made proportional to the operation stroke (partition position) of the flow control member 52 as indicated by the line T2 in FIG. 3, thereby readily accurately controlling the air temperature.

(Second Embodiment)

Figure 4:
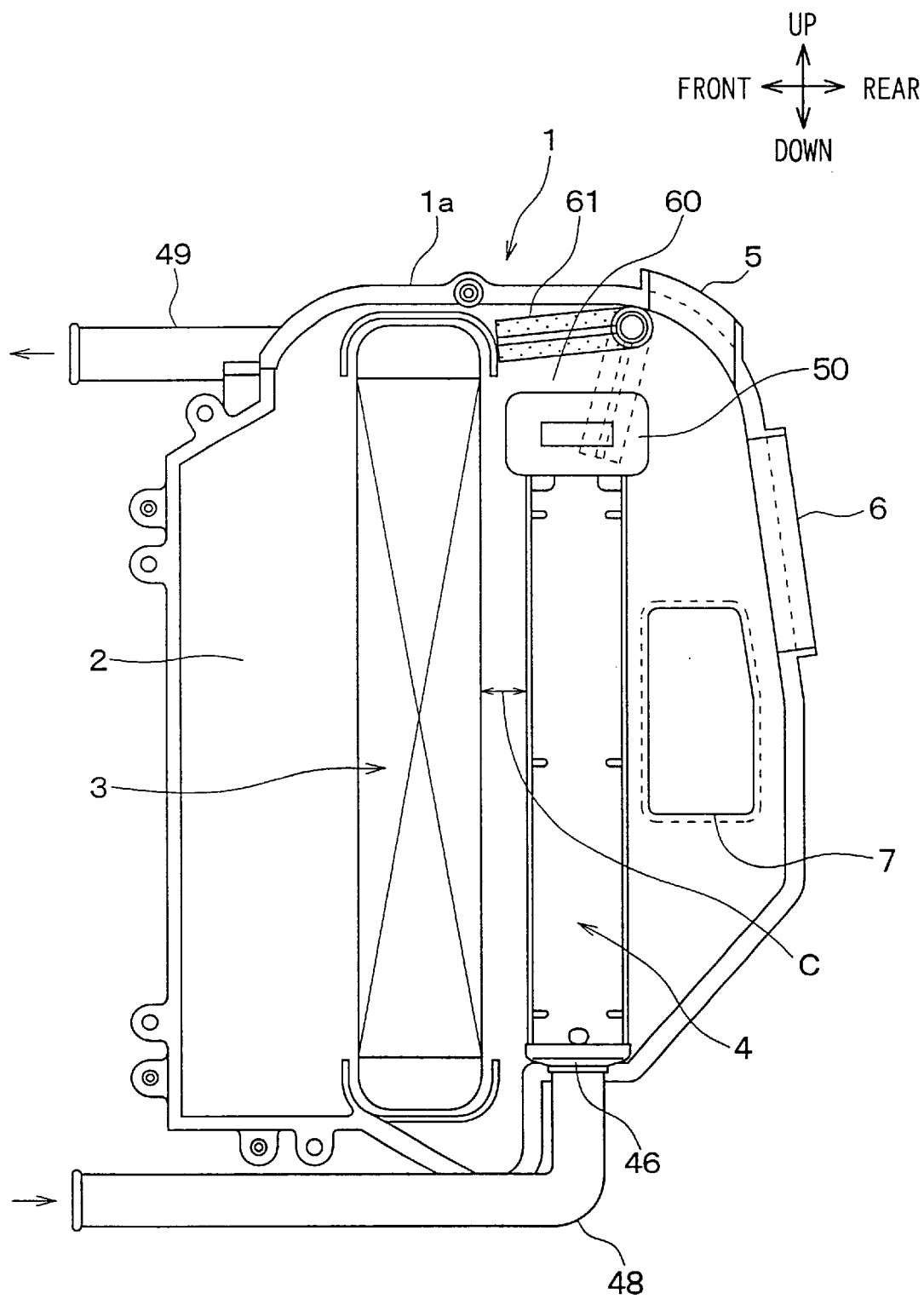
FIG. 4 is a side view showing an air conditioning unit in a condition where a side case part of an air conditioning case is removed, according to a second embodiment of the present invention.

In the above-described first embodiment, the heater core 4 is disposed to cross the entire section area of the air passage in the air conditioning case 1a so that all air from the evaporator 3 passes through the heater core 4. However, in the second embodiment, as shown in FIG. 4, the height of the heater core 4 is made smaller than that of the evaporator 3, and a cool-air bypass passage 60 is provided above the heater core 4 in the air conditioning case 1a. The cool-air bypass passage 60 is opened and closed by a bypass door 61, and the bypass door 61 is driven by an actuator (not shown) controlled by the air-conditioning electronic control unit 53. When the cool-air bypass passage 60 is opened by the bypass door 61, cool air having passed through the evaporator 3 can be directly introduced to at least one of the defroster opening 5 and the face opening 6 through the cool-air bypass passage 60.

In an air outlet mode such as a foot/defroster mode where the defroster opening 5 and the foot opening 7 are opened at the same time and a bi-level mode where the face opening 6 and the foot opening 7 are opened at the same time, air is blown into the passenger compartment at both of the upper and lower sides at the same time. In this air outlet mode, an amount of cool air, introduced to the defroster opening 5 or the face opening 6, is adjusted by adjusting the open degree of the bypass door 61, so that the air temperature to be blown to the upper side in the passenger compartment and the air temperature to be blown to the lower side in the passenger compartment can be independently controlled.

In the second embodiment, the structure of the heater core 4 is similar to that in the above-described first embodiment, and detail description thereof is omitted. In the second embodiment, because the heater core 4 can be divided into the air-heating area and the non air-heating area, the sectional area of the cool-air bypass passage can be made smaller.

(Third Embodiment)

Figure 5:
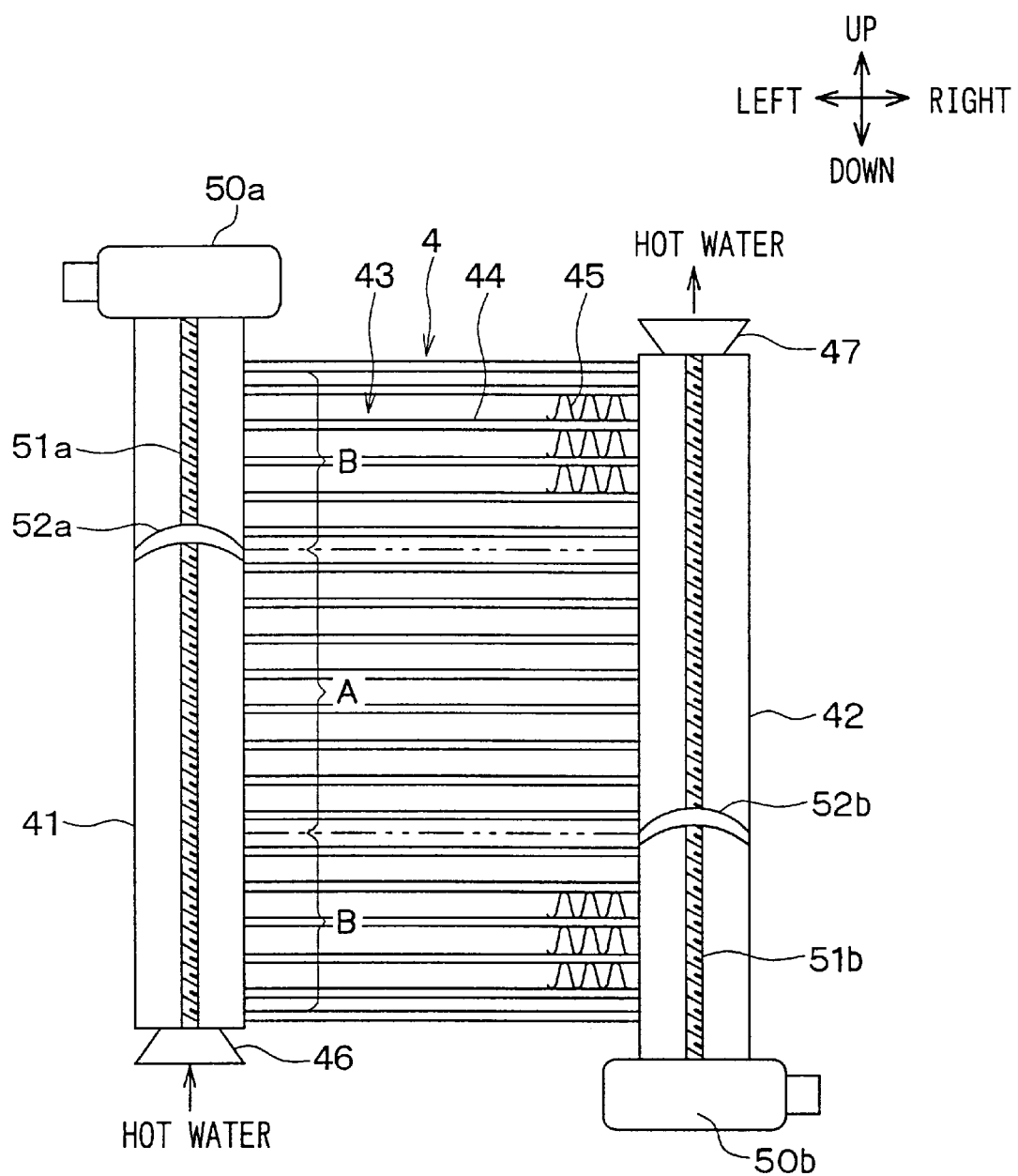
FIG. 5 is a front view showing a heater core according to a third embodiment of the present invention.

In the above-described first and second embodiments, the flow control member 52 is movably disposed only in the inlet tank 41 of the heater core 4. However, in the third embodiment, as shown in FIG. 5, two flow control members 52a, 52b are movably disposed in the inlet tank 41 and the outlet tank 42 of the heater core 4, respectively. Therefore, two actuators 50a, 50b and two screw rotation shafts 51a, 51b are disposed for the flow control members 52a, 52b, respectively.

Accordingly, in the third embodiment, the flow control members 52a, 52b can be independently moved to desired positions by the actuators 50a, 50b, respectively. Therefore, the flow amount ratio between the hot air and the cool air, that is, the number ratio between the water-flowing flat tubes 44 where hot water flows and the non-water-flowing flat tubes 44 where no hot water flows can be adjusted as in the first embodiment. In addition to this function, the positions of the water-flowing flat tubes 44 where hot water flows can be arbitrarily set.

For example, as shown in FIG. 5, a first tube area (hot air passage portion) A where hot water flows is set in the heat-exchange core portion 43 of the heater core 4 at a center area in the up-down direction. Further, a second tube area (cool air passage portion) B where no hot water flows is set at the upper and lower sides of the tube area A in the heat-exchange core portion 43 of the heater core 4. Therefore, a three-layer flow, where a hot air stream is sandwiched between the two cool air streams, can be formed, thereby increasing a contact area between the hot air and the cool air, and improving mixing performance therebetween.

In an air outlet mode where air is blown into the passenger compartment at both the upper and lower sides at the same time, for example, in the foot/defroster mode or the bi-level mode, a temperature difference between air blown toward the upper side in the passenger compartment and air blown toward the lower side in the passenger compartment can be arbitrarily set by adjusting positions of the flow control members 52a, 52b.

In the third embodiment, the heater 4 can be disposed in the air conditioning case 1a as in the first embodiment shown in FIG. 1, or can be disposed in the air conditioning case 1a as in the second embodiment shown in FIG. 4.

(Fourth Embodiment)

In the above-described first to third embodiments, hot water flows in one way from the inlet tank 41 to the outlet tank 42. However, in the fourth embodiment, hot water flows in the heater core 4 while being turned in a U-shape in an air flow direction D, as shown in FIGS. 6A–6C. Specifically, the inlet tank 41 and the outlet tank 42 are disposed at one end side of the heater core 4 in the vehicle right-left direction, to be arranged adjacent to each other in the air flow direction D. As shown in FIGS. 6B, 6C, the outlet tank 42 is disposed at an upstream side of the inlet tank 41 in the air flow direction D, thereby improving heat-exchange efficiency between air and hot water. Here, the flat tubes 44 are composed of plural first tubes 44a disposed at a downstream air side to communicate with the inlet tank 41, and plural second tubes 44b disposed at an upstream air side of the first tubes to communicate with the outlet tank 42.

In the heater core 4, a connection tank 62 for the U-turn of hot water is disposed at the other side of the heat-exchange core portion 43 in the vehicle right-left direction. As shown in FIG. 6C, both of the first flat tubes 44a and the second flat tubes 44b are disposed in parallel to each other in the air flow direction D, respectively. One ends of the first flat tubes 44a at the downstream air side communicate with the inlet tank 41, and the other ends thereof communicate with the connection tank 62. One ends of flat tubes 44b at the upstream air side communicate with the outlet tank 42, and the other ends thereof communicate with the connection tank 62.

A partition portion 62a is provided in the connection tank 62 for every pair of the first and second flat tubes 44a, 44b adjacent to each other in the air flow direction. Therefore, hot water flowing in the flat tubes 44a, 44b adjacent to each other in the longitudinal direction of the connection tank 62 (up-down direction) is U-turned without being mixed with each other in the connection tank 62. Similarly to the first embodiment, the screw rotation shaft 51 driven by the actuator 50 and the flow control member 52 connected to the screw rotation shaft 51 by the screwing are disposed in the inlet tank 51.

Also, in the fourth embodiment, a ratio of the first tube area (hot-air passage portion) A to the second tube area (cool-air passage portion) B is adjusted by displacing the flow control member 52 in the tank longitudinal direction. Therefore, the air temperature to be blown into the passenger compartment can be adjusted by adjusting the position of the flow control member 52, similarly to the above-described first embodiment. Further, since the heater core 4 is constructed so that hot water U-turns at upstream and downstream sides in the air flow direction D, the water inlet 46 and the water outlet 47 are collectively disposed at one side of the heater core 4 in the right-left direction. Therefore, the water pipes 48, 49 (FIGS. 1, 4) can be readily arranged relative to the heater core 4.

Even in the fourth embodiment, the flow control members 52a, 52b described in the third embodiment (FIG. 5) can be movably disposed in the inlet tank 41 and the outlet tank 42, respectively. In this case, since the actuators 50a, 50b are disposed adjacent to each other, electric wiring can be readily arranged for the actuators 50a, 50b. Accordingly, mounting performance of the heater core 4 to the air conditioning case 1a can be improved, and an exchange operation of the heater core 4 can be readily performed after the air conditioner is mounted on the vehicle.

(Fifth Embodiment)

In the third embodiment, the flow control members 52a, 52b are movably disposed in the inlet tank 41 and the outlet tank 42, respectively, and the three-layer air flow where the hot air is between the upper cool air and the lower cool air is formed. However, in the fifth embodiment, the three-layer air flow is formed only by using the one flow control member 52.

Figure 8:
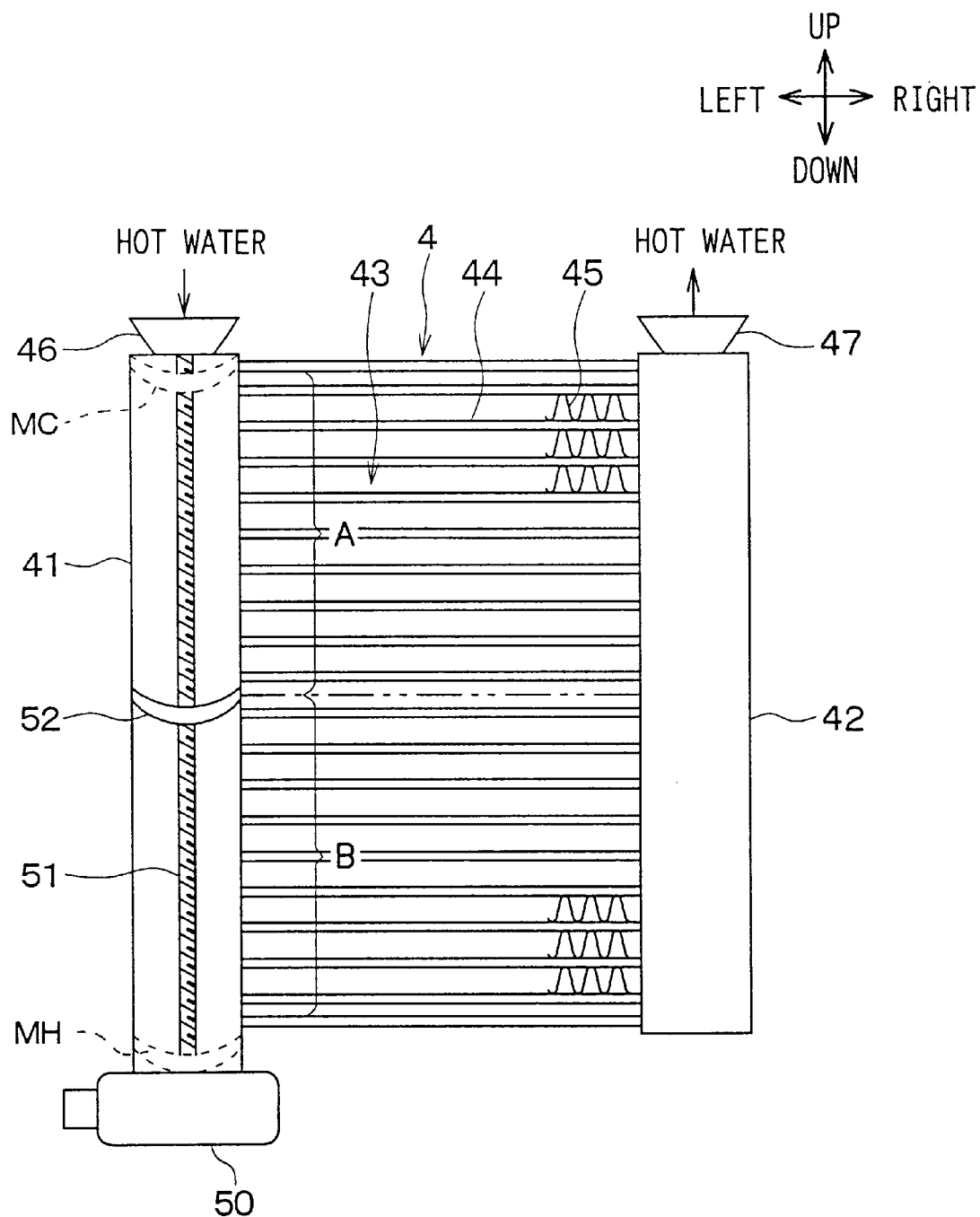
FIG. 8 is a front view showing a heater core according to the fifth embodiment.

Specifically, as shown in FIG. 8, the heater core 4 is constructed as the one-way flow heater core where hot water flows in one direction from the inlet tank 41 to the outlet tank 42 as in the first embodiment (FIG. 2). However, in the fifth embodiment, the water inlet 46 is provided on the inlet tank 41 at the upper end. That is, in the fifth embodiment, both of the water inlet 46 and the water outlet 47 are provided at the upper end of the heater core 4. As shown in FIG. 8, the flow control member 52 is provided only in the inlet tank 41 of the heater core 4, and the actuator 50 for moving the flow control member 52 through the screw rotation shaft 51 is provided at the lower end of the inlet tank 41.

Figure 7:
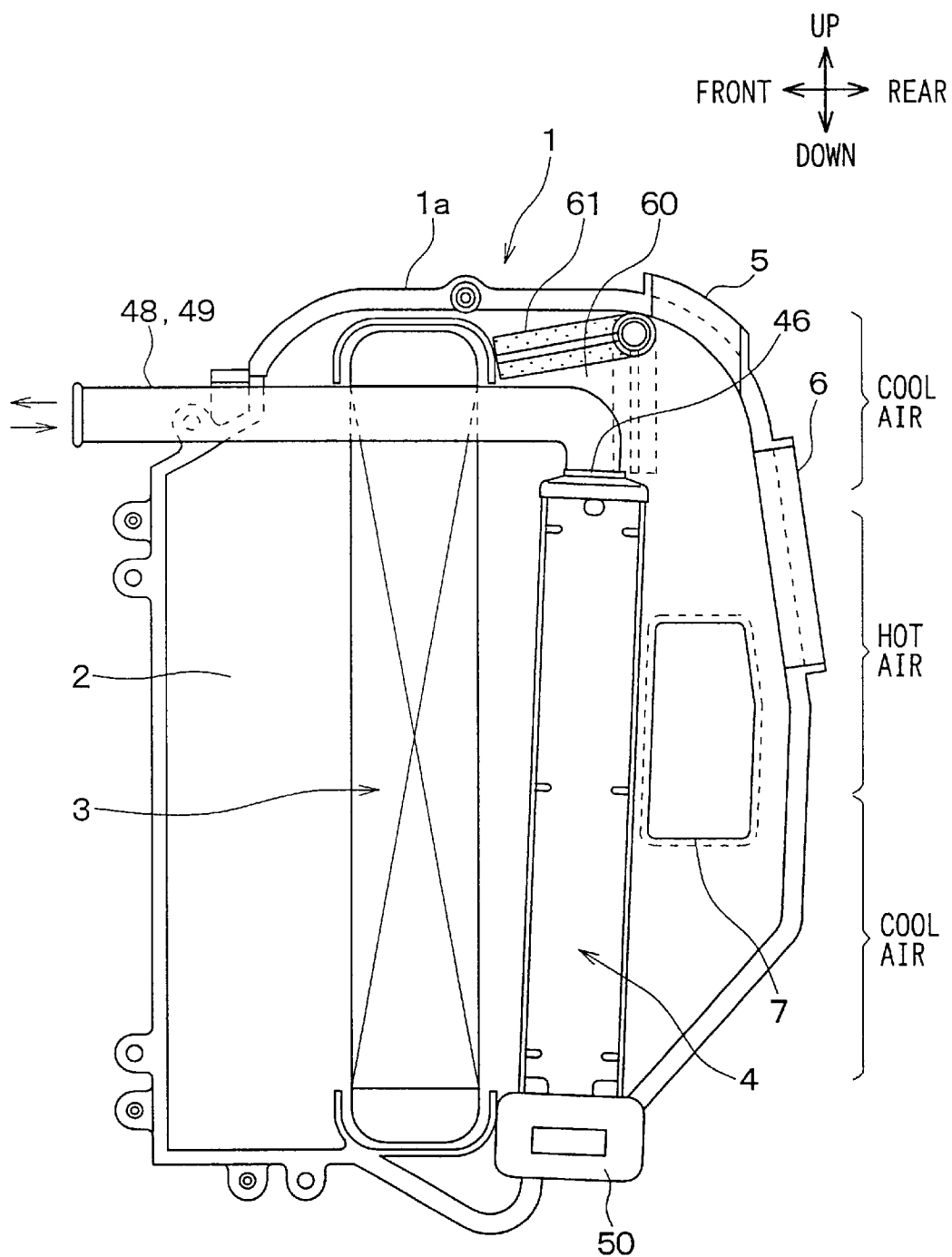
FIG. 7 is a side view showing an air conditioning unit in a condition where a side case part of an air conditioning case is removed, according to a fifth embodiment of the present invention.

In addition, in the fifth embodiment, the height of the heater core 4 is made smaller than that of the evaporator 3 as in the second embodiment (FIG. 4), and the cool-air bypass passage 60 described in the second embodiment is provided above the heater core 4 as shown in FIG. 7. The cool-air bypass passage 60 is opened and closed by the bypass door 61, and the bypass door 61 is driven by an actuator (not shown) controlled by the air-conditioning electronic control unit 53.

In the fifth embodiment, the bypass door 61 is controlled by the air-conditioning electronic control unit 53, to be operatively linked with the position control of the flow control member 52. Specifically, when the flow control member 52 is moved at the upper end, that is, at the maximum cooling position MC in FIG. 8, the bypass door 61 is operated at a fully open position indicated by solid lines in FIG. 7. When the flow control member 52 moves from the maximum cooling position MC at the upper end in FIG. 8 to a lower side position, the open degree of the bypass door 61 is reduced with this movement of the flow control member 52. When the flow control member 52 reaches the lower end, that is, the maximum heating position MH in FIG. 8, the bypass door 61 is rotated to a fully close position indicated by broken lines in FIG. 7 with the movement of the flow control member 52.

When the flow control member 52 moves to the intermediate position indicated by solid lines in FIG. 8, the bypass door 61 is operated to a predetermined position with an intermediate open degree. Therefore, hot air passes through the upper area (hot-air passage portion) A of the heater core 4, and cool air passes through the lower area (cool-air passage portion) B of the heater core 4. Simultaneously, cool air passes through the cool-air bypass passage 60 provided above the heater core 4. Accordingly, the three-layer air flow, where the hot air is sandwiched between the upper cool air and the lower cool air, can be formed, thereby improving mixing performance between the hot air and the cool air.

When the opening degree of the bypass door 61 is controlled independently with the operation position control of the flow control member 52, the air temperature blown toward the upper side in the passenger compartment and the air temperature blown toward lower side in the passenger compartment can be independently controlled in an air outlet mode such as the foot/defroster mode and the bi-level mode. That is, the cool-air bypass passage 60 and the bypass door 61 can be used not only for improving mixing performance, but for independently controlling the air temperatures blown toward the upper and lower sides in the passenger compartment.

(Sixth Embodiment)

Figure 9B:
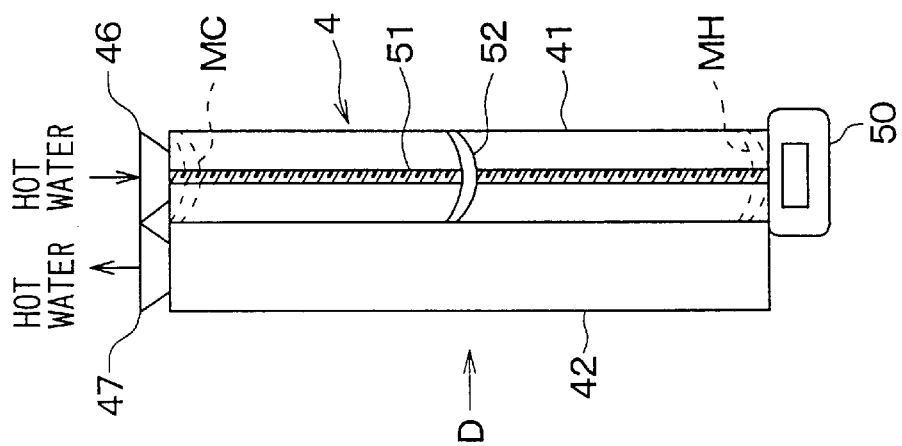
FIG. 9B is a side view showing the heater core in FIG. 9A.
Figure 9A:
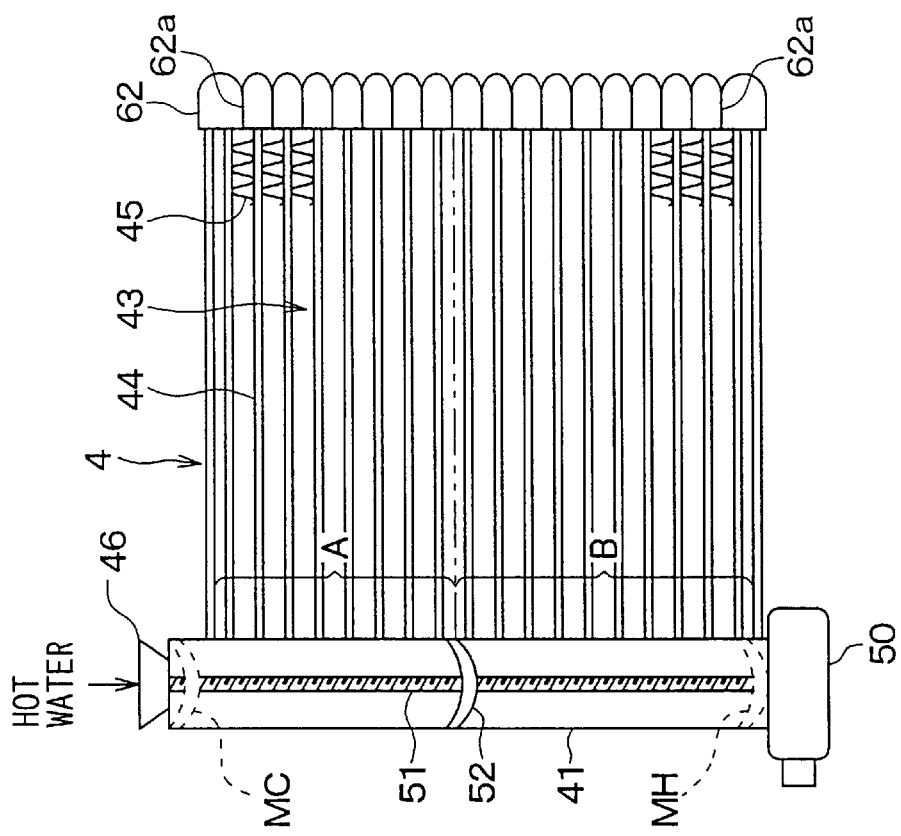
FIG. 9A is a front view showing a heater core according to a sixth embodiment of the present invention.

In the above-described fifth embodiment, the heater core 4 is constructed as the one-way flowing type where hot water flows in one direction from the inlet tank 41 to the outlet tank 42. However, in the sixth embodiment, the heater core 4 is a U-turn type heater core where hot water U-turns in the air flow direction D as in the fourth embodiment (FIGS. 6A–6C). As shown in FIGS. 9A, 9B, in the sixth embodiment, although the U-turn type heater core is used as the heater core 4, the water inlet 46 is located at the upper end of the inlet tank 41, and the actuator 50 is provided at the lower end of the inlet tank 41, differently from the fourth embodiment (FIG. 6).

According to the sixth embodiment, in the U-turn type heater core 4, the hot-air passage portion in which hot water flows can be provided in the upper area A in the heat-exchange core portion 43 of the heater core 4, and the cool-air passage portion in which no hot water flows can be provided in the lower area B thereof. Accordingly, when the heater core 4 shown in FIGS. 9A, 9B is mounted in the air conditioning case 1a as shown in FIG. 7, the three-layer air flow, where the hot air flow is sandwiched between the upper cool air flow and the lower cool air flow, can be formed, thereby improving mixing performance between the hot air and the cool air. Therefore, in the sixth embodiment, the same operational effects as in the fifth embodiment can be obtained while the function of the U-turn type heater core can be obtained as in the fourth embodiment.

(Seventh Embodiment)

Figure 10:
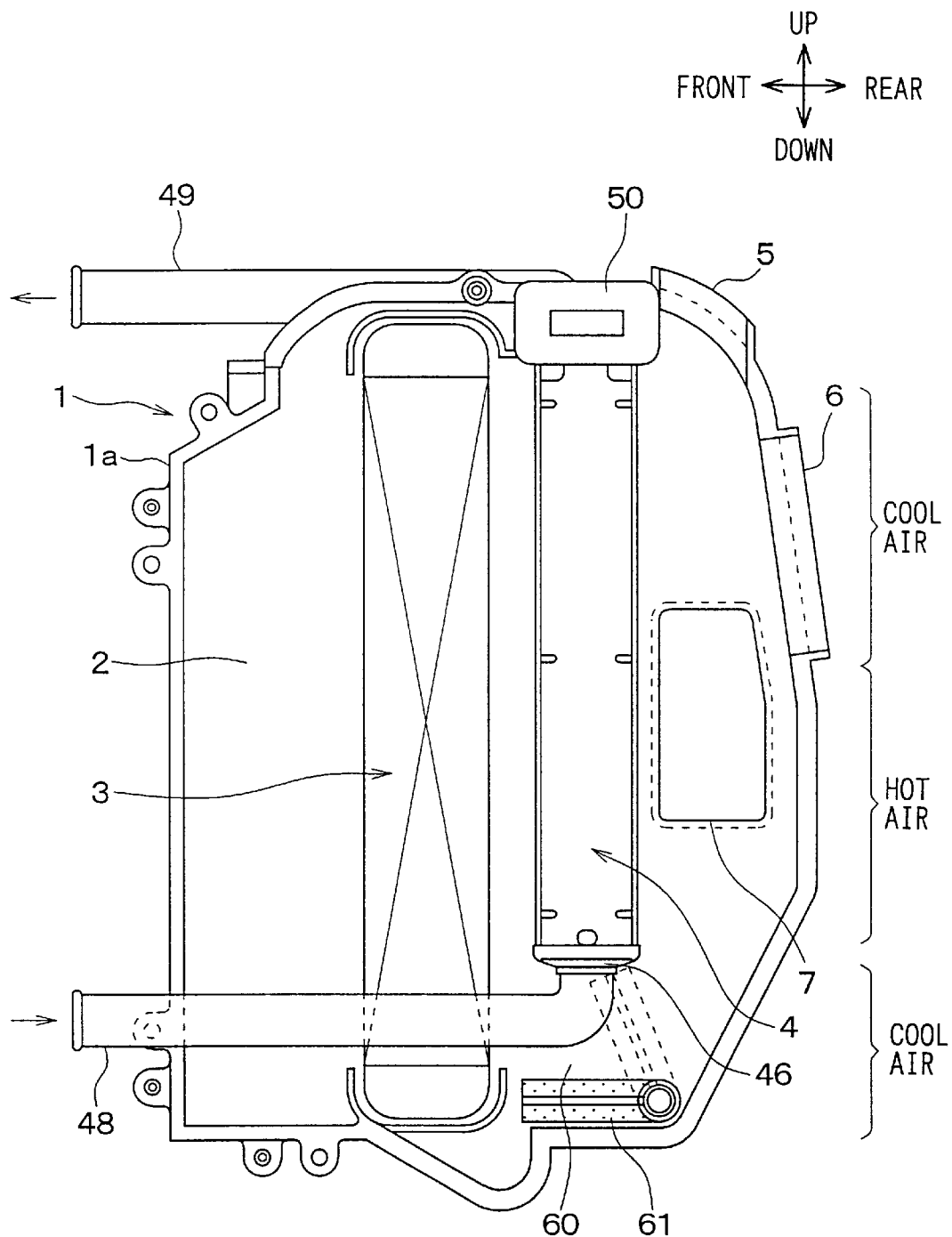
FIG. 10 is a side view showing an air conditioning unit in a condition where a side case part of an air conditioning case is removed, according to a seventh embodiment of the present invention.

In the above-described fifth embodiment, the cool-air bypass passage 60 and the bypass door 61 for opening and closing the cool-air bypass passage 60 are provided above the heater core 4 as shown in FIG. 7. However, in the seventh embodiment, as shown in FIG. 10, the cool-air bypass passage 60 and the bypass door 61 are provided below the heater core 4. In the seventh embodiment, any one of the one-way type heater core as in the first embodiment (FIG. 2) and the U-turn type heater core as in the fourth embodiment (FIGS. 6A–6C) can be used as the heater core 4. That is, it is required that the hot-air passage area A is provided at the lower side in the heat-exchange core portion 43 of the heater core 4, and the cool-air passage area B is provided at the upper side therein. Accordingly, as shown in FIG. 10, the three-layer air flow can be formed, even when the cool-air bypass passage 60 is provided below the heater core 4. Thus, the mixing performance between the hot air and the cool air can be improved due to the three-layer air flow.

Further, in the seventh embodiment, the bypass door 61 can be controlled by the air-conditioning electronic control unit 53, to be operatively linked with the operation position control of the flow control member 52 as in the fifth embodiment. Alternatively, in the seventh embodiment, the open degree of the bypass door 61 can be independently controlled with the operation position control of the flow control member 52. In this case, the air temperature blown toward the upper side of the passenger compartment and the air temperature blown toward the lower side of the passenger compartment can be independently controlled in an air outlet mode where air is blown toward both the upper and lower sides in the passenger compartment, such as the foot/defroster mode and the bi-level mode.

(Eighth Embodiment)

Figure 11:
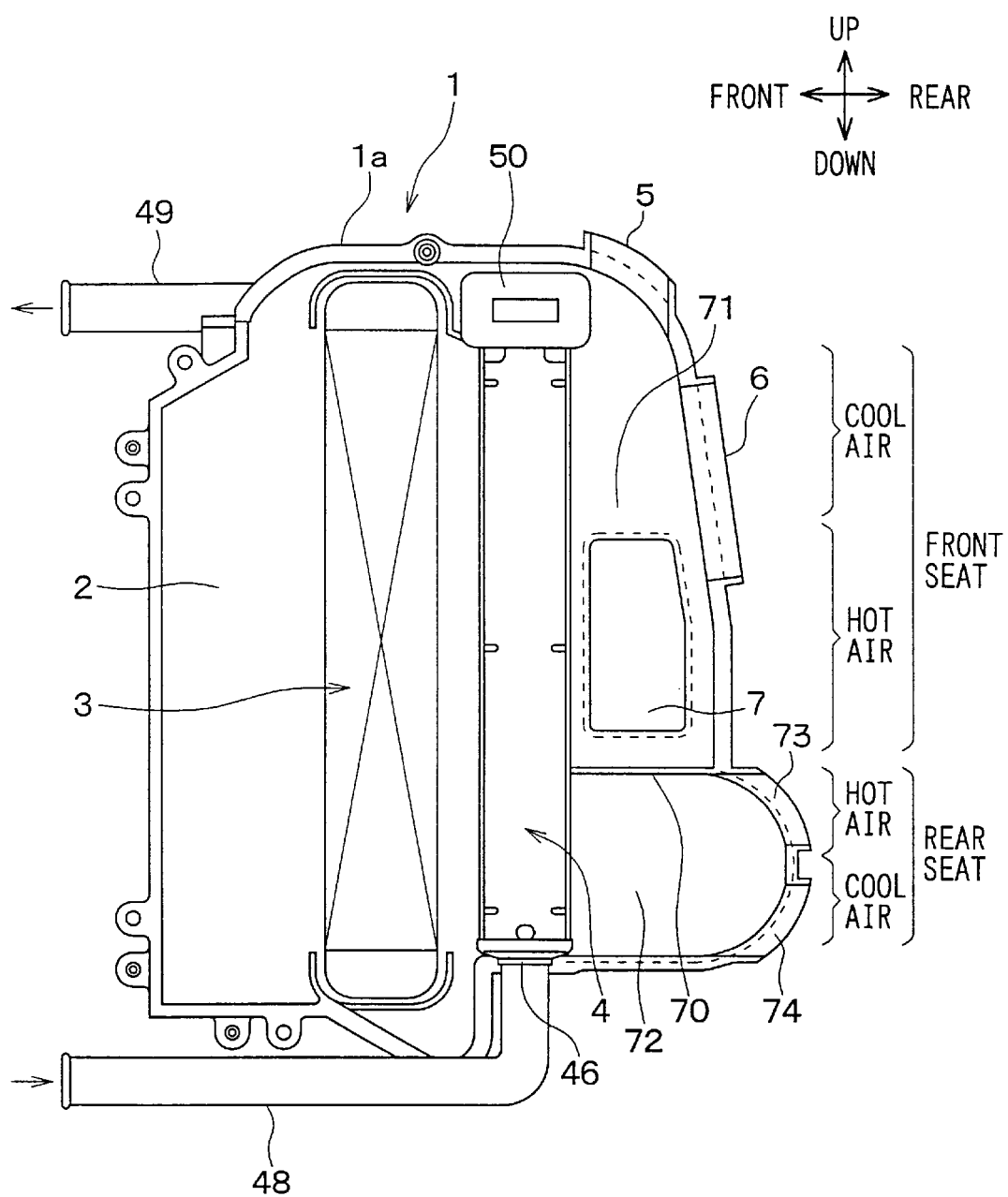
FIG. 11 is a side view showing an air conditioning unit in a condition where a side case part of an air conditioning case is removed, according to an eighth embodiment of the present invention.

In the eighth embodiment of the present invention, the temperature of air blown to a front seat side in the passenger compartment and the temperature of air blown to a rear seat side in the passenger compartment can be independently controlled. As shown in FIG. 11, a partition plate 70 is provided at a downstream air side (i.e., at the vehicle rear side) of the heater core 4, for partitioning the air passage of the air conditioning case 1a at the downstream air side of the heater core 4 into upper and lower passages. The partition plate 70 can be molded integrally together with the air conditioning case 1a, or the partition plate 70 can be attached to the air conditioning case 1a by bonding and the like after being formed separately from the air conditioning case 1a.

A front seat air passage 71 is provided above the partition plate 70, so that air is blown from the face opening 6, the foot opening 7 and the defroster opening 5 toward the front seat side in the passenger compartment, through the front seat air passage 71. A rear seat air passage 72 is provided under the partition plate 70, so that air is blown from a rear face opening 73 and a rear foot opening 74 toward the rear seat side in the passenger compartment, through the rear seat air passage 72. A rear-seat face duct (not shown) is connected to the rear face opening 73, so that air is blown from a downstream end of the rear-seat face duct toward the face side of a passenger seated on the rear seat in the passenger compartment. A rear-seat foot duct (not shown) is connected to the rear foot opening 74, so that air is blown from a downstream end of the rear-seat foot duct toward the foot side of the passenger seated on the rear seat in the passenger compartment. The rear face opening 73 and the rear foot opening 74 are alternately opened and closed by a rear air-outlet mode door (not shown).

Figure 12:
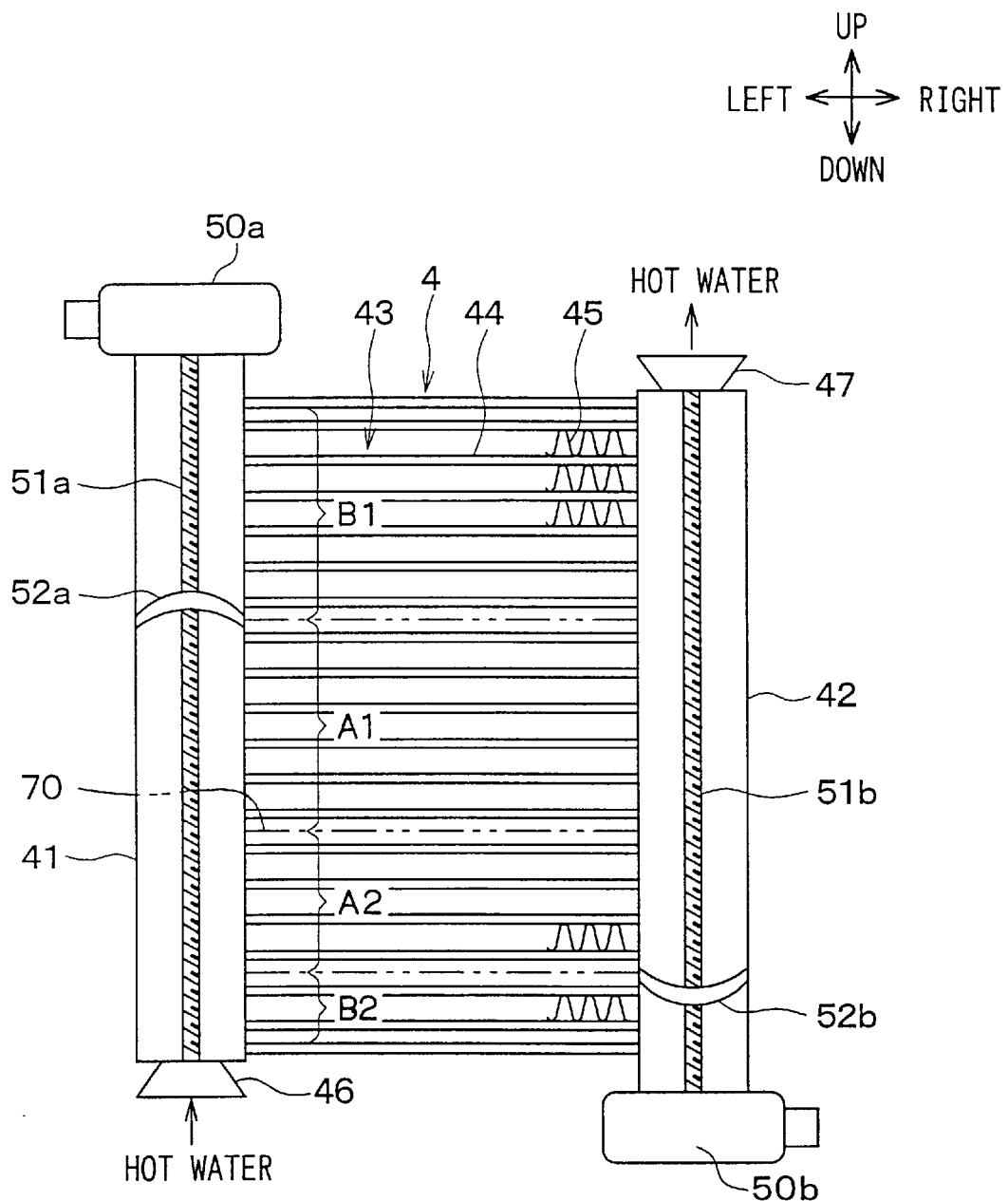
FIG. 12 is a front view showing a heater core according to the eighth embodiment.

In the eighth embodiment, as shown in FIG. 12, the heater core 4 is constructed as the one-way flow type where hot water flows in one direction from the inlet tank 41 to the outlet tank 42 as in the third embodiment (FIG. 5). Further, similarly to the third embodiment, the flow control members 52a, 52b are disposed in the inlet tank 41 and the outlet tank 42, respectively. However, in the eighth embodiment, the flow control member 52a in the inlet tank 41 is used for controlling a temperature of air blown to the front seat side, and the flow control member 52b in the outlet tank 42 is used for controlling a temperature of air blown to the rear seat side. That is, in the eighth embodiment, since the front seat air passage 71 is provided in an upper space at the downstream air side of the heater core 4, a ratio of a hot-air passage area A1 at the front seat side to a cool-air passage area B1 at the front seat side can be adjusted by moving the flow control member 52a in the inlet tank 41 in the up-down direction within an area of the front seat air passage 71. Thus, the air temperature blown toward the front seat side in the passenger compartment can be controlled by the flow control member 52a.

Further, since the rear seat air passage 72 is provided in an lower space at the downstream air side of the heater core 4, a ratio of a hot-air passage area A2 at the rear seat side to a cool-air passage area B2 at the rear seat side can be adjusted by moving the flow control member 52b in the outlet tank 42 in the up-down direction within an area of the rear seat air passage 72. Thus, the air temperature blown toward the rear seat side in the passenger compartment can be controlled by the flow control member 52b. Further, since the flow control member 52a for the front seat side and the flow control member 52b for the rear seat side are independently controlled by the actuator 50a, 50b, respectively, the air temperature blown toward the front seat side and the air temperature blown toward the rear seat side can be independently controlled.

(Ninth Embodiment)

In the above-described eighth embodiment, the heater core 4 is constructed as the one-way flow type where hot water flows in one direction from the inlet tank 41 to the outlet tank 42. However, in the ninth embodiment, as shown in FIGS. 13A, 13B, the heater core 4 can be constructed as the U-turn type where hot water U-turns in the air flow direction D as in the fourth and sixth embodiments (FIGS. 6A–6C, 9). Even in this case, the air temperature blown toward the front seat side of the passenger compartment and the air temperature blown toward the rear seat side in the passenger compartment can be independently controlled by controlling the operation position of the flow control members 52a, 52b. In the ninth embodiment, the structure of the air conditioning case 1a including the partition plate 70 can be formed similarly to that of the above-described eighth embodiment.

In the eighth and ninth embodiments of the present invention, the partition plate 70 fixed to the air conditioning case 1a is used as a partition member for partitioning the air passage at the downstream side of the heater core 4 into the front seat air passage 71 and the rear seat air passage 72. However, a movable door member may be used in place of the partition plate 70. If the movable door member is used as the partition member for forming the front seat air passage 71 and the rear seat air passage 72, the air passage is partitioned by the door member into the front seat air passage 71 and the rear seat air passage 72 only when air is required to be blown into the space at the rear seat side in the passenger compartment. When no air is require to be blown to the space at the rear seat side in the passenger compartment, the door member is moved to a position where the air passage at the downstream side of the heater core 4 is not partitioned to the front seat air passage 71 and the rear seat air passage 72. In this case, air in the rear seat air passage 72 can be also blown toward the front seat side in the passenger compartment.

(Tenth Embodiment)

Figure 14:
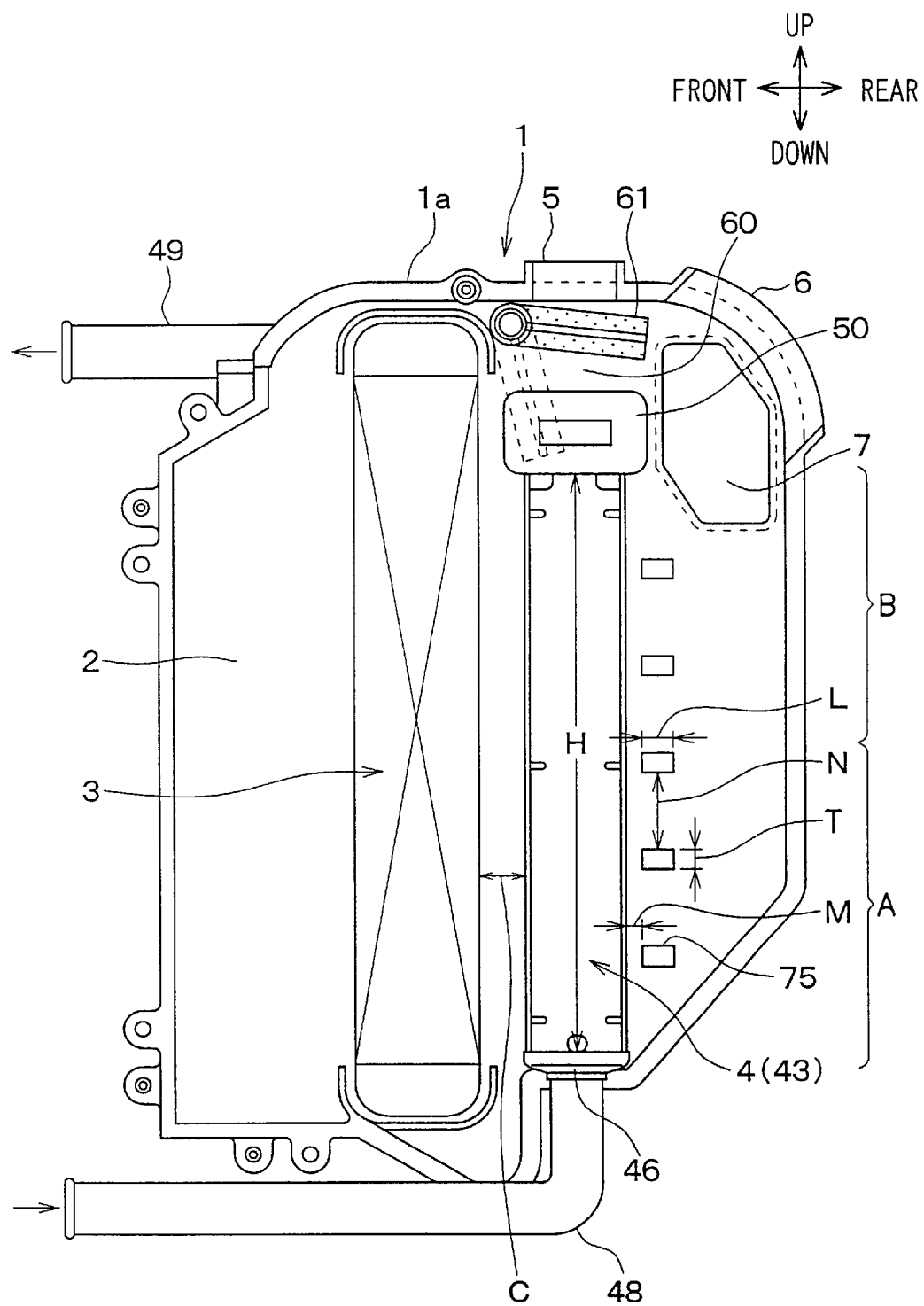
FIG. 14 is a side view showing an air conditioning unit in a condition where a side case part of an air conditioning case is removed, according to a tenth embodiment of the present invention.
Figure 15:
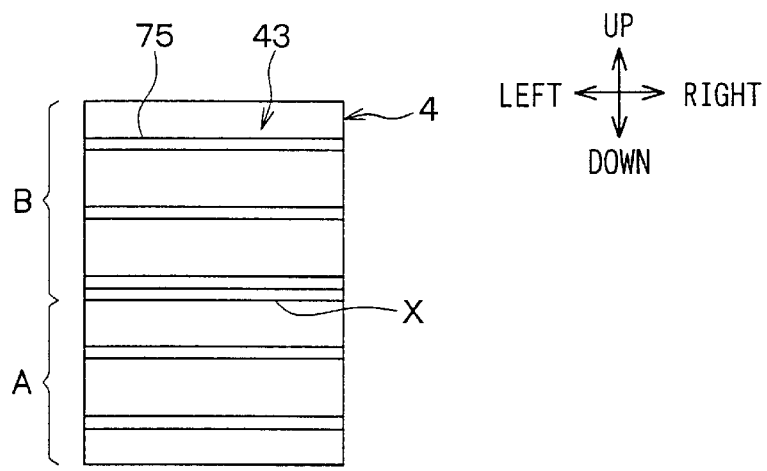
FIG. 15 is a schematic diagram showing an arrangement of ribs in a heater core, according to the tenth embodiment.

In the above-described first to ninth embodiments of the present invention, since the hot air and the cool air having passed through the heater core 4 form a plural-layer flow, mixing performance between the hot air and the cool air is reduced, and a temperature difference is caused in air blown into the passenger compartment. In the tenth embodiment, in view of the above problem, the hot air flow and the cool air flow are disturbed at the downstream air side of the heater core 4, thereby improving mixing performance between the hot air and the cool air. As shown in FIGS. 14, 15, ribs 75 for facilitating the mixing between the hot air and the cool air are provided at the downstream air side of the heater core 4.

Specifically, each rib 75 is formed in a prismatic shape having a rectangular cross-section, and thinly extends in a horizontal direction (vehicle right-left direction). Further, each rib 75 extends along an entire width (vehicle right-left direction) of the heat-exchange core portion 43 of the heater core 4, and is provided in parallel with the flat tube 44 in its longitudinal direction. For example, a dimension L of the rib 75 in the air flow direction is 10 mm, and its plate thickness T is 6 mm. Further, each rib 75 is separated from the heater core 4 to its downstream side by a small clearance M, for example, 5 mm. Plural ribs 75 (e.g., five) are arranged in the up-down direction to be parallel to each other, and are separated from each other by a predetermined clearance N between adjacent two in the up-down direction. Here, since the height H of the heat-exchange core portion 43 of the heater core 4 is 228.7 mm, the dimension N between the adjacent two ribs 75 is approximate 38 mm.

When the air conditioning case 1a is constructed by right and left division case members, the ribs 75 can be molded integrally with any one of the right and left division case members. Further, the ribs 75 can be formed separately from the air conditioning case 1a, and may be fixed to an inner wall of the air conditioning case 1a by the bonding and the like. In the tenth embodiment, an entire construction of the air conditioning unit 1 may be identical to that in the second embodiment (FIG. 4). However, in the tenth embodiment, since the ribs 75 are provided at the downstream air side of the heater core 4, the foot opening 7 is provided at a position upper than the position shown in FIG. 4.

Next, operational effects of a vehicle air conditioner according to the tenth embodiment will be described. The heater core 4 of the tenth embodiment has the same structure as the heater core 4 shown in FIG. 2 (first and second embodiments). Therefore, when the flow control member 52 is operated to the intermediate position indicated by the solid line in the inlet tank 41 in FIG. 2, the hot air area is set in the lower area A in the heater core 4, and the cool air area is set in the upper area B therein. Here, when no rib 75 is provided at the downstream air side of the heater core 4, the hot air having passed through the lower area A and the cool air having passed through the upper area B forms the double-layer flow , thereby reducing the mixing performance between the hot air and the cool air, and increasing the temperature difference in air blown into the passenger compartment.

In the tenth embodiment, since the hot air and the cool air collide with the ribs 75 directly at the downstream air side of the heater core 4, the streams of the hot air and the cool air is disturbed. Further, the plural ribs 75 are separated from each other by the same clearance, and extend in the horizontal direction, that is, in a direction parallel to a boundary line X between the hot air area A and the cool air area B shown in FIG. 15. Therefore, eddies are caused and enlarged from the ribs 75 in the up-down direction (in a direction vertical to the boundary X) due to the flow disturbance of the hot air and the cool air, so that the hot air and the cool air flowing adjacent to each other are mixed in the up-down direction due to the eddies. Accordingly, the mixture between the hot air and the cool air can be facilitated, and the temperature difference in air blown into the passenger compartment can be effectively reduced.

Figure 16:
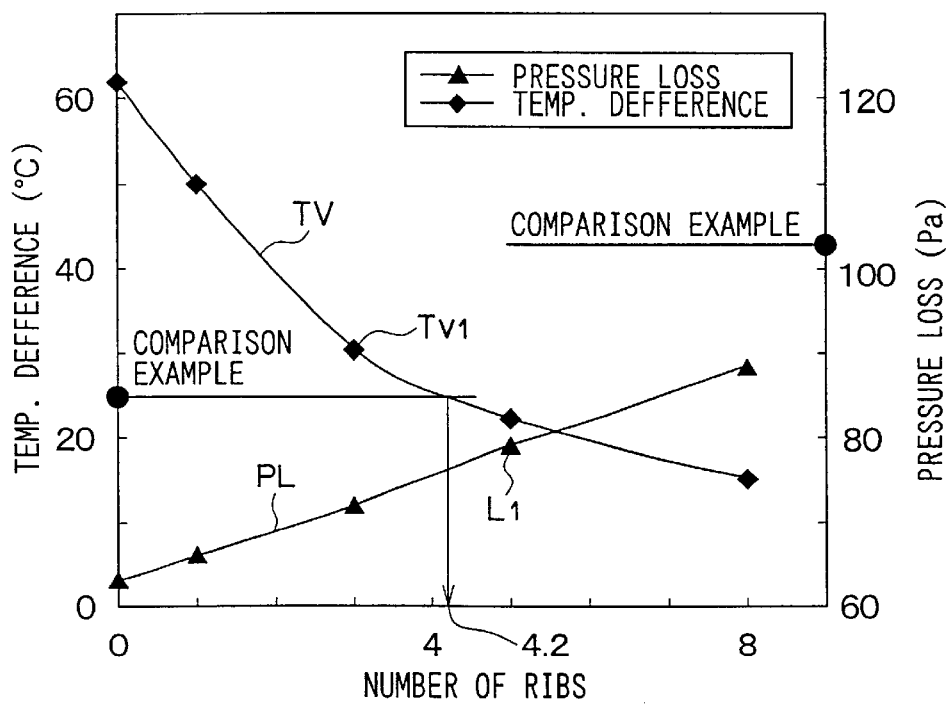
FIG. 16 is a graph for explaining an advantage according to the tenth embodiment.

FIG. 16 shows test results according to the tenth embodiment. In FIG. 16, the abscissa indicates the number of ribs 75, the left ordinate indicates the temperature difference in air blown into the passenger compartment, and the right ordinate indicates an air-passage pressure loss in the air conditioning case 1a. In this test, the dimension L of the rib 75 is 10 mm, and the plate thickness T is 6 mm. The clearance M between the heater core 4 and the rib 75 is 5 mm, and the height H of the heat-exchange core portion 43 of the heater core 4 is 228.7 mm. Therefore, when the number of ribs 75 is five, the dimension N between adjacent two ribs 75 is approximately 38 mm. Here, the temperature difference is a difference between the highest temperature and the lowest temperature of air blown into the passenger compartment. Further, the air-passage pressure loss in the air conditioning case 1a is a pressure loss between a position directly after the downstream air side of the evaporator 3 and the blower openings 5, 6, 7. More specifically, the air-passage pressure loss shown in FIG. 16 is detected when an air-mixing open degree is 50% and the face mode where the face opening 6 is opened is set. In the tenth embodiment, the air-mixing open degree of 50% is a state where the number of the flat tubes 44 in the hot air area A is identical to that in the cool air area B.

Figure 17:
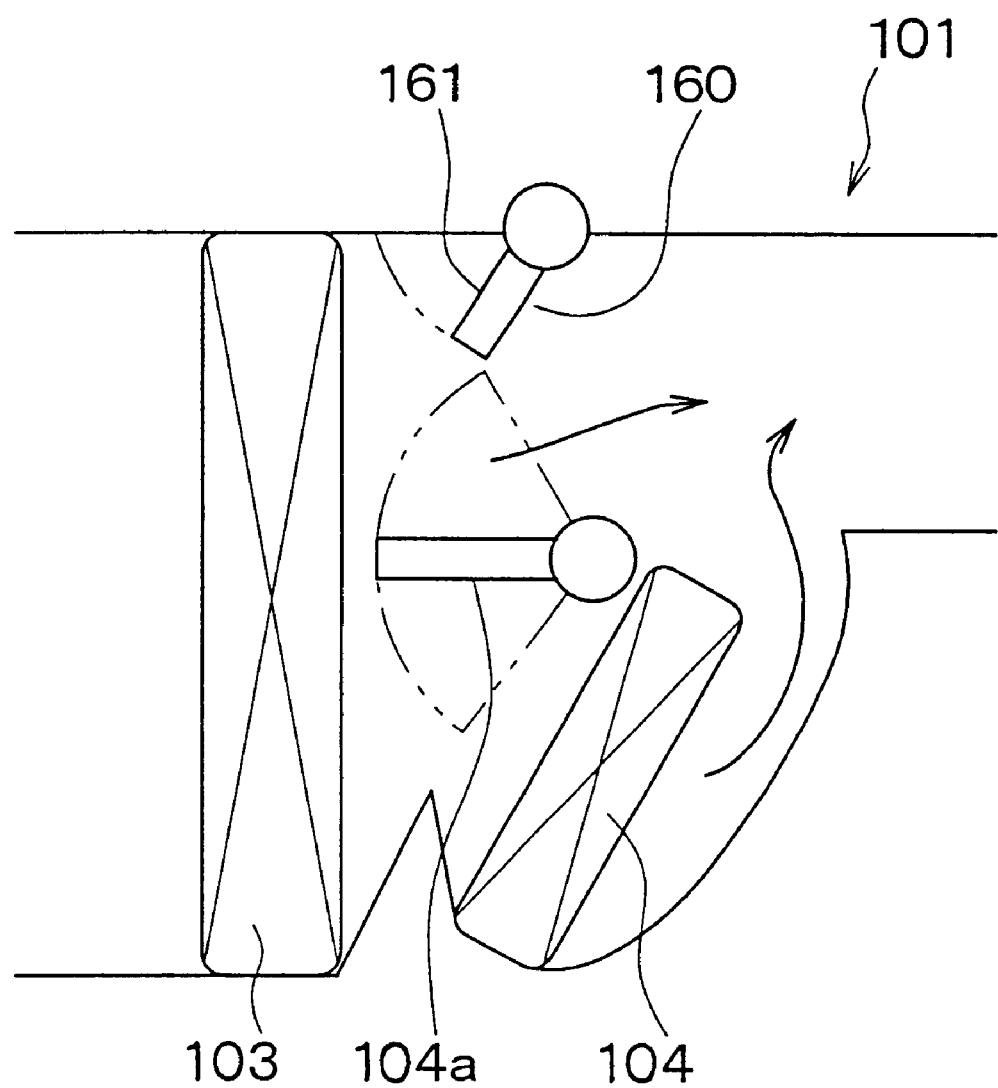
FIG. 17 is a schematic sectional view showing an air conditioning unit in a comparison example of the tenth embodiment.

In the test shown in FIG. 16, an air conditioning unit 101 using a general air mixing system shown in FIG. 17 is used as a comparison example. In the air conditioning unit 101 of the comparison example, the temperature of air blown into a passenger compartment is adjusted by adjusting a flowing amount ratio between hot air and cool air using an air mixing door 104a disposed at an upstream air side of the heater core 104. In FIG. 17, functions of a cool-air bypass passage 160 and a bypass door 161 are set to be identical to those in the tenth embodiment. Further, in the comparison example shown in FIG. 17, the air-blowing capacity of a blower (not shown) and the size of the evaporator 103 are set to be identical to those in the tenth embodiment. Then, the air-passage pressure loss is detected in the air conditioning case 1a during the face mode.

In the tenth embodiment, as shown by the line TV in FIG. 16, the temperature difference in air blown into the passenger compartment can be largely reduced by increasing the number of the ribs 75. Especially, as shown by the TV1 point on the line TV in FIG. 16, when the number of the ribs 75 is three or more, that is, when the clearance N between the adjacent two ribs 75 is approximate 60 mm or less, the temperature difference can be reduced around 30° C. In this case, the temperature difference is reduced to the half level of a temperature difference when no rib 75 is provided. When the number of the ribs 75 is three or more, mixing performance of air can be remarkably improved. Since the temperature difference is about 25° C. in the comparison example shown in FIG. 17, the temperature difference in the tenth embodiment can be made identical to or less than that in the comparison example, when the number of the ribs 75 is 4.2 or more. Since the real number of the ribs 75 is an integer, five ribs 75 are provided in the tenth embodiment, thereby reducing the temperature difference than the comparison example shown in FIG. 17. Here, when the number of the ribs 75 is five, the clearance N between the adjacent two ribs 75 is approximate 38 mm. When the number of the ribs 75 is four, the clearance N between the adjacent two ribs 75 is approximate 44 mm.

In the tenth embodiment, since the air mixing door 104a shown in FIG. 17 is not provided, an air-passage area of the heat-exchange core portion 43 can be enlarged in the air conditioning case 1a, and the heater core 4 can be disposed in parallel to the evaporator. Therefore, a short and linear air passage can be formed between the downstream and upstream sides of the heater core 4, and the air-passage pressure loss can be largely reduced than the comparison example shown in FIG. 17 as indicated by the line PL shown in FIG. 16.

Although the clearance M between the heater core 4 and the ribs 75 can be set in a range of 5–15 mm according to the test results, the size of the air conditioning unit 1 is enlarged when the clearance M is set larger. Therefore, preferably, the clearance M is reduced within a range where the temperature difference can be reduced to a required level. Thus, in the tenth embodiment, the clearance M is set at 5 mm. From the same viewpoint, preferably, the dimension L of the rib 75 can also reduced as well as possible.

(Eleventh Embodiment)

Figure 18:
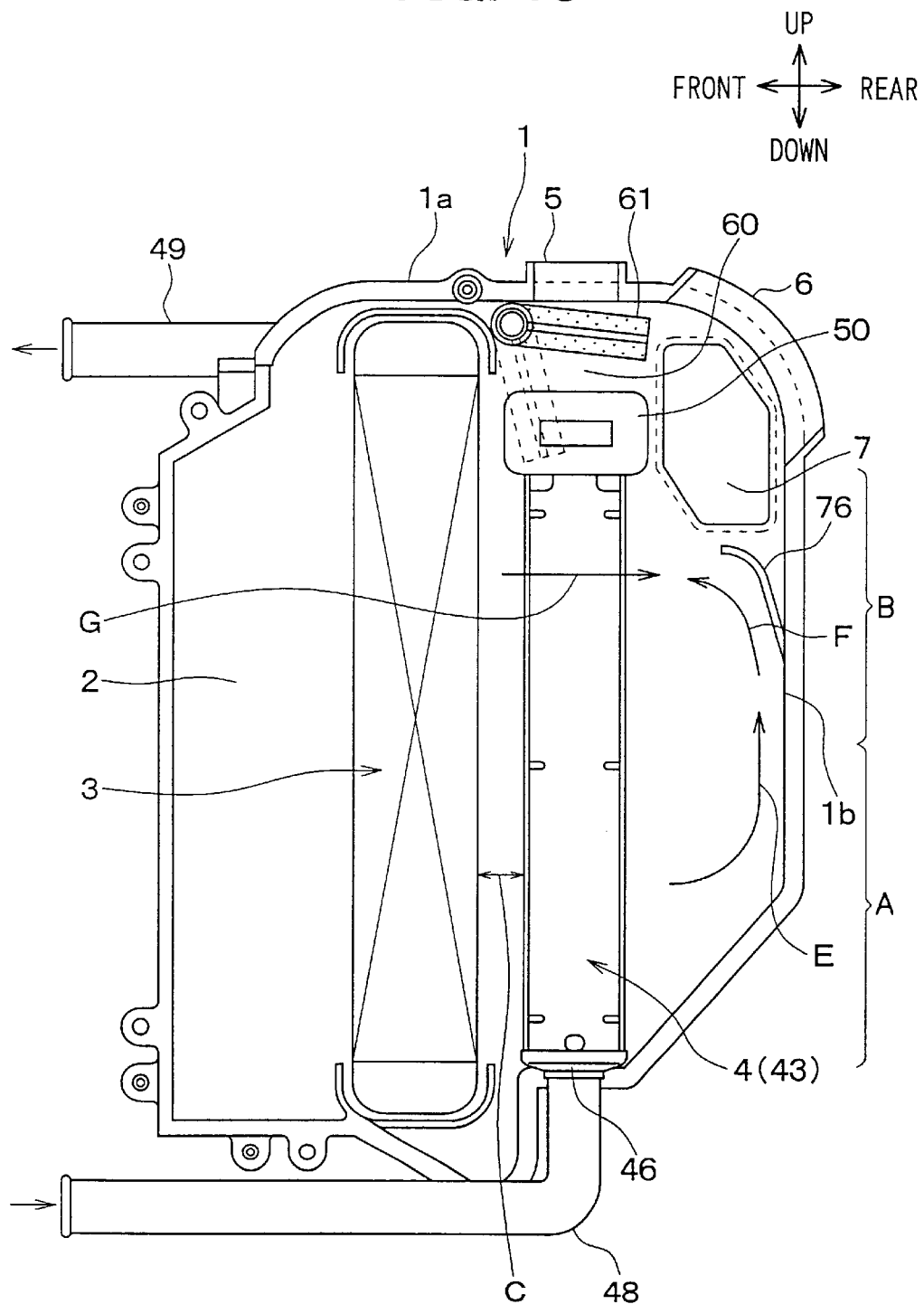
FIG. 18 is a side view showing an air conditioning unit in a condition where a side case part of an air conditioning case is removed, according to an eleventh embodiment of the present invention.

In the eleventh embodiment, as in the tenth embodiment, the temperature difference in air blown into the passenger compartment is reduced by improving the mixing performance between the hot air and the cool air. However, in the eleventh embodiment, the structure for improving the mixing performance is different from that in the above-described tenth embodiment. As shown in FIG. 18, in the eleventh embodiment, a guide 76 is provided in place of the ribs 75 in the above-described tenth embodiment (FIG. 14). As shown in FIG. 18, the guide 76 is disposed in the air conditioning case 1a on a wall surface 1b at the vehicle rear side. Specifically, the wall surface 1b is provided at the downstream air side of the heater core 4, to have a predetermined distance with the heater core 4.

Hot air after passing through the lower area A of the heater core 4 flows upwardly along the wall surface 1b as indicated by the arrow E. Further, as indicated by the arrow F, the hot air flowing by the arrow E is tuned by the guide 76 to collide with cool air, having passed through the upper area B of the heater core 4, shown by the arrow G in FIG. 18. In the eleventh embodiment, the upper side of the guide 76 is gradually curved toward the vehicle front side in an arc shape. The guide 76 is formed to extend along the entire width of the heater core 4 in the vehicle right-left direction. Further, the guide 76 can be integrally molded together with the air conditioning case 1a. Alternatively, the guide 76 can be formed separately from the air conditioning case 1a, and can be fixed to the air conditioning case 1a by the bonding and the like.

According to the eleventh embodiment, as indicated by the arrow F in FIG. 18, the hot air is guided by the guide 76 to a side opposite to the flow of cool air indicated by the arrow G, so that the hot air collide with the cool air. Accordingly, the mixing performance between the hot air and the cool air can be improved, and the temperature difference in air blown into the passenger compartment can be improved, similarly to the above-described tenth embodiment. When the cool air passes through the lower area A and hot air passes through the upper area B as in the fifth embodiment shown in FIGS. 7, 8, the cool air from the lower area A of the heater core 4 can be guided by the guide 76 to the side of the hot air flowing from the upper area B. Even in this case, the air-mixing performance between the cool air and the hot air can be improved.

(Twelfth Embodiment)

In the twelfth embodiment, a structure for improving temperature control characteristics of air blown into the passenger compartment is provided.

Figure 19:
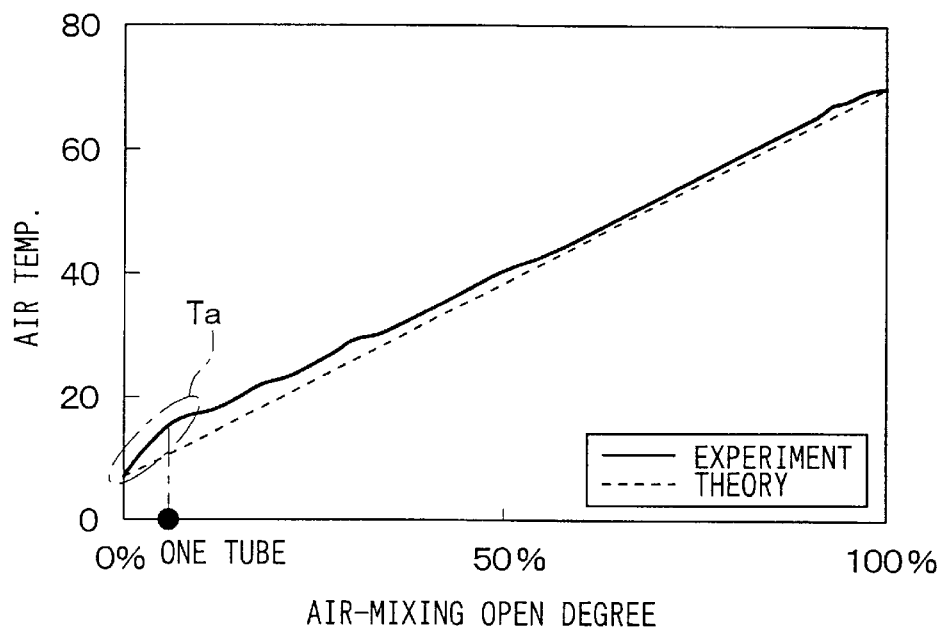
FIG. 19 is a graph for explaining a problem to be solved in a twelfth embodiment of the present invention.

At first, the problem to be solved in the twelfth embodiment will be described with reference to FIGS. 19–21. FIG. 19 shows the relationship between an air-mixing open degree and the air temperature blown into the passenger compartment. Here, the air-mixing open degree is a ratio of the number of flat tubes 44 where hot water passes, to the whole number of all the flat tubes 44. Specifically, when the air-mixing open degree is 0%, the flow control member 52 is located at the maximum cooling position MC shown in FIG. 2, and the number of the flat tubes 44 where hot water flows is zero. When the air-mixing open degree is 100%, the flow control member 52 is located at the maximum heating position MH shown in FIG. 2, and hot water flows in all the flat tubes 44.

Experiments are performed by the present inventors, and it has been found in the above embodiments that the temperature of air blown into the passenger compartment is rapidly increased as indicated by the Ta portion in FIG.19 when hot water flows into one flat tube from a non-flow state. Here, the number of the flat tube 44, where the hot water flows, becomes one from zero, when the flow control member 52 is displaced by a small distance from the maximum cooling position MC toward the maximum heating position MH. In FIG. 19, the solid line represents an experimental value of the temperature control characteristics in the above described first embodiment, and the broken line represents a theoretical value where the temperature of air blown into the passenger compartment is proportional to the air-mixing open degree.

Next, the reason why the temperature of air blown into the passenger compartment is rapidly increased when the number of the flat tubes 44 where hot water flows is increased to one from zero, will be described. For example, in the above-described first embodiment, when the flow control member 52 is displaced from the maximum cooling position MC indicated by the broken line to a position indicated by the solid line, hot water flows from the water inlet 46 only into one of the plural flat tubes 44 at the lowest position. In this state, corrugate fins 45 are integrally connected to the upper and lower sides of the flat tube 44 at the lowest position, and heat of the lowest one flat tube 44 is conducted to the corrugate fins 45 adjacent to the lowest one flat tube 44. Then, the heat is conducted from the corrugate fin 45 to the adjacent flat tube 44 at an upper side of this corrugate fin 45, and is further conducted to the adjacent corrugated fin 45, in this order.

Figure 21:
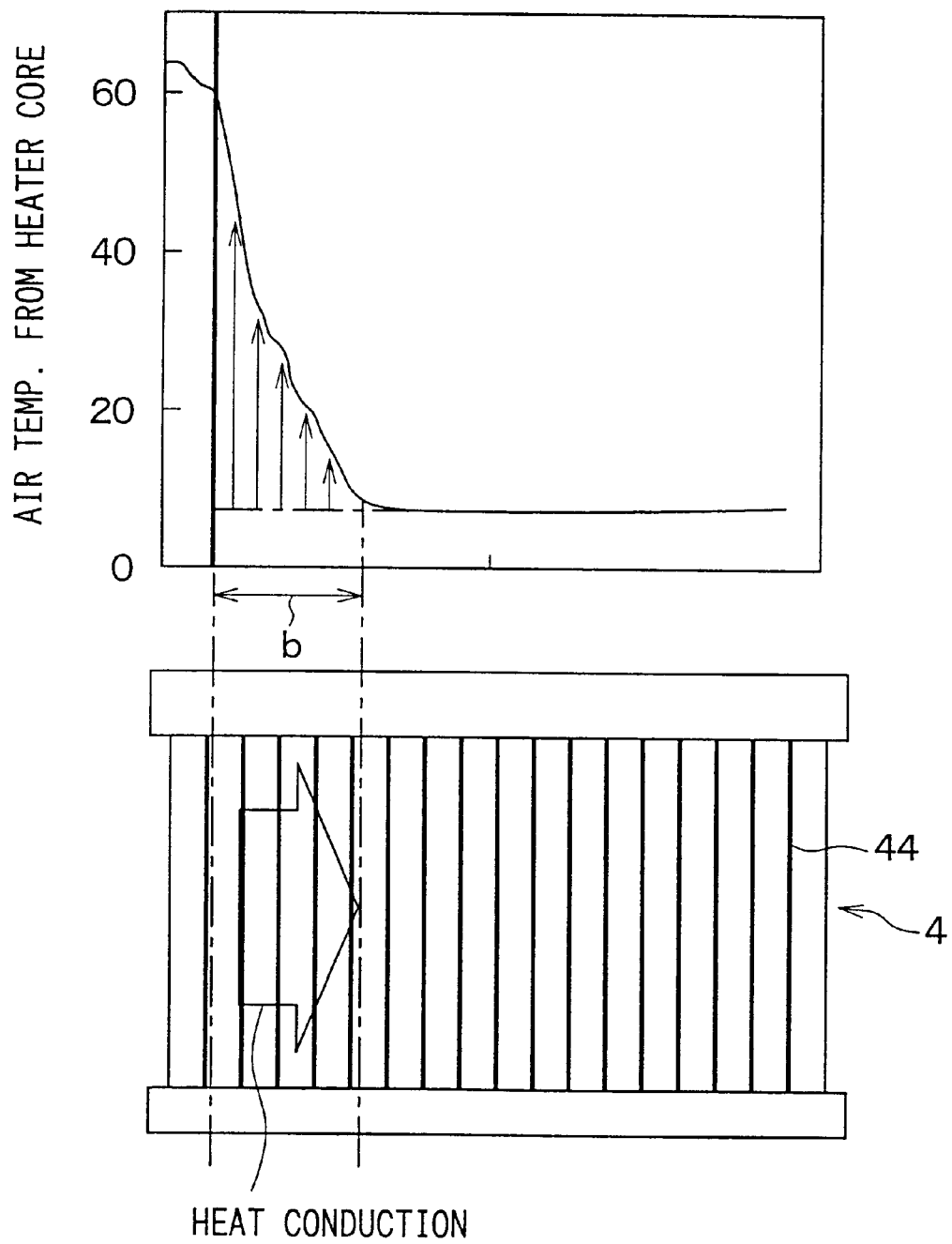
FIG. 21 is a schematic diagram showing a temperature distribution of air blown from the heater core, for explaining the problem to be solved in twelfth embodiment.

Therefore, as shown in FIG. 21, the temperature of air directly after passing through the heater core 4 is increased also in the portion adjacent to the lowest flat tube 44, as compared with the other portion in the heat exchange core portion 43. As a result, when hot water flows into the one lowest flat tubes 44, that is, when the air-mixing open degree is increased to a minimum open degree, an flow amount of hot air is rapidly increased, and the temperature of air blown into the passenger compartment is relatively rapidly increased. In view of the above viewpoint, in the twelfth embodiment, when the air-mixing open degree is increased by a very small open degree from 0%, the flow amount of hot air is restricted from being rapidly increased, so that it can restrict the temperature of air blown into the passenger compartment from being rapidly increased.

Figure 22:
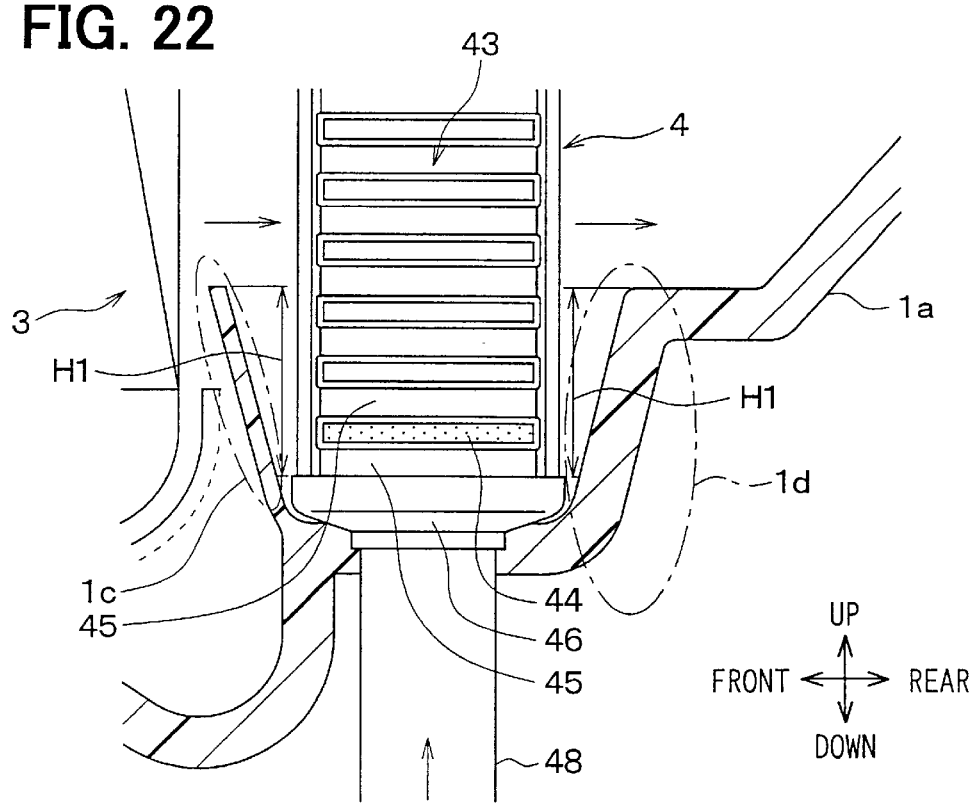
FIG. 22 is a partial sectional view showing a pressure-loss increasing portion in an air conditioning unit according to the twelfth embodiment.

In the twelfth embodiment, as shown in FIG. 22, pressure-loss increasing portions 1c, 1d are provided in the air conditioning case 1a at a bottom potion for supporting the lower portion of the heater core 4. The pressure-loss increasing portions 1c, 1d are integrated to the air conditioning case 1a to reduce an air passage at the downstream and upstream sides of the heater core 4 around its lower portion. The pressure loss around the lower portion of the heater core 4 can be increased by the pressure-loss increasing portions 1c, 1d than that at the other portion thereof (e.g., the upper side of the heater core 4). Therefore, when hot water flows only into the lowest one flat tube 44, that is, when the air-mixing open degree is a very small open degree, the flow amount of air passing through the lowest one flat tube 44 can be restricted. Accordingly, when the air-mixing open degree is a very small open degree, the temperature of air blown into the passenger compartment can be restricted from being rapidly increased by restricting the air amount of the hot air from the lowest one flat tube 44. In FIG. 22, the lowest flat tube 44 is indicated by a stipple area.

According to experiments by the present inventors, in a case where the pressure-loss increasing portions 1c, 1d are not provided in the air conditioning case 1a around the bottom portion as in the first embodiment shown in FIG. 1, when the air-mixing open degree is increased from 0% to a very small open degree (e.g., 5%) where hot water flows only into the lowest flat tube 44, the temperature of air blown into the passenger compartment is rapidly increased by 8° C. However, in the twelfth embodiment of the present invention, in a case where the height H1 of the pressure-loss increasing portions 1c, 1d is set at 10% of the height of the heat-exchange core portion 43 of the heater core 4 (e.g., H=228.7 mm), when the air-mixing open degree is increased from 0% to 5% as in the above condition, the temperature of air blown into the passenger compartment is only increased by a suitable temperature of 6° C. In the twelfth embodiment of the present invention, the two pressure-loss increasing portions 1c, 1d are provided at upstream and downstream air sides of the heater core 4 to reduce the rapid temperature increase. However, even when one of the pressure-loss increasing portions 1c, 1d is provided, the rapid temperature increase can be restricted to some degree.

(Thirteenth Embodiment)

In the above-described twelfth embodiment of the present invention, when the air-mixing open degree is increased from 0% (maximum cooling state), hot water firstly flows into the lowest flat tube 44 in the heater core 4. However, in some cases, when the air-mixing open degree is increased from 0% (maximum cooling state), hot water firstly flows into one flat tube 44 located at a center position of the plural flat tubes 44 (center position of the heat-exchange core portion 43). For example, as in the third embodiment shown in FIG. 5, in the heat-exchange core portion 43 of the heater core 4, the tube area (hot-air passage portion) A where hot air flows is provided at the center in the up-down direction, and the tube areas (cool-air passage portion) B where no hot water flows are provided at the upper and lower sides of the tube area A. In this case, the one flat tube 44, where hot water flows at first, can be set at a center area of the heat-exchange core portion 43, due to the flow control members 52a, 52b in the inlet tank 41 and the outlet tank 42.

Figure 23:
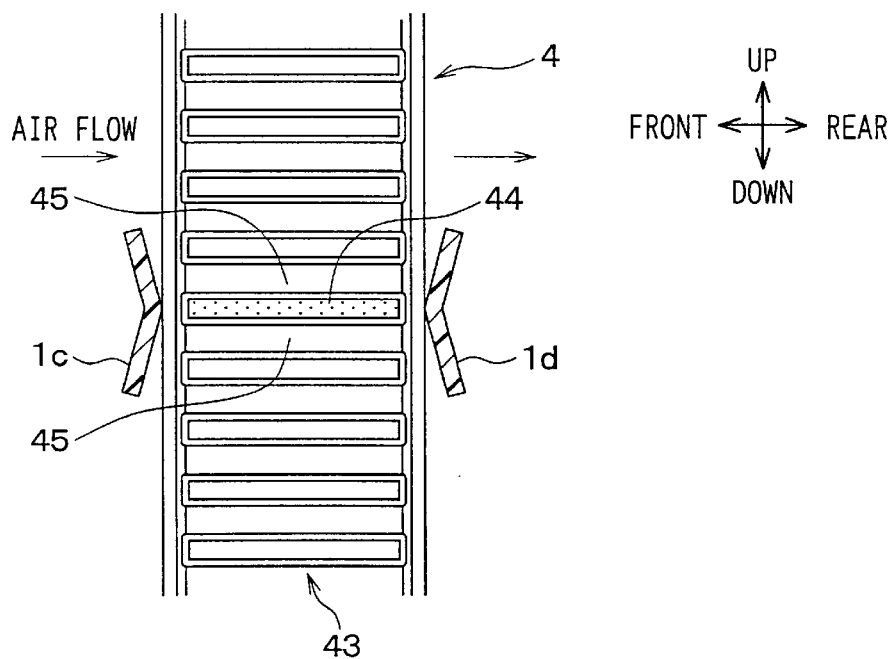
FIG. 23 is a sectional view showing a main part of a pressure-loss increasing portion at a center of a heater core according to a thirteenth embodiment of the present invention.

In the thirteenth embodiment, as shown in FIG. 23, the one flat tube 44, where hot water flows at first, is located at the center area of the heat-exchange core portion 43. Further, the pressure-loss increasing portions 1c, 1d are disposed around the one flat tube in the center area of the heat-exchange core portion 43, at both the downstream and upstream sides of the heater core 4, respectively. Each of the pressure-loss increasing portions 1c, 1d is formed by a rib having a V-shaped cross section, and is disposed so that its top end of the V-shape is located at an end of the one flat tube 44 in which hot water firstly flows. Each of the pressure-loss increasing portion 1c, 1d extends along the entire width of the heat-exchange core portion 43 (in the vehicle right-left direction) while its cross-section has the V-shape.

Here, when the air conditioning case 1a is constructed by right and left division case members, the pressure-loss increasing portion 1c, 1d can be integrally molded together with any one of the right and left division case members. Further, the pressure-loss increasing portion 1c, 1d can formed separately from the air conditioning case 1a, and may be fixed to an inner wall of the air conditioning case 1a by the bonding and the like.

In the thirteenth embodiment, the size of the V-shaped cross section is set so that each of the pressure-loss increasing portions 1c, 1d can cover the upper and lower corrugate fins 45 adjacent to the one flat tube 44, and flat tubes 44 adjacent to upper and the corrugate fins 45, as shown in FIG. 23. Thus, it can restrict air from largely flowing into this area around the one flat tube in which hot water first flows. In the thirteenth embodiment, since the pressure-loss increasing portions 1c, 1d each having a V-shaped cross section are disposed at the upstream and downstream sides of the one flat tube 44 where the hot water flows at first among the plural flat tubes 44, it can restrict the air amount from flowing around the one flat tube 44 to be smaller. Therefore, when the air-mixing open degree is increased to a very small open degree from 0%, the air amount flowing through around the one flat tube 44 in the heater core 4 can be restricted, so that the temperature of air blown into the passenger compartment can be restricted from being rapidly increased.

(Fourteenth Embodiment)

In the fourteenth embodiment of the present invention, the one flat tube 44, where hot water flows at first, is located at the lowest position of the flat tubes 44 as in the above-described twelfth embodiment of the present invention. In the fourteenth embodiment, when the air-mixing open degree is increased from 0%, the temperature of air blown into the passenger compartment is restricted from being rapidly increased by changing the arrangement position of the one lowest flat tube 44.

Figure 20:
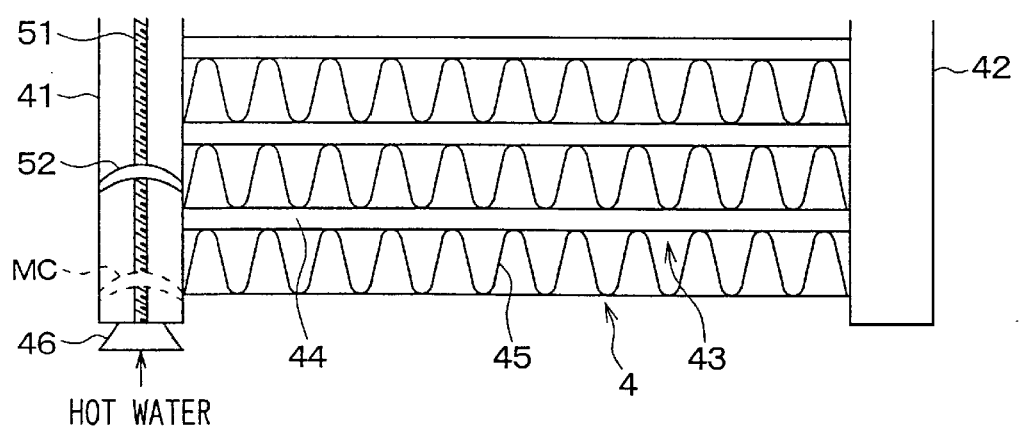
FIG. 20 is a partial front view showing a part of a heater core, for explaining the problem to be solved in twelfth embodiment.
Figure 24:
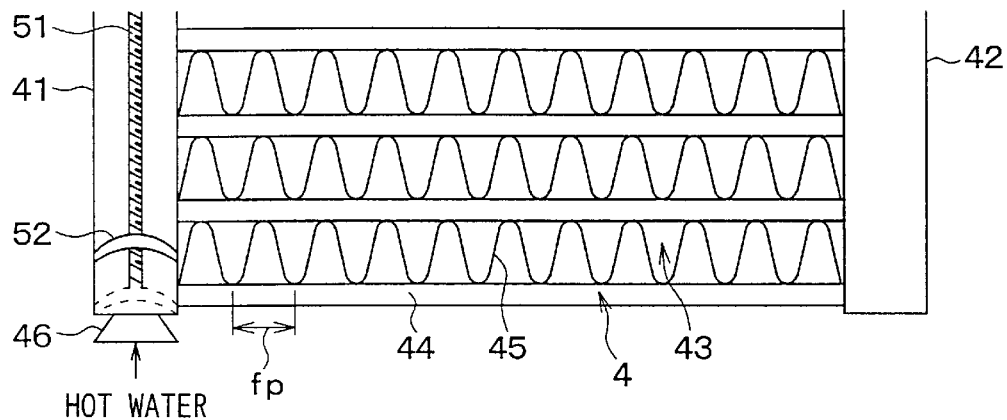
FIG. 24 is a front view showing a part of a heater core according to a fourteenth embodiment of the present invention.

That is, in the above-described twelfth embodiment of the present invention, as shown in FIG. 20, the corrugate fins 45 are disposed at the upper and lower sides of the lowest one flat tube 44. Therefore, even when hot water flows into only the lowest one flat tube 44, that is, even when the air-mixing open degree is set at the very small open degree, heat is radiated to air also at the corrugate fins 45 at the upper and lower sides of the lowest one flat tube 44 due to thermal conduction from the lowest one flat tube 44. Therefore, a heat radiation area with air is increased, and a hot-air flowing amount is increased. Accordingly, the temperature of air blown into the passenger compartment may be rapidly increased. In the fourteenth embodiment, as shown in FIG. 24, the corrugate fin 45 at the lower side of the lowest one flat tube 44 is omitted. Therefore, the lowest one flat tube 44, where hot water flows at first, is located at the bottom position of the heat-exchange core portion 43 in the heater core 4.

Accordingly, in the fourteenth embodiment, heat of the lowest one flat tube 44 is conducted only to the corrugate fin 45 adjacent to the lowest one flat tube 44, and the heat radiation area for air is reduced. Therefore, the hot-air flowing amount is reduced, thereby restricting the temperature of air blown into the passenger compartment from being rapidly increased. Further, as in the fifth embodiment shown in FIG. 8, when a hot air area is provided in the upper area A in the heat-exchange core portion 43, the one flat tube 44, where hot water flows at first, can be located at the highest position of the heat-exchange core portion 43. Even in this case, the same advantage described above can be obtained.

(Fifteenth Embodiment)

Figure 25:
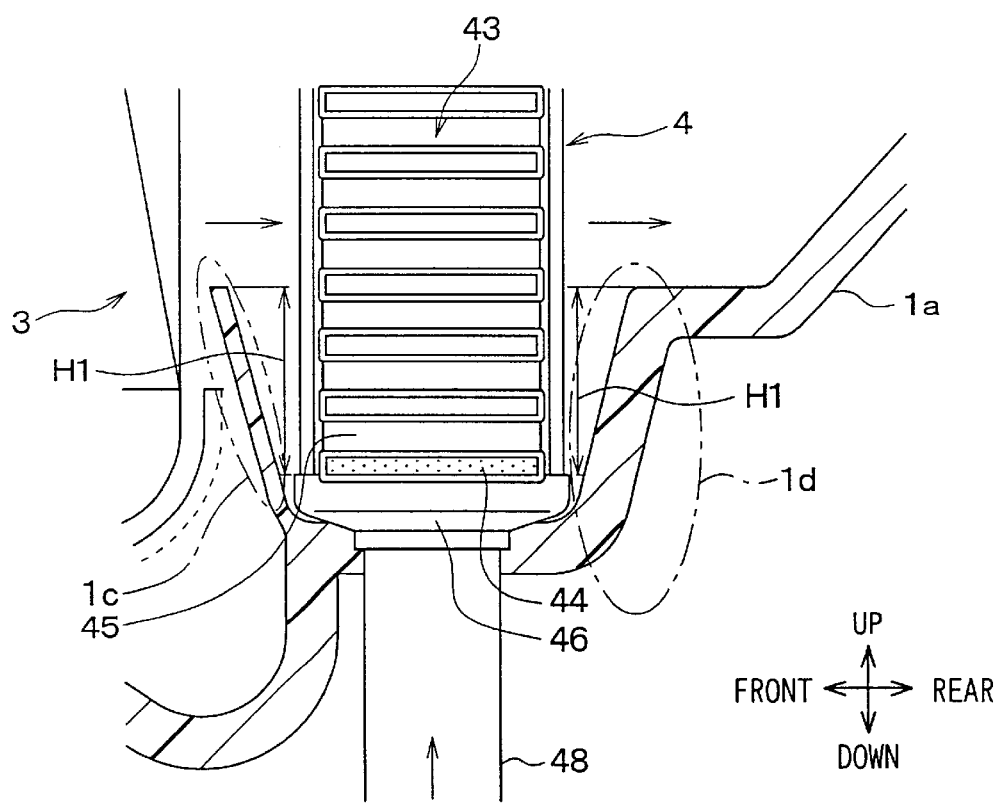
FIG. 25 is a partial sectional view showing a combination structure of a pressure-loss increasing portion and a heater core in an air conditioning unit according to a fifteenth embodiment of the present invention.

In the fifteenth embodiment, the tube arrangement structure described in the fourteenth embodiment is combined with the arrangement structure of the pressure-loss increasing portions 1c, 1d described in the twelfth embodiment shown in FIG. 22. As shown in FIG. 25, in the fifteenth embodiment, the one flat tube 44, where hot water flows at first, is located at the lowest position of the heat-exchange core portion 43, and the pressure-loss increasing portions 1c, 1d are disposed at the upstream and downstream air sides of the lowest one flat tube 44. Accordingly, it can restrict air from flowing around the lowest one flat tube 44, and the heat radiation area from the lowest one flat tube 44 to air is reduced, thereby further restricting the temperature of air blown into the passenger compartment from being rapidly increased.

As a modification of the above-described twelfth to fifteenth embodiments, a fin pitch fp (shown in FIG. 24) of only the corrugate fins 45, disposed directly adjacent to the one flat tube 44 where hot water flows at first, may be made larger than that of other corrugate fins 45. Therefore, a heat conducting area in the corrugate fins 45 at the upper and lower sides of the one flat tube 44 where hot water flows at first, can be reduced, thereby restricting the temperature of air blown into the passenger compartment from being rapidly increased. As another modification of the above-described twelfth to fifteenth embodiment, only a clearance (tube pitch) between the one flat tube 44 where hot water flows at first and its neighboring flat tube 44 adjacent to the one flat tube 44 may be made larger than a clearance between other adjacent two flat tubes 44. In this case, heat is restricted from being conducted from the one flat tube 44 to the adjacent flat tube 44, thereby restricting the temperature of air blown into the passenger compartment from being rapidly increased.

(Sixteenth Embodiment)

In the above described embodiments of the present invention, the flow control members 52, 52a, 52b are disposed in the inlet tank 41 and/or the outlet tank 42 of the heater core 4, and are constructed by sliding valve mechanisms that slide in the tanks 41, 42. Therefore, a sliding distance, where the flow control members 52, 52a, 52b slide between the maximum cooling position MC and the maximum heating position MH, is made larger, thereby increasing a sliding time for which the flow control members 52, 52a, 52b slide therebetween. Accordingly, the operation angle (rotation speed) of the actuators 50, 50a, 50b for sliding the flow control members 52, 52a, 52b may be increased, and power consumption of the actuators 50, 50a, 50b may be increased.

In the sixteenth embodiment, the flow control member is constructed by a rotating valve mechanism which rotates in the tank 41 or 42, so that the above problem can be resolved. That is, as shown in FIGS. 26, 27, the inlet tank 41 of the heater core 4 is formed in a cylindrical shape, and the flow control member 52 constructed by a cylindrical rotating valve mechanism is rotatably disposed in the inlet tank 41.

Figure 26:
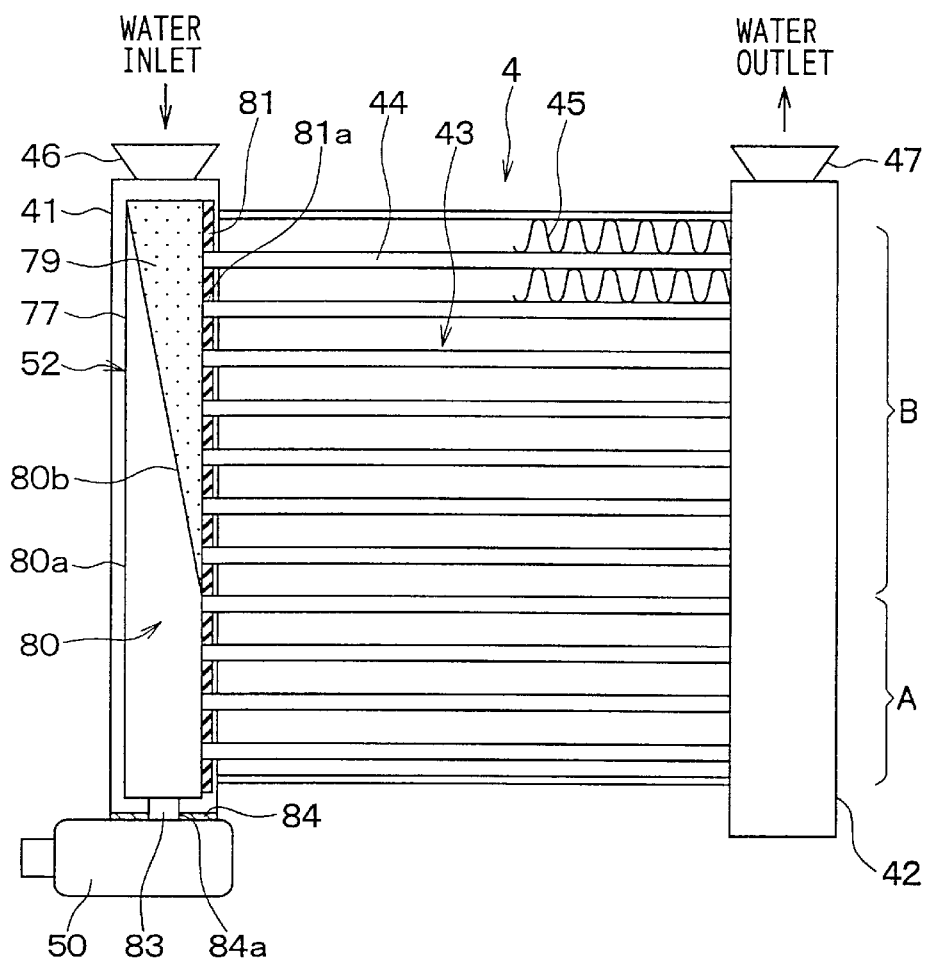
FIG. 26 is a front view showing a heater core according to a sixteenth embodiment of the present invention.
Figure 27:
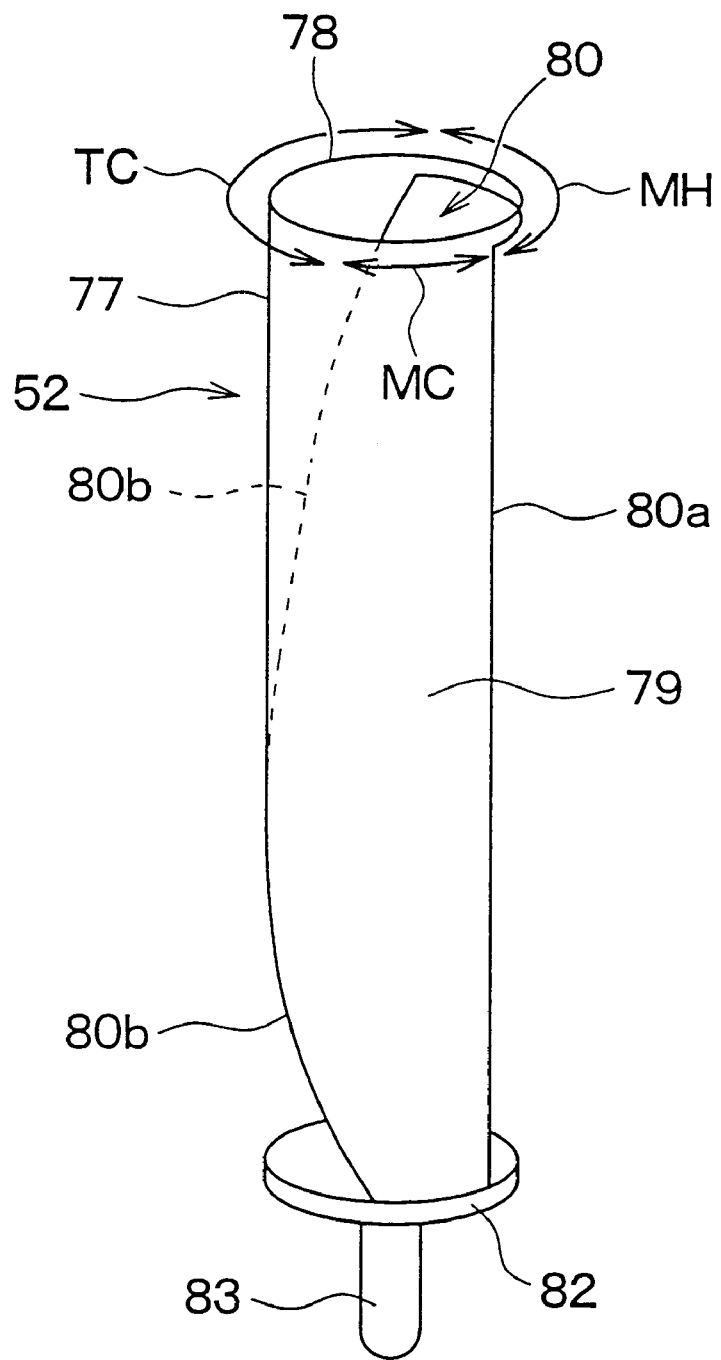
FIG. 27 is a perspective view showing a flow control member (rotating valve mechanism) according to the sixteenth embodiment.

As shown in FIG. 27, the flow control member 52 includes a cylindrical main body 77 having an opening 78 at an end of the cylindrical main body 77 in its axial direction. Since the opening 78 is provided opposite to the water inlet 46, hot water flowing from the water inlet 46 into the inlet tank 41 smoothly flows into the cylindrical main body 77. The cylindrical main body 77 is formed into a hollow shape. An axial direction of the cylindrical main body 77 is parallel to the arrangement direction (tube stack direction) of the flat tubes 44 of the heater core 4. Therefore, the cylindrical main body 77 is rotated about a rotation axis that is parallel to the arrangement direction of the flat tubes 44. Further, an axial dimension of the cylindrical main body 77 (i.e., dimension in the up-down direction in FIG. 26) is set larger than an entire distance of the stack area of the flat tubes 44 in the stack direction.

As shown in FIG. 26, the cylindrical main body 77 is constructed by a seal surface 79 for closing one side ends (top ends) of the flat tubes 44 and a spiral recess portion (cut-out portion) 80 for opening the one side ends of flat tubes 44. In FIG. 26, the seal surface 79 is shown by the stipple area. As shown in FIG. 27, a maximum cooling area MC, a maximum heating area MH and a temperature control area TC are provided by combining the seal surface 79 and the recess portion 80. The maximum cooling area MC is provided in a small angle range in a circumferential direction of the cylindrical surface of the cylindrical main body 77, and the maximum heating area MH is provided in a small angle area adjacent to the maximum cooling area MC. The temperature control area TC is provided in a residual angle area in the circumferential direction of the cylindrical surface of the cylindrical main body 77 except for the maximum cooling area MC and the maximum heating area MH.

Next, the structure of the cylindrical main body 77 will be now described in detail. The seal surface 79 is formed along an entire length in an axial direction of the cylindrical main body 77, in the maximum cooling area MC in a circumferential direction of the cylindrical main body 77. Therefore, when the cylindrical main body 77 is rotated so that its maximum cooling area MC faces the one side ends of the flat tubes 44, all the one side ends of the flat tubes 44 can be closed by the seal surface 79 at the same time. As shown in FIG. 26, each of the one side ends of the flat tubes 44 protrudes into the inlet tank 41 by a very small dimension, and is press-fitted into each hole 81a of a seal member 81. The seal member 81 is a sheet member made of a rubber-group elastic material, and has the approximately same axial length as that of the cylindrical main body 77. In the circumferential direction of the cylindrical main body 77, the seal member 81 has a dimension larger than a major dimension of an opening of each flat tube 44. Further, the seal member 81 has the holes 81a into which the one side ends of all flat tubes 44 are press-fitted, respectively.

The seal member 81 has a sheet thickness that is larger than a protruding dimension of the one side end of each flat tube 44 protruding into the inlet tank 41. The seal member 81 is disposed between the inner wall surface of the inlet tank 41 and the seal surface 79 of the cylindrical main body 77, and elastically press-contacts the seal surface 79 of the cylindrical main body 77. Therefore, the seal member 81 has a seal function, so that the one side ends of all flat tubes 44 can be accurately closed by the seal surface 79.

The recess portion 80 is provided along an entire length in the axial direction of the cylindrical main body 77 in the maximum heating area MH in the circumferential direction of the cylindrical main body 77. Therefore, when the cylindrical main body 77 is rotated so that its maximum heating area MH faces the one side ends of the flat tubes 44, all the one side ends of the flat tubes 44 can communicate with the inside of the cylindrical main body 77 through the recess portion 80 at the same time. That is, all the one side ends of the flat tubes 44 are opened by the recess portion 80 at the same time.

The cylindrical main body 77 has an opening peripheral end 80a for defining the recess portion 80 at one side in the circumferential direction. The opening peripheral end 80a of the recess portion 80 is parallel to the axial direction of the cylindrical main body 77. At the other side in the circumferential direction, the cylindrical main body 77 has an opening peripheral end 80b for defining the recess portion 80. The opening peripheral end 80b is tilted with respect to the axial direction, so that the spiral shape of the recess portion 80 is formed. Therefore, at an upper end (at the side of the opening 78) of the cylindrical main body 77 in the axial direction, the opening area of the recess portion 80 in the circumferential direction becomes smallest. As the position is changed from the upper end to the lower end (i.e., end opposite to the opening 78) of the cylindrical main body 77 in the axial direction, the opening area of the recess portion 80 is enlarged in the circumferential direction. That is, the opening area of the recess portion 80 becomes largest in the circumferential direction at the lower end in the axial direction.

Further, a support disk 82 is formed at the lower end of the cylindrical main body 77, and a drive shaft 83 is integrally formed to protrude from the center of the support disk 82. The cylindrical main body 77, the support disk 82 and the drive shaft 83 are integrally molded using resin. Further, the flow control member 52 is made of resin, and the seal member 81 is made of a rubber-group elastic material. Thus, in the sixteenth embodiment, after the heater core 4 is assembled by integral brazing while the lower end of the inlet tank 41 is opened, the seal member 81 is attached from the opening at the lower end into the inlet tank 41. Thereafter, the flow control member 52 including the cylindrical main body 77 is attached from the opening at the lower end into the inlet tank 41.

Then, a cap 84 for closing the opening at the lower end of the inlet tank 41 is attached. The cap 84 is a disk member made of metal or resin, and has a bearing hole 84a, for rotatably supporting the drive shaft 83, at its center. Therefore, the cap 84 can be attached into the opening at the lower end of the inlet tank 41 using the fastening member (not shown) such as screws while the drive shaft 83 is fitted into the bearing hole 84a to protrude outside the cap 84. Here, seal members such as O-rings are provided on a fitting surface between the drive shaft 83 and the bearing hole 84a, and a contact surface between the cap 84 and the opening at the lower end of the inlet tank 41, respectively, thereby preventing water from leaking outside. Further, a top end of the drive shaft 83, protruding outside, is connected to an output shaft of the actuator 50, so that the cylindrical main body 77 of the flow control member 52 can be rotated by the actuator 50.

Next, operations according to the sixth embodiment will be described. When the maximum cooling area MC faces the ends of the flat tubes 44 in the circumferential direction of the cylindrical main body 77 by rotating the cylindrical main body 77 of the flow control member 52 using the actuator 50, the one side ends of all flat tubes 44 can be closed by the seal surface 79 at the same time. Therefore, it can prevent hot water from flowing into the flat tubes 44, so that the entire area of the heat-exchange core portion 43 becomes a hot-water non-flow area, thereby performing the maximum cooling function. In FIG. 27, when the cylindrical main body 77 is rotated from the maximum cooling state in the counterclockwise direction, the temperature control area TC of the cylindrical main body 77 faces the ends of the flat tubes 44. Here, the opening area of the spiral recess portion 80 in the circumferential direction of the cylindrical main body 77 becomes largest at the lower end in the axial direction thereof. As the position is moved from the lower end of the cylindrical main body 77 to the upper end thereof in the axial direction, the opening area of the recess portion 80 in the circumferential direction is reduced.

Accordingly, in FIG. 27, when the cylindrical main body 77 is rotated in the counterclockwise direction, the flat tubes 44 of the heat-exchange core portion 43 communicate with the recess portion 80 to be opened from the lower side in order. Therefore, a number ratio between the flat tubes 44 at the lower side where hot water flows and the flat tubes 44 at the upper side where no hot water flows can be changed by selecting a rotational position of the cylindrical main body 77. Here, the flat tubes 44, where hot water flows, communicates with the spiral recess portion 80, and the flat tubes 44, where no hot water flows, is closed by the seal surface 79. Further, in FIG. 26, the temperature control area TC faces the one side ends of the flat tubes 44 at an intermediate position in the circumferential direction of the cylindrical main body 77. Specifically, the upper area (cool air area) B is slightly larger than the lower area (hot air area) A in the heat-exchange core portion 43.

Furthermore, in FIG. 27, when the cylindrical main body 77 is further rotated in the counterclockwise direction, the maximum heating area MH faces the one side ends of the flat tubes 44 in the circumferential direction. Since the recess portion 80 is provided along the entire axial length in the cylindrical main body 77 at a portion corresponding to the maximum heating area MH, the one side ends of all flat tubes 44 communicate with the recess portion 80 to be opened. Therefore, hot water can flow into all the flat tubes 44, and the entire area of the heat-exchange core portion 43 becomes the hot-water flow area, thereby obtaining the maximum heating function.

Accordingly, in the sixteenth embodiment, because the flow control member 52 is operated as a rotating valve mechanism rotated in the inlet tank 41, the ratio of the hot-water flow area A to the hot-water non-flow area B can be changed by changing the rotation position of the flow control member 52, thereby adjusting the temperature of air blown into the passenger compartment. Therefore, in the sixteenth embodiment, a displacement amount (rotation amount) of the flow control member 52 can be largely reduced as compared with a case where the flow control member 52 is constructed by a sliding valve mechanism that slides in the arrangement direction of the flat tubes 44 as in the first to fifth embodiments. Thus, the displacement time, for which the flow control member 52 is moved between the maximum cooling state MC and the maximum heating state MH, can be largely reduced.

(Seventeenth Embodiment)

Figure 28:
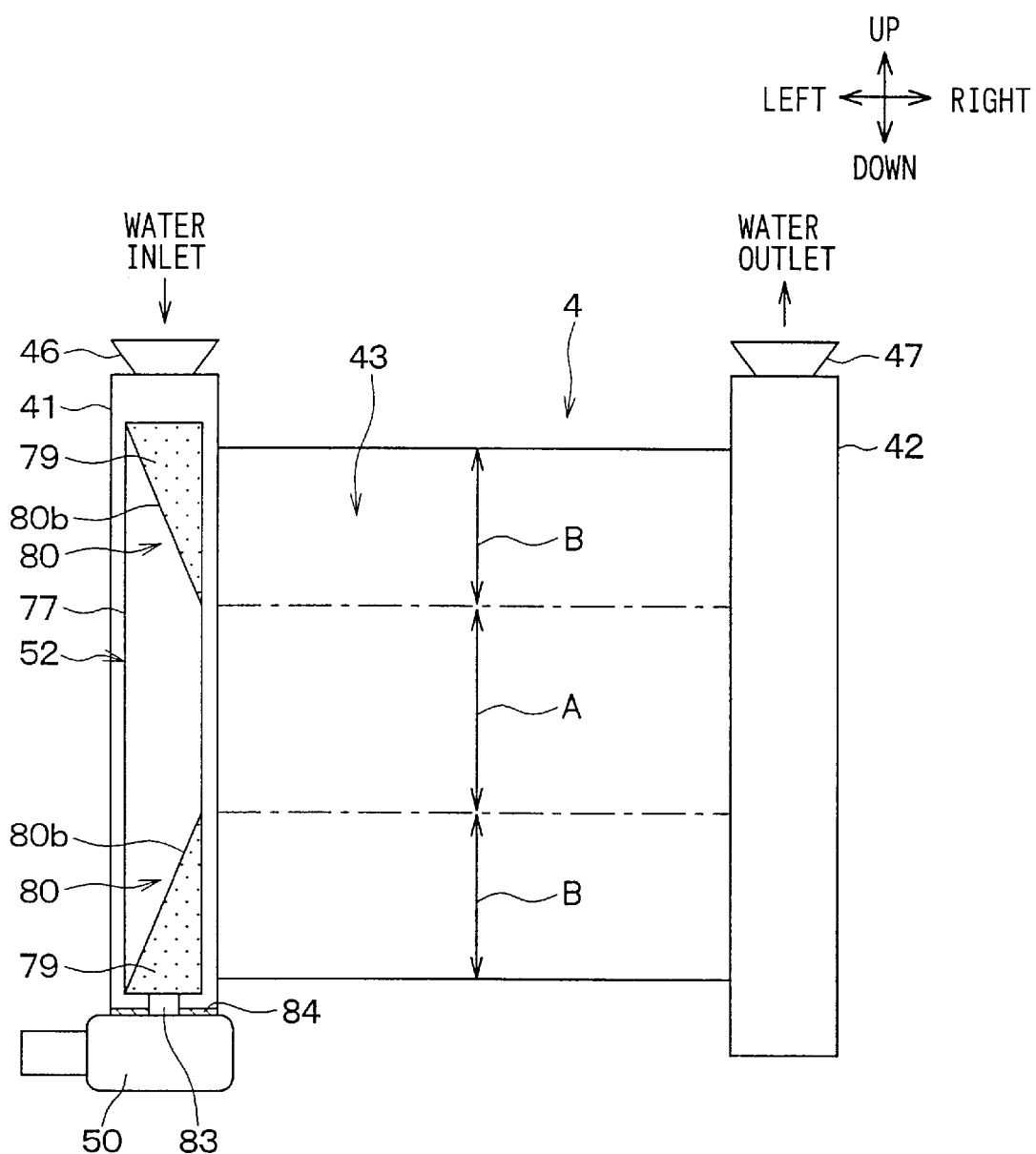
FIG. 28 is a front view showing a heater core according to a seventeenth embodiment of the present invention.

In the above-described sixteenth embodiment, when the temperature control area TC is set, the lower area A is used as the hot-water flow area (hot air area), and the upper area B is used as the hot-water non-flow area (cool air area) in the heat-exchange core portion 43. That is, two-layer flow set in the heat-exchange core portion 43. However, in the seventeenth embodiment, as shown in FIG. 28, in the heat-exchange core portion 43 in the up-down direction, the intermediate area is used as the hot-water flow area (hot air area) A, and the upper and lower areas are used as the hot-water non-flow area (cool air area) B. That is, three-layer flow is set in the heat-exchange core portion 43 by the flow control member 52. Accordingly, in the seventeenth embodiment, two spiral recess portions 80 are symmetrically provided in the cylindrical control member 77 of the flow control member 52 at the upper and lower sides in the axial direction. Specifically, the largest opening area of each spiral recess portion 80 in the circumferential direction is located at the side of the intermediate area A. In the seventh embodiment, the other parts are similar to those of the above-described sixteenth embodiment.

(Eighteenth Embodiment)

Figure 29:
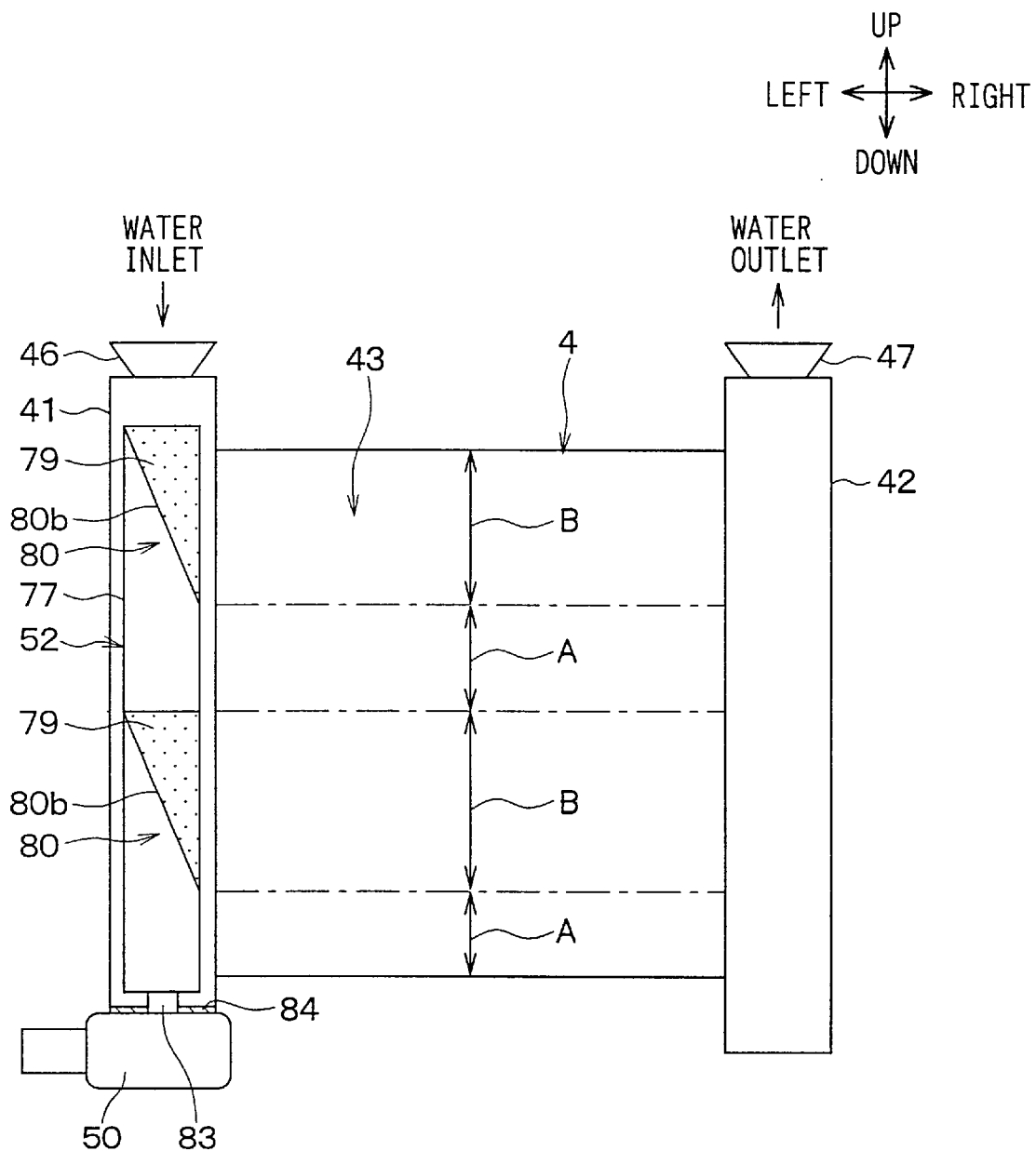
FIG. 29 is a front view showing a heater core according to an eighteenth embodiment of the present invention.

The eighteenth embodiment is a modification of the above-described sixteenth and seventeenth embodiments. As shown in FIG. 29, in the heat-exchange core portion 43 of the heater core 4, two hot-water flow areas (hot air areas) A and two hot-water non-flow areas (cool air areas) B are set to form a four-layer flow when the temperature control area TC is set. The single flow control member 52 is used in the above-described sixteenth embodiment. However, in the eighteenth embodiment, two flow control members 52 described in the sixteenth embodiment are integrally stacked in the axial direction of the flow control member 52. As seen from the seventeenth and eighteenth embodiments, when the flow control member 52 is constructed by a rotating valve mechanism, plural-layer flow such as three-layer flow and four-layer flow can be readily set in the heat-exchange core portion 43 without complicating the hot-water pipe structure or without increasing the operation angle of the actuator. Further, because the three-layer flow or the four-layer flow is set in the heat-exchange core portion 43, the contact area between the hot air and the cool air can be increased, and the mixing performance of the hot air and the cool air can be further improved.

(Nineteenth Embodiment)

Figure 30:
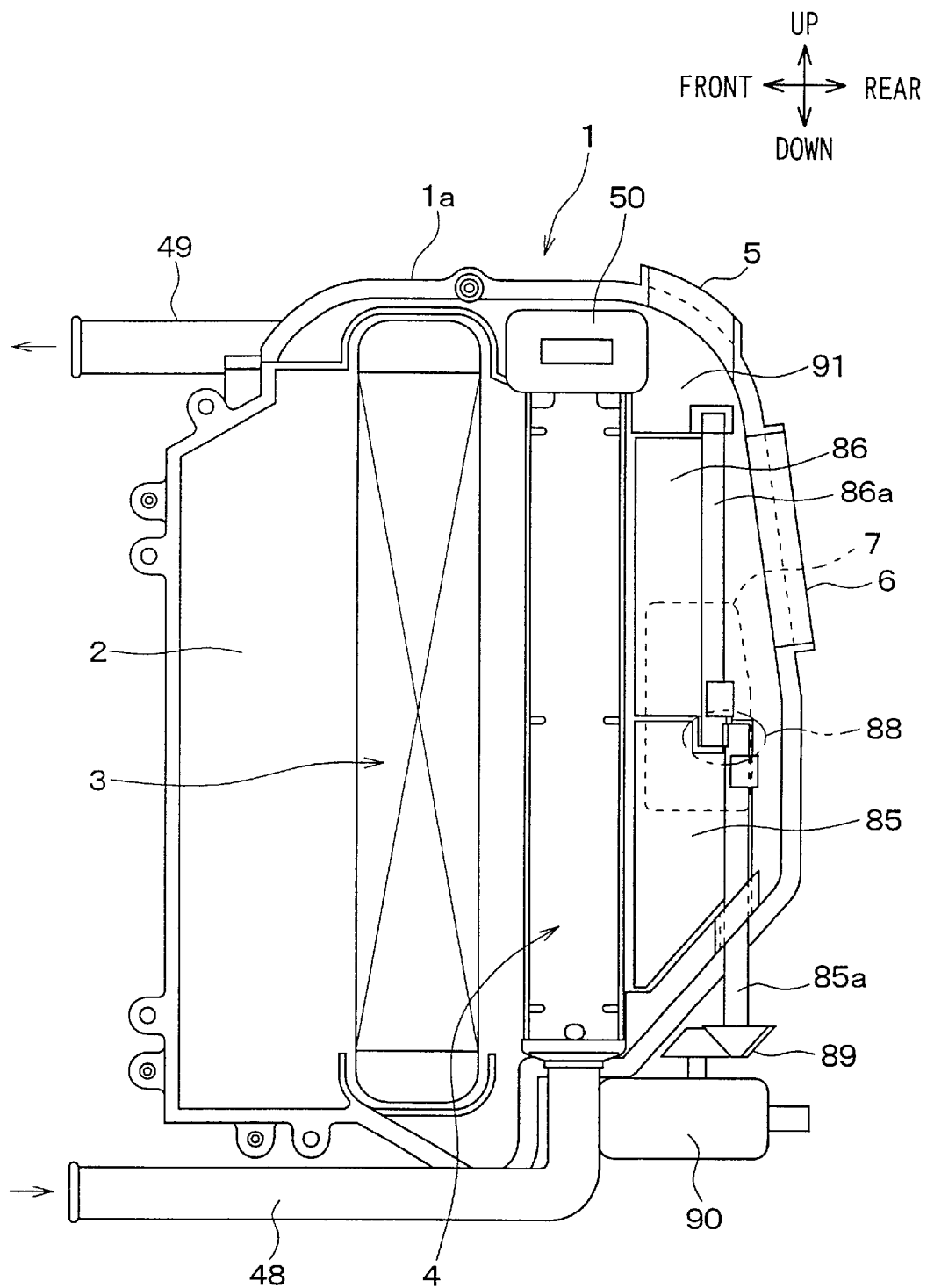
FIG. 30 is a side view showing an air conditioning unit in a condition where a side case part of an air conditioning case is removed, according to a nineteenth embodiment of the present invention.

In the nineteenth embodiment, a right-left independent temperature control is added. In the right-left independent temperature control, the temperature of air blown into the left area (e.g., front passenger-seat side area in a right steering vehicle) in the passenger compartment and the temperature of air blown into the right area (e.g., driver-seat side area in the right steering vehicle) of the passenger compartment are independently controlled. In the nineteenth embodiment, as shown in FIG. 30, basic structures of the air conditioning unit 1 and the heater core 4 are identical to those in the first embodiment (FIGS. 1, 2).

Figure 31C:
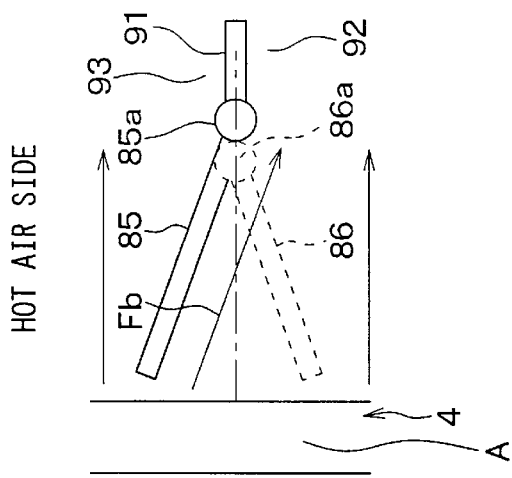
FIG. 31C is a schematic diagram showing an operation position of the hot-air dividing door.
Figure 31B:
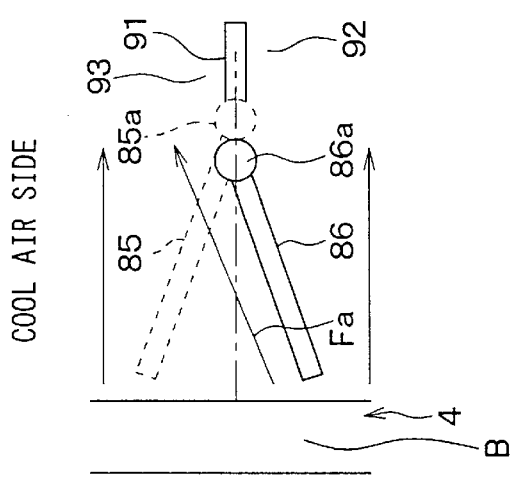
FIG. 31B is a schematic diagram showing an operation position of the cool-air dividing door.
Figure 31A:
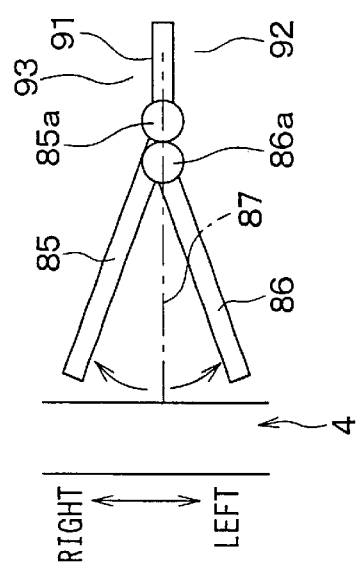
FIG. 31A is a schematic diagram showing an arrangement of a hot-air dividing door and a cool-air dividing door according to the nineteenth embodiment.

In the heater core 4, as shown in FIG. 2, the lower area A is used as the hot-water flow area (hot air area) by the flow control member 52, and the upper area B is used as the hot-water non-flow area (cool air area). In the nineteenth embodiment, a hot-air dividing door 85 for dividing the hot air into right and left sides is disposed on the downstream air side of the heater core 4 at a lower side position, and a cool-air dividing door 86 for dividing the cool air into the right and left sides is disposed on the downstream air side of the heater core 4 at an upper side position. As shown in FIGS. 31A, 31B, 31C, rotation shafts 85a, 85b of both the doors 85, 86 are disposed at positions separated from the heater core 4 to its downstream air side, respectively. Further, the rotation shafts 85a, 85b are disposed on a center line 87 of the air conditioning unit 1 (heater core 4) in the right-left direction. Here, the rotation shaft 85a, 85b are disposed to extend in the up-down direction, that is, in the tube arrangement direction (stack direction) of heater core 4. Therefore, the hot-air dividing door 85 is rotated around the rotation shaft 85a in the right-left direction in the hot air area A at the lower side. The cool-air dividing door 86 is rotated around the rotation shaft 86a in the right-left direction in the cool air area B at the upper side.

Further, the rotation shafts 85a, 86a are disposed while being offset from each other in the vehicle front-rear direction by a distance corresponding to any one of their diameters of the rotation shafts 85a, 86a. In the nineteenth embodiment, the rotation shaft 85a at the lower side is disposed at the vehicle rear side of the rotation shaft 86a at the upper side. Here, gear portions are formed at an upper end of the lower side rotation shaft 85a and at a lower end of the upper side rotation shaft 86a, respectively, so that both the doors 85, 86 are operatively linked with each other. In addition, the rotation shafts 85a, 86a constructs a gear connection portion 88 shown in FIG. 30. A lower end of the rotation shaft 85a protrudes outside the air conditioning case 1a, and is connected to an output shaft of an actuator 90 for controlling the air temperature at the right and left sides through a gear connection portion 89 that is constructed by a bevel gear. Therefore, the two rotation shafts 85a, 86a are rotated by rotational driving force from the actuator 90 in reverse directions opposite to each other, respectively.

In the inner space of the air conditioning case 1a, a partition plate 91 extending in the up-down direction is provided at the downstream air side (vehicle rear side) of the doors 85, 86 at the center in the right-left direction. The partition plate 91 partitions the inner space of the air conditioning case 1a into a right side space 93 and a left side space 92 as shown in FIGS. 31A–31C. Further, each of the defroster opening 5, the face opening 6 and the foot opening 7 is divided into a left side opening and a right side opening communicating with the left side space 92 and the right side space 93, respectively.

Next, operations according to the nineteenth embodiment will be described with reference to FIGS. 31A–31C. When the cool-air dividing door 86 is rotated around the rotation shaft 86a to the left side as shown in FIG. 31B, the hot-air dividing door 85 is rotated around the rotation shaft 85a to the right side as shown in FIG. 31C to be operatively linked with the operation of the cool-air dividing door 86. Therefore, as shown in FIG. 31B, cool air Fa around the center in the right-left direction within the cool air area B at the upper side of the heater core 4 flows into the right side space 93 by the cool-air dividing door 86. Accordingly, the amount of cool air flowing into the right side space 93 is increased, and the amount of cool air flowing into the left side space 92 is reduced. On the other hand, as shown in FIG. 31C, hot air Fb around the center in the right-left direction within the hot air area A at the lower side of the heater core 4 flows into the left side space 92 by the hot-air dividing door 85. Accordingly, the amount of hot air flowing into the left side space 92 is increased, and the amount of hot air flowing into the right side space 93 is reduced. Thus, in this case, the temperature of air blown from the left side space 92 is high, and the temperature of air blown from the right side space 93 is low.

On the contrary, when the cool-air dividing door 86 is rotated to the right side while the hot-air dividing door 85 is rotated to the left side, the temperature of air blown from the left side space 92 is low, and the temperature of air blown from the right side space 93 is high. A temperature difference between air blown from the right and left side spaces 92, 93 can be adjusted by controlling the open degrees of the doors 85, 86.

The left side space 92 and the right side space 93 are partitioned by the partition plate 91, and each of the blower openings 5–7 is provided in the left side space 92 and the right side space 93. Therefore, the temperature of air blown from the opening 5–7 to the left side area in the passenger compartment can be set different from the temperature of air blown from the openings 5–7 to the right side area of the passenger compartment. The hot-air dividing door 85 and the cool-air dividing door 86 are rotated in the reverse directions opposite to each other. Therefore, the amounts of cool air and hot air can be increased and decreased reversely for the right and left side spaces 93, 92. Accordingly, the temperature of air blown from the right side space 93 and the temperature of air blown from the left side space 92 can be independently adjusted while an amount ratio of air blown from the right side space 93 to air blown from the left side space 92 is maintained constant.

The right-left independent temperature control according to the nineteenth embodiment can be performed by the automatic control of the air-conditioning electronic control unit 53 shown in FIG. 2. Next, the automatic control will be described. A left-side temperature setting switch, for setting the air temperature in the left side area of the passenger compartment, and a right-side temperature setting switch, for setting the air temperature in the right side area of the passenger compartment, are provided on the air-conditioning control panel 55 shown in FIG. 2. A left-side target air temperature TAO1 is calculated by the air-conditioning electronic control unit 53 based on a left-side set temperature Tset1 set by the left-side temperature setting switch and the like. Further, a right-side target air temperature TAO2 is calculated by the air-conditioning electronic control unit 53 based on a right-side set temperature Tset2 set by the right-side temperature setting switch and the like (refer to the formula (1)). Then, the target operation position SW of the flow control member 52 is calculated based on an average temperature of the left-side target air temperature TAO1 and the right-side target air temperature TAO2 (refer to the formula (2)). The operation position of the flow control member 52 is controlled by the actuator 50 to be set at the target operation position SW.

Further, the open degrees of the hot-air dividing door 85 and the cool-air dividing door 86 are adjusted by the actuator 90 so that the temperature difference between the left-side set temperature Tset1 and the right-side set temperature Tset2 can be obtained.

(Twentieth Embodiment)

Figure 32:
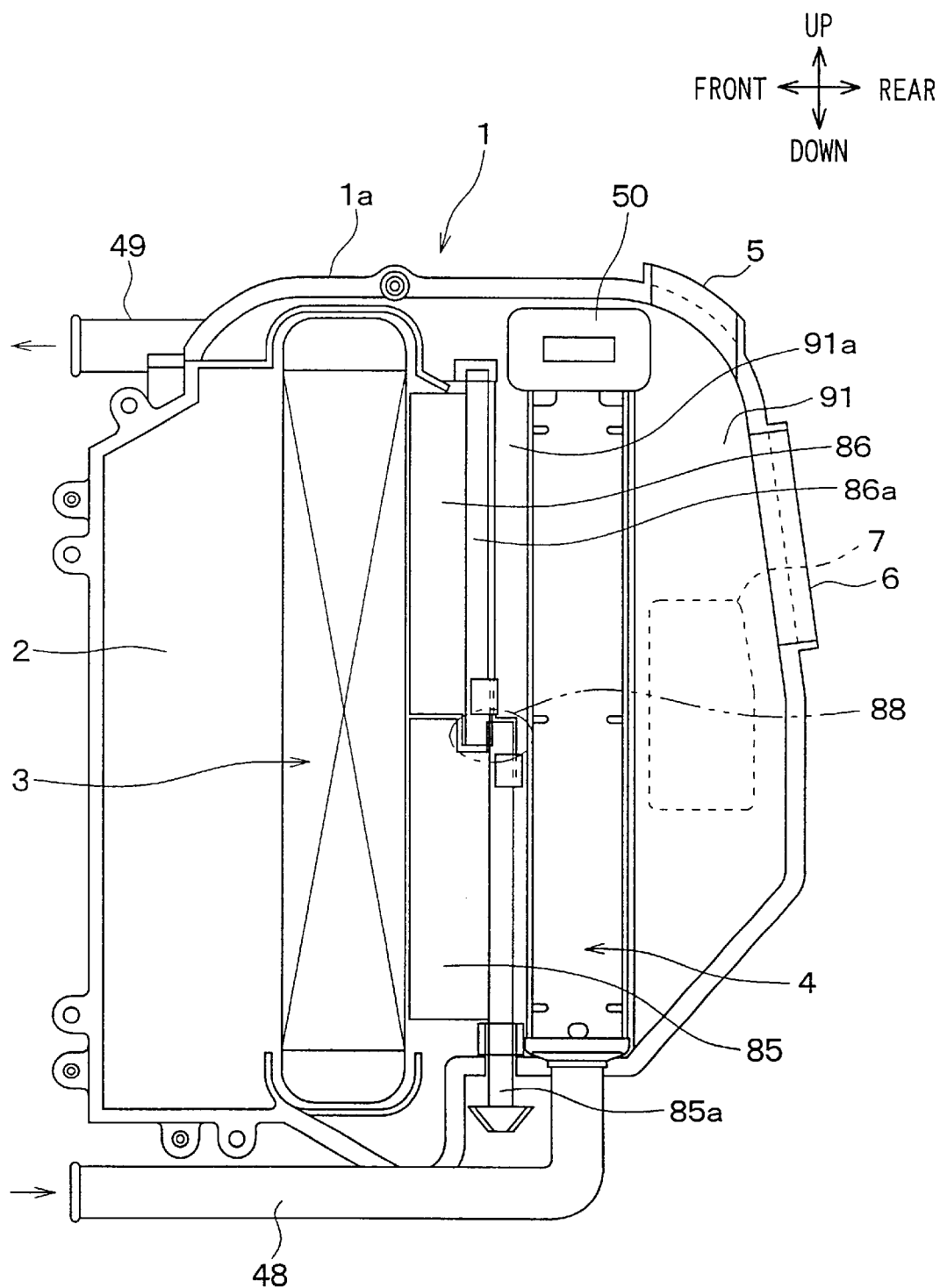
FIG. 32 is a side view showing an air conditioning unit in a condition where a side case part of an air conditioning case is removed, according to a twentieth embodiment of the present invention.

In the nineteenth embodiment, the hot-air dividing door 85 and the cool-air dividing door 86 are disposed at the downstream side of the heater core 4. However, in the twentieth embodiment, as shown in FIG. 32, both the doors 85, 86 are disposed at the upstream air side of the heater core 4. Also in the twentieth embodiment, the right-left independent temperature control described in the nineteenth embodiment can be obtained. In the twentieth embodiment, since both the doors 85, 86 are disposed at the upstream air side of the heater core 4, the partition plate 91 is disposed directly at the downstream air side of the heater core 4 to partition the downstream side space into the right and left spaces. Also at the upstream air side of the heater core 4, a partition portion 91a is disposed for partitioning a space between the rotation shafts 85a, 86a and the heater core 4 into the right and left spaces. In the twentieth embodiment, the operations of the doors 85, 86 can be set similar to those in the above-described nineteenth embodiment.

In the above-described nineteenth and twentieth embodiments, both of the hot-air dividing door 85 and the cool-air dividing door 86 are used to perform the right-left independent temperature control. However, any one of the doors 85, 86, for example, only the hot-air dividing door 85 can be used to adjust the amount ratio between air supplied to the left side area and air supplied to the right side area, thereby performing the right-left independent temperature control. However, when only one dividing door is used, the air blowing amounts toward the right and left sides are changed.

(Twenty-first Embodiment)

Figure 33:
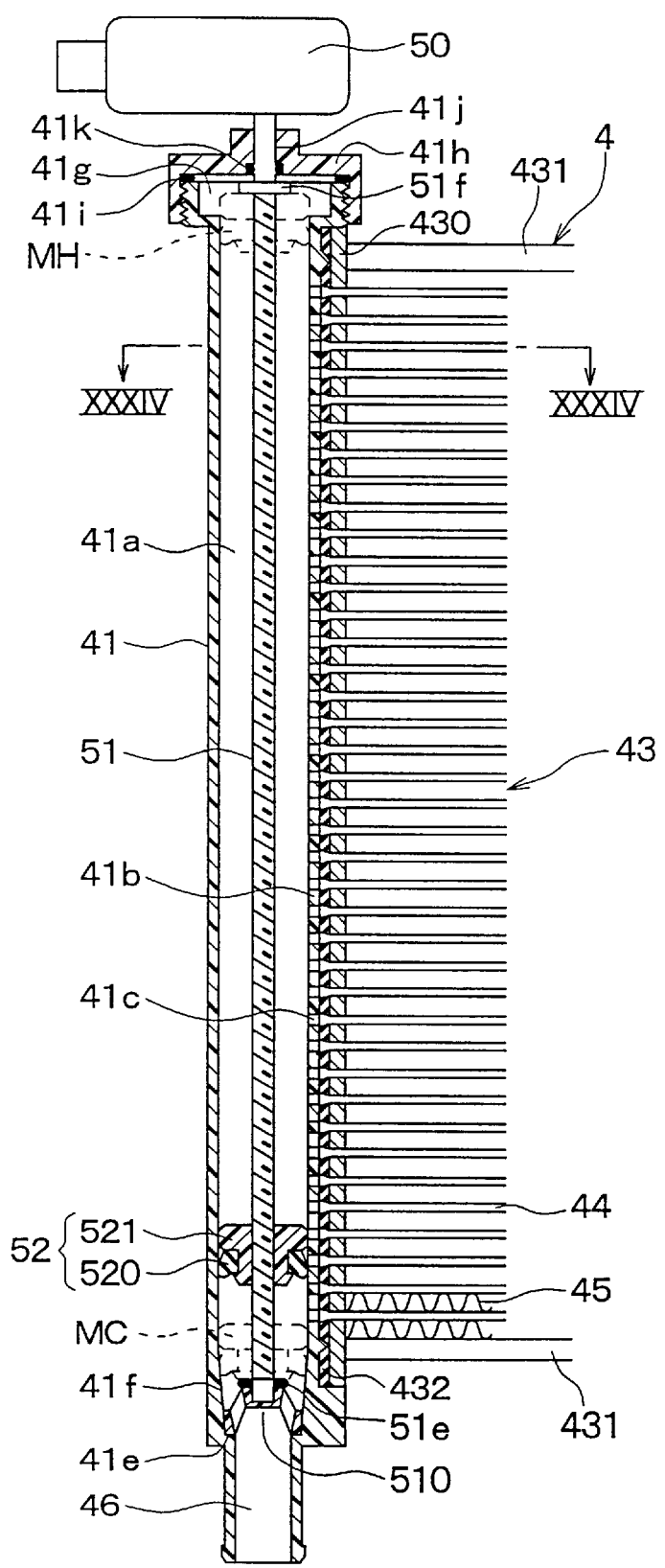
FIG. 33 is a sectional view showing a main part of a heater core according to a twenty-first embodiment of the present invention.
Figure 34:
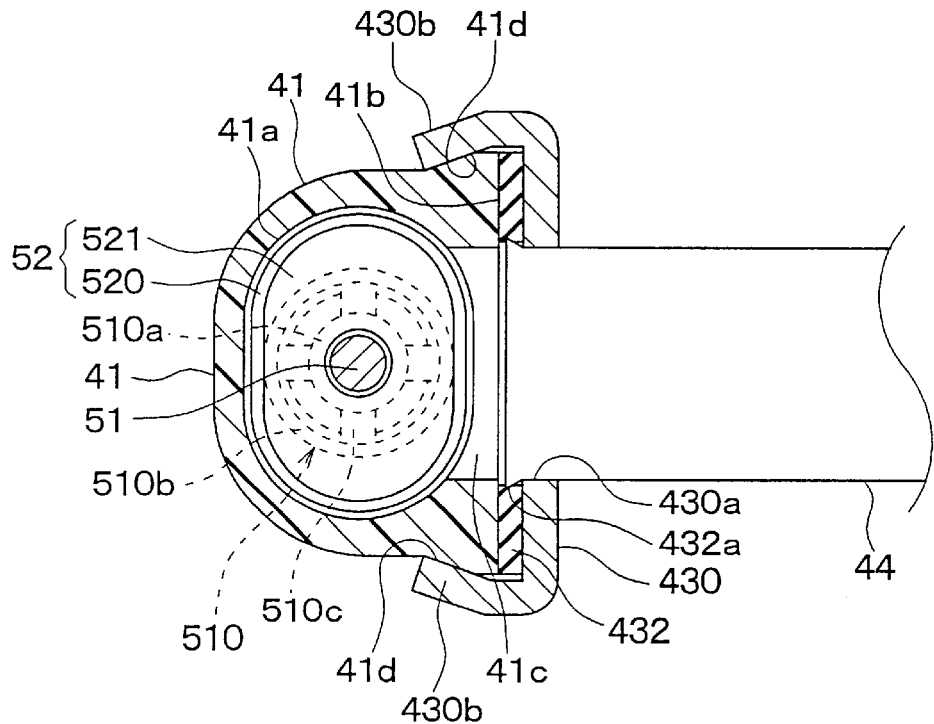
FIG. 34 is a sectional view taken along line XXXIV—XXXIV in FIG. 33.

In the twenty-first embodiment, detail structures of the flow control member 52 and the heater core 4 described in the first embodiment will be now described. FIG. 33 is a sectional view showing the inlet tank 41 of the heater core 4 according to the twenty-first embodiment of the present invention. As shown in FIG. 33, the inlet tank 41 is molded by using resin into a cylindrical shape. The inlet tank 41 has a tank inner space 41a formed into a non-circular cross section such as an elliptical cross section, as shown in FIG. 34. The inlet tank 41 includes the flow control member 52 therein, and functions as a valve housing in which the flow control member 52 is moved in the longitudinal direction of the inlet tank 41 (tube arrangement direction). As in the first embodiment, since the inlet tank 41 includes the non-circular cross section, it can prevent the flow control member 52 from being rotated relative to the inlet tank 41.

The inlet tank 41 is disposed at one end side of the heater core 4 in its right-left direction to extend in the up-down direction. The water inlet 46 is provided at the lower end of the inlet tank 41, that is, at one end thereof in the longitudinal direction. The water inlet 46 is provided in a pipe shape by integral molding together with the inlet tank 41 to protrude from the lower end of the inlet tank 41 in the longitudinal direction. As shown in FIG. 34, an outer peripheral surface of the inlet tank 41 has a plane portion 41b at the side of the heat-exchange core portion 43. The plane portion 41b includes holes 41c arranged in the tank longitudinal direction of the inlet tank 41. The holes 41c are opened from the inner space 41a of the inlet tank 41 to the outside of the plane portion 41b, and one side ends of the flat tubes 44 communicate with the inner space 41a through the hole 41c.

Figure 35:
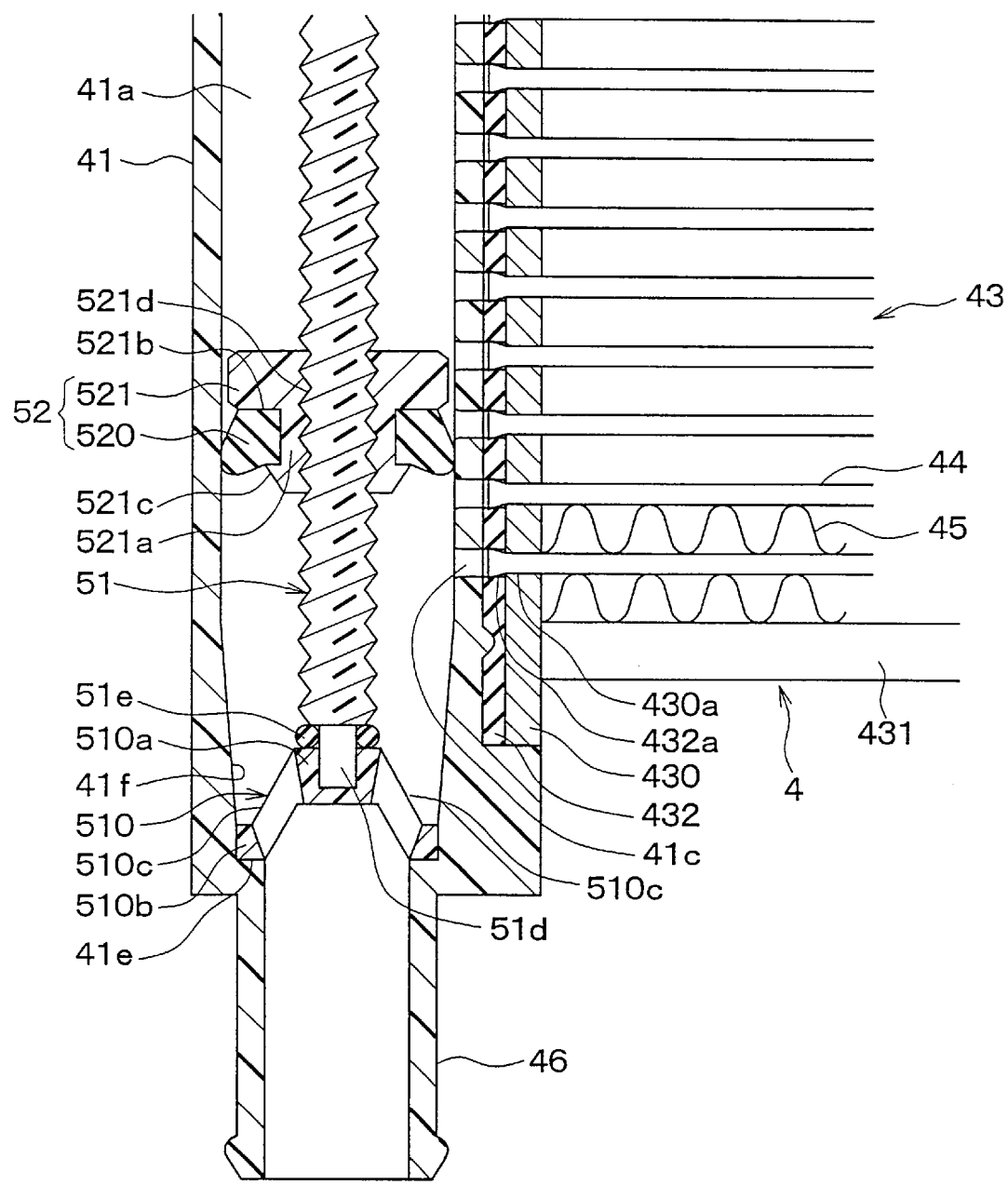
FIG. 35 is an enlarged sectional view showing a main part of a shaft support part in FIG. 33.

At one side of the heat-exchange core portion 43 in the right-left direction, a support plate 430 is disposed to support the one side end of each flat tube 44. As shown in FIGS. 34, 35, the support plate 430 has holes 430a arranged in the tank longitudinal direction (i.e., in the up-down direction), and the one side ends of the flat tubes 44 are inserted into the holes 430a. Side plates 431 are disposed at the upper and lower sides of the heat-exchange core portion 43, as shown in FIG. 33. The side plates 431 and the support plate 430 are made of aluminum, similarly to the flat tubes 44, the corrugate fins 45, the outlet tank 42 (refer to FIG. 2) and the like. These components are temporarily assembled to a predetermined structure, and are integrally brazed to each other in a furnace.

The plane portion 41b of the inlet tank 41 is formed to extend along an entire length of the support plate 430 in the up-down direction, and a sheet-like seal member 432 made of a rubber-group elastic material is disposed between the plane portion 41b and the support plate 430. As shown in FIGS. 34 and 35, the seal member 432 includes holes 432a arranged in the up-down direction, and one side ends of the flat tubes 44 are inserted into the holes 432*a*. Here, each of the holes 41*c,* 430*a,* 432*a* has an opening shape corresponding to the flat sectional shape of each flat tube 44.

After the integrally brazing of the heat-exchange core portion 43 is ended, the one side ends of the flat tubes 44 protrude outside the support plate 43 by a predetermined dimension. Then, the seal member 432 is attached to the outside of the support plate 430 so that each hole 432*a* of the seal member 432 fits onto the protrusion of each flat tube 44. Since a protrusion dimension of each flat tube 44 from the support plate 430 to the outside is smaller than the thickness of the seal member 432, the one side ends of the flat tubes 44 are positioned within the holes 432*a* of the seal member 432. Thereafter, the plane portion 41*b* of the inlet tank 41 is pressed onto the seal member 432 so that the positions of the holes 41*c* of the inlet tank 41 correspond to the positions of the one side ends of the flat tubes 44 and the holes 432*a* of the seal member 432. Next, as shown in FIG. 34, the inlet tank 41 is fixed to the support plate 430 through the seal member 432 by crimping a crimp portion 430*b* (fastening member) of the support plate 430 to an enlarged slant surface 41*d* of the inlet tank 41.

The crimp portion 430*b* protrudes from both front and rear side surfaces of the support plate 430 in the front-rear direction. In the twenty-first embodiment, the plural crimp portions 430*b* are formed on both the side surfaces of the support plate 430 in the tank longitudinal direction (i.e., in the up-down direction). Further, as shown in FIG. 34, a width dimension of the plane portion 41*b* is made larger than a major dimension of the elliptical sectional shape of the inlet tank 41, so that the enlarged slant surface 41*d* is formed. When the inlet tank 41 is fixed to the support plate 430 by the crimping (fastening), the seal member 432 is elastically press-fitted onto both of the plane portion 41*b* of the inlet tank 41 and the support plate 430. Therefore, the connection portion between the one side ends of the flat tubes 44 and the holes 41*c* can be tightly sealed.

Next, attachment structures of the actuator 50, the screw rotation shaft 51 and the flow control member 52, relative to the inlet tank 41, will be now described in detail. The components 50–52 can be attached to the inlet tank 41 in a state where the inlet tank 41 is fixed to the support plate 430 by the crimping (fastening), or in a state of the single inlet tank 41. As shown in FIG. 35, the flow control member 52 is constructed by a valve body 520 and a valve seat 521. The valve body 520 is formed of a rubber-group elastic material into a ring shape. Here, an outer peripheral surface of the valve body 520 is not a real circular shape, but an elliptical shape, to be fitted into the inner surface defining the inner space 41*a* of the inlet tank 41 while sliding on the inner surface of the inlet tank 41.

The valve seat 521 is a rigid member for supporting and fixing the valve body 520. For example, the valve seat 521 can be made of a resinous material. The valve seat 521 includes a cylindrical portion 521*a,* a flange portion 521*b* at one end of the cylindrical portion 521*a,* and a claw portion 521*c* at the other end of the cylindrical portion 521*a*. The flange portion 521*b* is enlarged to an outer radial side of the cylindrical portion 521*a,* and the claw portion 521*c* protrudes from the cylindrical portion 521*a* to prevent the valve body 520 from falling out from the valve seat 521. Since a predetermined clearance is provided between an outer peripheral surface of the flange portion 521*b* and the inner surface of the inlet tank 41, the outer peripheral surface of the flange portion 521*b* does not contact the inner surface of the inlet tank 41. The ring-shaped valve body 520 is press-fitted onto and fixed to an outer peripheral surface of the cylindrical portion 521*a* over the claw portion 521*c*. A female screw portion 521*d* is formed on an inner peripheral portion of the cylindrical portion 521*a,* and is engaged and connected to a male screw portion of the screw rotation shaft 51.

Figure 36:
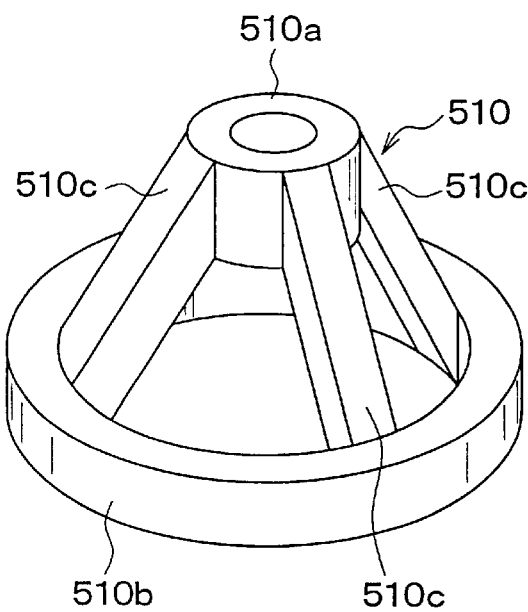
FIG. 36 is an enlarged perspective view showing the shaft support member shown in FIG. 35.

The screw rotation shaft 51 is a resinous or metal shaft member including the male screw portion on its outer peripheral surface, as in the first embodiment. The screw rotation shaft 51 is disposed in the inlet tank 41 to extend along the entire length of the inlet tank 41 in its longitudinal direction. The lower end of the screw rotation shaft 51 is located at the lower end side of the inlet tank 41, and is supported by a shaft support member 510. The shaft support member 510 is a resinous member, and includes a support base 510*a,* a fixing ring 510*b* and plural (e.g., four) connecting leg portions 510*c,* as shown in FIG. 36. The support base 510*a* has a circular recess portion into which the lower end of the screw rotation shaft 51 is rotatably fitted, and the fixing ring 510*b* is press-fitted onto a bottom step portion 41*e* in the inlet tank 41. The plural connecting leg portions 510*c* are integrally connected to the support base 510*a* and the fixing ring 510*b,* as shown in FIG. 36.

As shown in FIG. 35, the screw rotation shaft 51 includes a small diameter portion 51*d* at the bottom end, and a seal member 51*e* such as an O-ring is disposed around the small diameter portion 51*d* at an upper side (at a side of the male screw). Here, an attachment position of the seal member 51 to the small diameter portion 51*a* is determined by a step portion between the small diameter portion 51*d* and the male screw portion of the screw rotation shaft 51. In FIG. 35, the inlet tank 41 includes a taper portion 41*f* between the water inlet 46 and the lowest flat tube 44 in the tank longitudinal direction. The lowest flat tube 44 is most adjacent to the water inlet 46 in the tank longitudinal direction (i.e., up-down direction). A cross-section area of an inner space of the inlet tank 41 is gradually reduced by forming the taper portion 41*f,* from the position of the lowest flat tube 44 to the water inlet 46 in the tank longitudinal direction.

As shown in FIG. 33, the inlet tank 41 includes an opening 41*g* at an end opposite to the water inlet 46, that is, at its upper end. The opening 41*g* is for inserting both the screw rotation shaft 51 and the flow control member 52 screwed on the screw rotation shaft 51, into the inlet tank 41. The opening 41*g* has a circular shape whose diameter is equal to or larger than the major dimension in the sectional shape of the valve body 520 of the flow control member 52 having the elliptical shape. The opening 41*g* is closed by a cap member 41*h* having a circular shape, and the cap member 41*h* is attached by using the screwing member onto an outer peripheral portion of the inlet tank 41 at the opening 41*g* to be detachable. Therefore, the flow control member 52 and the screw rotation shaft 51 can be readily attached into or removed from the inlet tank 41, thereby improving maintenance performance. A seal member 41*i* such as an O-ring is disposed between an inner surface of the cap member 41*h* and an end surface of the inlet tank 41 at the opening 41*g* to seal a clearance therebetween.

The cap member 41*h* includes a circular bearing hole 41*j* at its center, and the screw rotation shaft 51 is rotatably supported in the bearing hole 41*j* of the cap member 41*h*. The screw rotation shaft 51 protrudes outside the cap member 41*h* through the bearing hole 41*j,* and is connected to the actuator 50. A seal member 41*k* such as an O-ring is disposed in the bearing hole 41*j* to seal a clearance between the screw rotation shaft 51 and the cap member 41*h*. The screw rotation shaft 51 includes a circular stopper portion 51f, for setting the maximum heating position (broken-line position MH at the upper side in FIG. 33), inside the opening 41g. Since the basic operation of the flow control member 52 according to the twenty-first embodiment can be set similar to that according to the first embodiment shown in FIG. 2, the operation of the flow control member 52 is omitted.

Hot water is prevented from flowing in all the flat tubes 44, at the maximum cooling position indicated by the broken-line position MC in FIG. 33. At the maximum cooling position MC, the flow control member 52 is disposed lower than the lowest flat tubes 44, and the valve body 520 of the flow control member 52 is positioned in the taper portion 41f of the inlet tank 41. Since the cross-section area of the inner space of the taper portion 41f is gradually reduced from the position of the lowest flat tube 44 to the water inlet 46 in the tank longitudinal direction, the valve body 520 made of an elastic material can be strongly press-fitted onto the inner surface of the taper portion 41f. Therefore, it can accurately prevent hot water from leaking outside through a clearance between the outer peripheral surface of the valve body 520 and the inner surface of the inlet tank 41.

Further, at the maximum cooling position MC, the top end of the cylindrical portion 521a of the valve seat 521 made of the rigid material is press-fitted to the seal member 51e on the small diameter portion 51d of the screw rotation shaft 51. Therefore, a screw connection portion between the female screw portion 521d on the inner peripheral surface of the cylindrical portion 521a of the valve seat 521 and the male screw portion of the screw rotation shaft 51 is tightly sealed, thereby surely preventing hot water from leaking outside through the screw connection portion. Accordingly, at the maximum cooling position MC, it can prevent hot water from leaking to the upper side of the flow control member 52, thereby ensuring maximum cooling performance.

When the flow control member 52 is positioned at the maximum heating position (upper broken-line position MH in FIG. 33), that is, at an upper side of the highest flat tube 44, hot water flows into all the flat tubes 44. In this case, the valve seat 521 of the flow control member 52 contacts the circular stopper portion 51f of the screw rotation shaft 51, so that the maximum heating position MH is determined. The inlet tank 41 has a non-circular cross-section such as the elliptical cross-section in the first embodiment and the twenty-first embodiment and the like. However, the inlet tank 41 can be formed into a non-circular cross-section such as a polygonal cross-section.

In the first and twenty-first embodiments, the valve body 520 of the flow control member 52 is fitted into the inlet tank 41 having a non-circular cross-section such as the elliptical cross-section, thereby preventing the flow control member 52 from being rotated. However, even when the inlet tank 41 is formed into a real circular cross-section, the flow control member 52 can be prevented from being rotated. For example, a groove or a rib, extending in parallel to the screw rotation shaft 51, can be provided on the inner surface of the inlet tank 41. In this case, a rib or a groove, to be engaged with the groove or the rib on the inner surface of the inlet tank 41, respectively, can be provided on the valve seat 521 of the flow control member 52. This modification can be also applied to the case where the flow control member 52b is disposed in the outlet tank 42 as shown in FIG. 5.

In the above-described twenty-first embodiment of the present invention, the inlet tank 41 and the support plate 430 are fixed to each other by the crimping. However, the inlet tank 41 and the support plate 430 can be fixed by using a fastening member such as screws and a metal spring click.

In the above-described twenty-first embodiment, the shaft support member 510 separated from the inlet tank 41 is attached into the inlet tank 41, and the lower end of the screw rotation shaft 51 is supported by the shaft support member 510. However, the lower end of the screw rotation shaft 51 may be supported by a shaft support portion integrated with the inlet tank 41 by integrally molding.

In the above-described twenty-first embodiment, the top ends of the flat tubes 44 are inserted into only the hole 432a of the seal member 432, but are not inserted into the holes 41c of the inlet tank 41. However, the top ends of the flat tubes 44 may be inserted into both of the holes 432a of the seal member 432 and the holes 41c of the inlet tank 41. In this case, the positions of both of the holes 432a of the seal member 432 and the holes 41c of the inlet tank 41 can be readily set. Even in this modification, the top ends of the flat tubes 44 can be disposed within the holes 41c of the inlet tank 41 to be not protruded into the inner space 41a of the inlet tank 41, so that the flow control member 52 smoothly moved in the inlet tank 41.

(Other Embodiments)

In the above-described embodiments, the present invention is typically applied to the vehicle air conditioner having the heater core 4 in which the hot water is used as a heat source. However, the present invention can be applied to a vehicle air conditioner having a heater core which heats air by circulating oil such as an engine oil and an operation oil for a hydraulic machine as a heat source.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An air conditioner for a vehicle having a passenger compartment, comprising:
  an air conditioning case for defining an air passage through which air flows into the passenger compartment;
  a heating heat exchanger, disposed in the air conditioning case, for heating air using a fluid flowing therein as a heating source; and
  a flow control member disposed within the heating heat exchanger to divide the heating heat exchanger into a first area where the fluid flows and a second area where the fluid does not flow, wherein:
  the flow control member changes a ratio between the first area and the second area.

2. The air conditioner according to claim 1, wherein:
  the heating heat exchanger includes a plurality of tubes through which the fluid flows for heating air; and
  the flow control member is disposed to change a ratio between a first number of the tubes in which the fluid flows, and a second number of the tubes in which the fluid does not flow.

3. The air conditioner according to claim 2, further comprising
  a pressure-loss increasing portion that increases an air pressure loss around a one tube among all the tubes, in which the fluid firstly flows, to be larger than that in the other position of the heating heat exchanger.

4. The air conditioner according to claim 2, wherein:
  the heating heat exchanger includes a core portion including all the tubes, through which air flows to perform a heat exchange with the fluid flowing in the tubes; and among all the tubes, one tube into which the fluid firstly flows is disposed at an outermost side in the core portion.

5. The air conditioner according to claim 3, wherein:

the heating heat exchanger includes a core portion including all the tubes, through which air flows to perform a heat exchange with the fluid flowing in the tubes;

the one tube is disposed at an outermost side in the core portion.

6. The air conditioner according to claim 1, wherein the heating heat exchanger is disposed in the air conditioning case to form a bypass passage in the air conditioning case at least at one side of the heating heat exchanger, such that air flows through the bypass passage while bypassing the heating heat exchanger, the air conditioner further comprising:

a bypass door disposed in the air conditioning case for opening and closing the bypass passage.

7. The air conditioner according to claim 6, wherein:

the heating heat exchanger has a fluid inlet from which the fluid flows into the heating heat exchanger;

the fluid inlet is provided at any one end side of the heating heat exchanger disposed in the air conditioning case, in a vertical direction; and the bypass passage and the bypass door are provided at the same side as the fluid inlet, relative to the heating heat exchanger, in the vertical direction.

8. The air conditioner according to claim 1, wherein:

the heating heat exchanger is disposed in the air conditioning case to extend vertically; and the heating heat exchanger has a fluid inlet at a lower end side of the heating heat exchanger, and a fluid outlet at an upper end side of the heating heat exchanger in the vertical direction.

9. The air conditioner according to claim 1, further comprising a partition member disposed in the air conditioning case to partition the air passage at a downstream air side of the heating heat exchanger into a front passage and a rear passage, wherein:

the flow control member includes a front control part disposed to independently control temperature of air flowing into the front passage, and a second control part disposed to independently control temperature of air flowing into the rear passage.

10. The air conditioner according to claim 1, further comprising a plurality of ribs, disposed at a downstream air side of the heating heat exchanger in the air conditioning case, for disturbing an air flow from the heating heat exchanger.

11. The air conditioner according to claim 10, wherein each of the ribs is disposed to extend approximately in parallel with a boundary line between the first area and the second area in the heating heat exchanger.

12. The air conditioner according to claim 10, wherein the ribs are disposed to have a predetermined distance between adjacent two, the predetermined distance being equal to or smaller than 60 mm.

13. The air conditioner according to claim 1, further comprising a guide member, disposed at a downstream air side of the heating heat exchanger in the air conditioning case, for guiding one of air from the first area and air from the second area to a side of the other one.

14. The air conditioner according to claim 1, further comprising:

a partition plate disposed at a downstream air side of the heating heat exchanger in the air conditioning case to define a first passage through which air is blown toward a left side area in the passenger compartment, and a second passage through which air is blown toward a right side area in the passenger compartment; and a flow ratio changing member disposed to change a flow ratio between an air amount flowing from the heating heat exchanger into the first passage, and an air amount flowing from the heating heat exchanger into the second passage.

15. The air conditioner according to claim 14, wherein:

the first area and the second area are arranged in the heating heat exchanger in a vertical direction; and the flow ratio changing member is a door rotated in a vehicle right-left direction around a rotation shaft disposed at an approximate center in the vehicle right-left direction of the heating heat exchanger.

16. The air conditioner according to claim 15, wherein the door is disposed at a downstream air side of the heating heat exchanger.

17. The air conditioner according to claim 15, wherein the door is disposed at an upstream air side of the heating heat exchanger.

18. The air conditioner according to claim 15, wherein the door includes a first door member disposed to correspond to the first area of the heating heat exchanger, and a second door member disposed to correspond to the second area of the heating heat exchanger.

19. The air conditioner according to claim 18, further comprising a single operation mechanism for operating the first door member and the second door member, wherein the first door member and the second door member are connected to the single operation member to be operatively linked with each other.

20. The air conditioner according to claim 19, wherein the first door member and the second door member are disposed to be rotated reversely in the vehicle right-left direction.

21. The air conditioner according to claim 1, wherein:

the heating heat exchanger includes a core portion having a plurality of tubes through which the fluid flows to heat air, and a tank member for distributing the fluid into and for collecting the fluid from the tubes;

the flow control member is disposed in the tank member to be movable in the tank member so that an inner space of the tank member is partitioned in a tube arrangement direction where the tubes are arranged; and the flow control member is moved linearly in the tube arrangement direction to change the ratio between the first area and the second area.

22. The air conditioner according to claim 21, wherein the flow control member is linearly moved in the tank member to change a ratio between a first number of the tubes in which the fluid flows, and a second number of the tubes in which the fluid does not flow.

23. The air conditioner according to claim 1, wherein:

the heating heat exchanger includes a core portion having a plurality of tubes through which the fluid flows to heat air, and a tank member for distributing the fluid into and for collecting the fluid from the tubes;

the flow control member is disposed in the tank member to be rotatable around a rotation axis that is parallel to a tube arrangement direction where the tubes are arranged; and the flow control member is rotated in the tank member to change a ratio between a first number of the tubes in which the fluid flows, and a second number of the tubes in which the fluid does not flow.

24. An air conditioner for a vehicle having a passenger compartment, comprising:

an air conditioning case for defining an air passage through which air flows into the passenger compartment;

a heating heat exchanger, for heating air using a fluid flowing therein as a heating source, disposed in the air conditioning case, the heating heat exchanger including a core portion having a plurality of tubes through which the fluid flows to heat air, and a tank member for distributing the fluid into and for collecting the fluid from the tubes; and a flow control member disposed in the tank member to be movable in the tank member so that an inner space of the tank member is partitioned into plural spaces in a tube arrangement direction where the tubes are arranged, wherein:

the flow control member is moved linearly in the tube arrangement direction to change a ratio between a first number of the tubes in which the fluid flows, and a second number of the tubes in which the fluid does not flow.

25. The air conditioner according to claim 24, further comprising:

a screw rotation shaft extending in the tank member in the tube arrangement direction, wherein:

the flow control member is fitted with an inner surface of the tank member to form a fitted state which prevents the flow control member from being rotated relative to the tank member, while being slidable on the inner surface of the tank member in the tube arrangement direction;

the flow control member is screw-connected to the screw rotation shaft, to be linearly moved in the tank member by a rotation of the screw rotation shaft while the fitted state is maintained.

26. The air conditioner according to claim 25, wherein:

the tank member has a non-round sectional shape; and the flow control member has a shape corresponding to the non-round sectional shape of the tank member.

27. The air conditioner according to claim 25, wherein:

the flow control member includes a valve member made of an elastic material, and a valve seat made of a rigidity material for fixing the valve member;

the valve member is disposed to press-contact the inner surface of the tank member;

the valve seat is screw-connected with the screw rotation shaft, and is disposed to be separated from the inner surface of the tank member by a predetermined clearance.

28. The air conditioner according to claim 25, further comprising:

a shaft support member, disposed within the tank member at one end side in the tube arrangement direction, for supporting one end of the screw rotation shaft; and an operation member, connected to the other end of the screw rotation shaft, for rotating the screw rotation shaft, wherein:

the tank member has an opening at the other end side in the tube arrangement direction, from which the flow control member is inserted into the tank member, and a cap member detachably disposed for closing the opening; and the other end of the screw rotation shaft penetrates through the cap member from the tank member, to protrude to an outside of the tank member and to be connected with the operation member.

29. The air conditioner according to claim 28, wherein the tank member has a fluid inlet from which the fluid flows into the tank member, at the one end side of the tank member in the tube arrangement direction.

30. The air conditioner according to claim 25, wherein:

the tank member has a fluid inlet from which the fluid flows into the tank member, at one end side of the tank member in the tube arrangement direction;

the tank member has a sectional shape with a sectional opening area between the fluid inlet and one tube among the tubes, most adjacent to the fluid inlet in the tube arrangement direction; and the sectional opening area of the tank member is provided to be reduced from the one tube toward the fluid inlet in the tube arrangement direction.

31. The air conditioner according to claim 25, wherein the tank member has a fluid inlet from which the fluid flows into the tank member, at one end side of the tank member in the tube arrangement direction, the air conditioner further comprising a seal member for sealing a screw connection portion between the flow control member and the screw rotation shaft, when the flow control member is moved between the fluid inlet and one tube among the tubes, most adjacent to the fluid inlet in the tube arrangement direction, to close the fluid inlet.

32. The air conditioner according to claim 24, wherein:

the heating heat exchanger includes a support plate for supporting one-side top ends of the tubes;

the tank member is formed into a cylindrical shape, and has plural holes corresponding to the one-side top ends of the tubes, at a side adjacent to the support plate; and the tank member is attached to the support plate while the one-side top ends of the tubes communicate with an inner space of the tank member through the holes of the tank member.

33. The air conditioner according to claim 32, wherein:

the heating heat exchanger further includes a seal member having plural holes communicating with the one-side top ends of the tubes and the holes of the tank member, respectively; and the seal member is disposed between the support plate and the tank member.

34. The air conditioner according to claim 32, wherein the support plate has a fastening portion for fastening the tank member.

35. An air conditioner for a vehicle having a passenger compartment, comprising:

an air conditioning case for defining an air passage through which air flows into the passenger compartment;

a heating heat exchanger, for heating air using a fluid flowing therein as a heating source, disposed in the air conditioning case, the heating heat exchanger including a core portion having a plurality of tubes through which the fluid flows to heat air, and a tank member for distributing the fluid into and for collecting the fluid from the tubes; and a flow control member disposed in the tank member to be rotatable around a rotation axis that is parallel to a tube arrangement direction where the tubes are arranged, wherein:

the flow control member has a dimension in an axial direction, corresponding to a length of the tubes in the tube arrangement direction; and the flow control member is rotated in the tank member to change a ratio between a first number of the tubes in which the fluid flows, and a second number of the tubes in which the fluid does not flow.

36. The air conditioner according to claim 35, wherein:

the flow control member has a hollow-shaped portion opened at one end in the axial direction;

the hollow-shaped portion is provided with an outer periphery facing to one-side top ends of the tubes;

the outer periphery of the hollow-shaped portion has a seal surface for closing the one-side top ends of the tubes, and a recess portion for opening the one-side top ends of the tubes; and the recess portion is provided in the hollow-shaped portion to have a spiral shape from one end toward the other end in the axial direction.

37. The air conditioner according to claim 35, wherein:

the heating heat exchanger further includes a seal member disposed between the seal surface and the one-side top ends of the tubes; and the seal member is disposed to press-contact the seal surface.

38. The air conditioner according to claim 35, further comprising:

a drive shaft disposed at the other end of the flow control member in the axial direction to protrude to an outside of the tank member; and an operation member connected to the drive shaft at the outside of the tank member, for driving the drive shaft.

39. The air conditioner according to claim 35, wherein:

the tank member includes an inlet tank for distributing the fluid into the tubes, and an outlet tank for collecting the fluid from the tubes; and the flow control member is disposed in at least one of the inlet tank and the outlet tank.

40. The air conditioner according to claim 39, wherein the heating heat exchanger is one-way flow type in which the fluid flows through the tubes in one way from the inlet tank to the outlet tank.

41. The air conditioner according to claim 39, wherein:

the inlet tank and the outlet tank are disposed at one end side of the core portion to be arranged adjacently in an air flowing direction;

the heating heat exchanger has a connection tank at the other end side of the core portion, opposite to arrangement positions of the inlet tank and the outlet tank;

the inlet tank and the outlet tank are disposed to communicate with the connection tank through the tubes, such that the fluid from the inlet tank flows into the connection tank through the tubes, and flows from the connection tank into the outlet tank through the tubes after being U-turned in the connection tank; and the connection tank has therein a plurality of spaces partitioned from each other for each of the tubes arranged in the tube arrangement direction.

42. The air conditioner according to claim 24, wherein:

the tank member includes an inlet tank for distributing the fluid into the tubes, and an outlet tank for collecting the fluid from the tubes;

the flow control member is disposed in at least one of the inlet tank and the outlet tank.

* * * * *